United States Patent
Matsuo et al.

(10) Patent No.: US 10,911,185 B2
(45) Date of Patent: Feb. 2, 2021

(54) WIRELESS COMMUNICATION DEVICE AND WIRELESS COMMUNICATION METHOD

(71) Applicant: KABUSHIKI KAISHA TOSHIBA, Tokyo (JP)

(72) Inventors: Ryoko Matsuo, Tokyo (JP); Tomoko Adachi, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 245 days.

(21) Appl. No.: 15/261,201

(22) Filed: Sep. 9, 2016

(65) Prior Publication Data
US 2017/0078052 A1    Mar. 16, 2017

(30) Foreign Application Priority Data

Sep. 10, 2015 (JP) ................................. 2015-178943
Sep. 6, 2016 (JP) ................................. 2016-173435

(51) Int. Cl.
| H04L 1/16 | (2006.01) |
| H04L 5/00 | (2006.01) |
| H04L 1/18 | (2006.01) |
| H04W 84/12 | (2009.01) |
| H04L 27/26 | (2006.01) |

(52) U.S. Cl.
CPC .......... *H04L 1/1664* (2013.01); *H04L 1/1614* (2013.01); *H04L 1/1861* (2013.01); *H04L 5/006* (2013.01); *H04L 5/0007* (2013.01); *H04L 5/0037* (2013.01); *H04L 5/0055* (2013.01);
(Continued)

(58) Field of Classification Search
CPC ..... H04B 7/0452; H04L 1/1867; H04L 5/006; H04L 5/0007; H04L 5/0037; H04L 5/0055; H04L 27/2626; H04W 72/0406; H04W 72/0453; H04W 76/02; H04W 76/10; H04W 84/12
See application file for complete search history.

(56) References Cited

U.S. PATENT DOCUMENTS

| 8,976,741 B2 | 3/2015 | Wentink |
| 9,264,119 B2 | 2/2016 | Morioka |

(Continued)

FOREIGN PATENT DOCUMENTS

| JP | 2010-263493 A | 11/2010 |
| JP | 2012-519426 A | 8/2012 |

(Continued)

OTHER PUBLICATIONS

Stacey, Robert: "Specification Framework for TGax", IEEE 11-15-0132-07-00ax-spec-framework, Intel, Jul. 2015, pp. 1-13.
(Continued)

*Primary Examiner* — Marsha D Banks Harold
*Assistant Examiner* — Dharmesh J Patel
(74) *Attorney, Agent, or Firm* — Foley & Lardner LLP

(57) ABSTRACT

A wireless communication device includes a receiver and a transmitter. The receiver is configured to receive a plurality of first frames. The plurality of first frames are multiplexed and transmitted. The transmitter is configured to multiplex and transmit a second frame and a third frame. The second frame includes acknowledgement responses that indicate reception success or failure for at least two of the plurality of first frames.

9 Claims, 29 Drawing Sheets

(52) U.S. Cl.
CPC ......... *H04L 27/2656* (2013.01); *H04W 84/12* (2013.01)

(56) References Cited

U.S. PATENT DOCUMENTS

| | | | |
|---|---|---|---|
| 9,788,317 B2* | 10/2017 | Ghosh et al. | |
| 2005/0141495 A1* | 6/2005 | Lin | H04B 7/0617 370/389 |
| 2012/0099530 A1* | 4/2012 | Morioka | H04B 7/0617 370/328 |
| 2014/0269544 A1* | 9/2014 | Zhu | H04L 1/1671 370/329 |
| 2015/0063291 A1* | 3/2015 | Merlin et al. | |

FOREIGN PATENT DOCUMENTS

| | | |
|---|---|---|
| WO | WO-2016/175328 A1 | 11/2016 |
| WO | WO-2016/175329 A1 | 11/2016 |

OTHER PUBLICATIONS

Stacey, Robert: "Specification Framework for TGax", IEEE 11-15-0132-17-00ax-spec-framework, Intel, May 2016, pp. 1-61.

Chu et al.: "Broadcast and Unicast (Trigger) in DL MU", IEEE 802.11-15/0831-00-00, Marvell, Jul. 2015, pp. 1-17.

Chu et al.: "Broadcast and Unicast (Trigger) in DL MU", IEEE 802.11-15/0831-01-00, Marvell, Jul. 2015, pp. 1-17.

Chu et al.: "Broadcast and Unicast (Trigger) in DL MU", IEEE 802.11-15/0831-02-00 (also r2), Marvell, Jul. 2015, pp. 1-16.

Chu et al.: "UL OFDMA Bandwidth", IEEE 802.11-15/0615-00-00, Marvell, May 2015, pp. 1-12.

Chu et al.: "UL OFDMA Bandwidth", IEEE 802.11-15/0615-01-00, Marvell, May 2015, pp. 1-12.

Chu et al.: "UL OFDMA Bandwidth", IEEE 802.11-15/0615-02-00, Marvell, May 2015, pp. 1-12.

Chu et al.: "UL OFDMA Bandwidth", IEEE 802.11-15/0615-03-00, Marvell, Jul. 2015, pp. 1-12.

IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11ac™, The Institute of Electrical and Electronics Engineers, Inc., Dec. 2013, pp. 1-425.

Madhavan et al.: "ACK/BA Frame for UL MU Under Cascading Structure", IEEE 802.11-15/1098-00-00, Toshiba, Sep. 2015, pp. 1-11.

Madhavan et al.: "ACK/BA Frame for UL MU Under Cascading Structure", IEEE 802.11-15/1098-01-00, Toshiba, Sep. 2015, pp. 1-11.

Stacey, Robert: "Specification Framework for TGax", IEEE 802.11-15/0132-07-00 (also r7), Intel, Jul. 2015, pp. 1-13.

Yang et al.: "Cascading Structure", IEEE 802.11-15/0841-00-00, Huawei, Jul. 2015, pp. 1-21.

Yang et al.: "Cascading Structure", IEEE 802.11-15/0841-01-00 (also r1), Huawei, Jul. 2015, pp. 1-21.

\* cited by examiner

WIRELESS COMMUNICATION DEVICE AND WIRELESS COMMUNICATION METHOD

CROSS REFERENCE TO RELATED APPLICATIONS

This application is based upon and claims benefit of priority from Japanese Patent Application No. 2015-178943, filed Sep. 10, 2015 and No. 2016-173435, filed Sep. 6, 2016, the entire contents of which are incorporated herein by reference.

FIELD

Embodiments described herein relates to a wireless communication device and a wireless communication method.

BACKGROUND

Wireless communication system that communicates between an access point (AP) and a wireless communication terminal (hereinafter, STA) has been known. For example, wireless LAN (Local Area Network) that utilizes CSMA/CS (Carrier Sense Multiple Access/Collision Avoidance) is well known. In the wireless LAN, there is a frequency multiplex communication method that performs simultaneous transmission for a plurality of STAs or simultaneous reception from the plurality of STAs by utilizing difference frequency components for each STA as communication resource. Here, it defines the frequency components as a resource unit that includes one or more subcarriers, and it considers OFDMA (Orthogonal Frequency Division Multiple Access) that performs simultaneous transmission for a plurality of STAs or simultaneous reception from the plurality of STAs by utilizing the resource unit as the communication resource. The simultaneous transmission from the AP to the plurality of STAs corresponds to downlink OFDMA (DL-OFDMA) and the simultaneous reception from the plurality of STAs to the AP corresponds to uplink OFDMA (UL-OFDMA).

In the OFDMA, there is a case that different kinds of frames are simultaneously transmitted from each STA. When it assigns the different kinds of frames to different resource units, transmission times of the frames may be different based on each resource unit. For example, there is a big difference in frame length between a control frame (such as Block ACK frame) and a data frame. Because a start timing of frame transmission or frame reception in OFDMA depends on the longest frame, communication efficiency is deteriorated in the resource unit in which a short frame is transmitted or received. This problem can arise in other multiplex communication methods such as multiuser MIMO (Multi-Input Multi-Output).

DETAILED DESCRIPTION

Hereinafter, embodiments of the present disclosure are described with reference to the drawings. The entire contents of IEEE Std 802.11™-2012 and IEEE Std 802.11ac™-2013, known as the wireless LAN standard and IEEE 802.11-15/0132r7 dated on Jul. 20, 2015 which is Specification Framework Document directed to IEEE Std 802.11ax as a next generation wireless LAN standards are incorporated by reference in the present disclosure.

Figure 1:
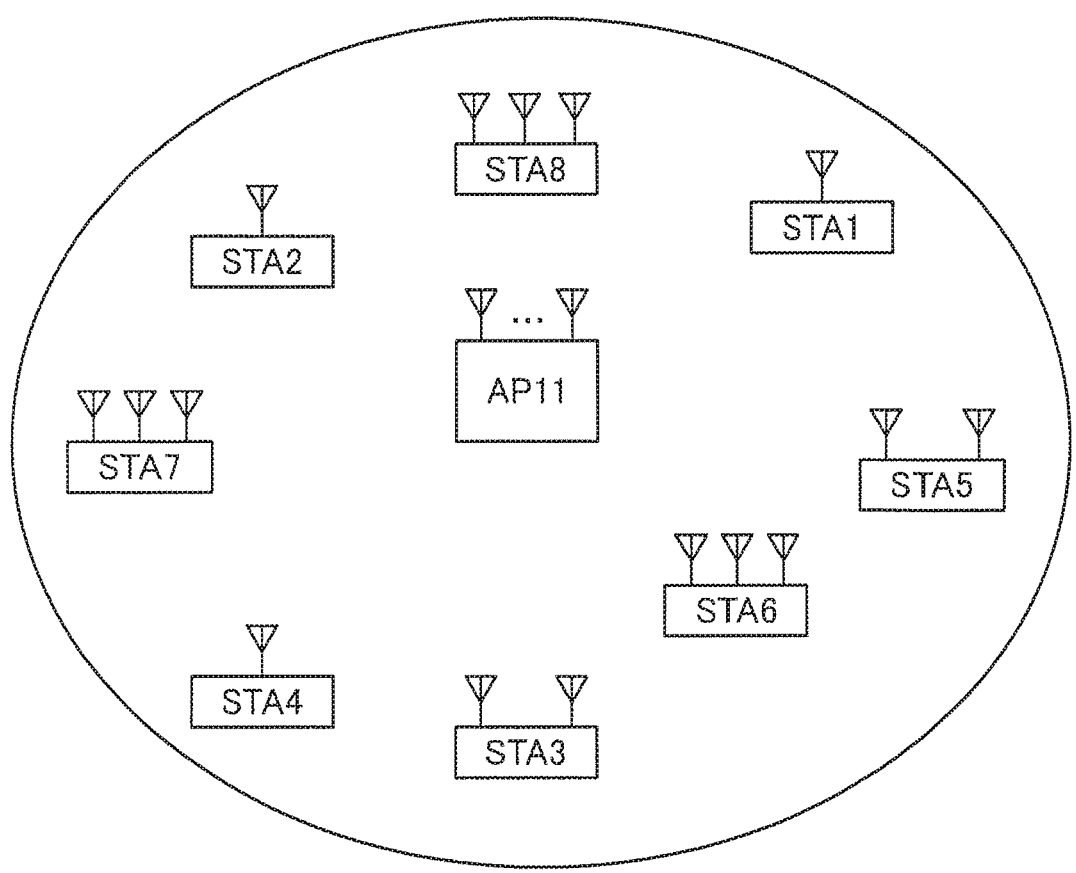
FIG. 1 illustrates a block diagram of a wireless communication system according to some embodiments.

FIG. 1 illustrates a block diagram of a wireless communication system that includes an access point (AP) and a plurality of wireless communication terminals (hereinafter "STAs: stations") according to some embodiments. Although the wireless communication system complies with IEEE802.11 standard, the present disclosure can also be applied to other wireless standards. Basically, the AP has the same function as the STA other than a relay function and so on. Therefore, it can say that the AP is one form of the STA. Both the AP and the STA install a wireless communication device that complies with the IEEE802.11 standard. The wireless communication device installed in the STA communicates with the wireless communication device installed in the AP. The wireless communication device installed in the AP communicates with the wireless communication device installed in the STA.

The wireless communication system or a wireless communication group (BSS: Basic Service Set) is formed by connecting an AP 11 and a plurality of STAs 1 to 8. The "connection" means a state where a wireless link is established. The wireless link is established by exchanging parameters for the communication between the AP and the STAs via association process. The STAs 1 to 8 belong to the BSS of AP 11.

In some embodiment, the AP 11 includes at least one antenna. In some embodiments, the AP 11 includes a plurality of antennas. The wireless communication device of the AP 11 performs transmission and reception of a MAC frame (Hereinafter, it may be called "frame") with the plurality of STAs via the antennas. The wireless communication device includes a transceiver and a controller. The transceiver is connected to the antennas and performs transmission and reception of frames. The controller controls the communication with the STAs. As one example, the transceiver can be formed by radio frequency (RF) circuitry and the controller can be formed by baseband circuitry. However, other embodiments are not limited to this configuration.

Each STA 1 to 8 includes one or more antennas. Each STA includes the wireless communication device (see FIG. 27 described later). The wireless communication device of each STA performs transmission and reception of frames with the AP 11 via the one or more antennas. The wireless communication device of each STA includes a transceiver and a controller. The transceiver is connected to the one or more antennas and performs transmission and reception of frames. The controller controls the communication with AP 11. As one example, the transceiver can be formed by radio frequency (RF) circuitry and the controller can be formed by baseband circuitry. However, it is not limited to this configuration. The AP 11 forms the BSS or a wireless network (a first network) with each STA. The AP 11 may connect with another network (a second network) through wired connection, wireless connection or hybrid of both. The AP 11 may relay a communication between the first network and the second network. Each STA generates frames such as data frames and transmits them to the AP 11. The AP 11 transmits the frames to another STA in the first network or to the second network based on a receiver address of the frames. In some embodiments, a frame may indicate not only a frame in IEEE802.11 standard but also a packet.

In some embodiments, a case is assumed where OFDMA (Orthogonal Frequency Division Multiple Access) communication is performed between the AP 11 and a plurality of STAs selected from the STAs 1 to 8. In OFDMA, the AP assigns resource units (it may also be called "subchannel", "resource block", "frequency block" and so on) to the plurality of STAs as communication resource and communicates with the plurality of STAs simultaneously based on the assigned resource units. The resource unit includes one or more subcarriers. Here, uplink OFDMA is named "UL-OFDMA" and downlink OFDMA is named "DL-OFDMA".

Figure 2:
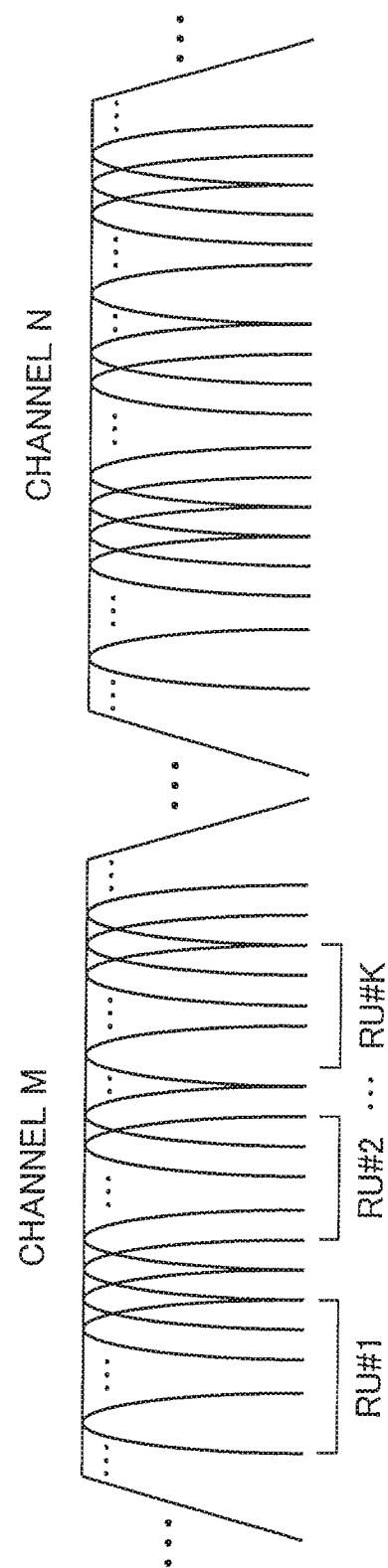
FIG. 2 illustrates a figure for explaining resource unit allocation.

The resource unit is a minimum unit of frequency components for performing communication. FIG. 2 illustrates the resource units (RU #1, RU #2, RU #K) that are allocated in consecutive frequency regions of one channel (here, channel M). The channel M includes a plurality of subcarriers that are orthogonal each other, and the plurality of resource units that include one or more consecutive subcarriers are allocated in the channel M. One or more subcarriers (guard subcarriers) may be allocated between resource units. Each subcarrier in the channel may have an identification number. As one example, the bandwidth of one channel may be 20 MHz, 40 MHz, 80 MHz or 160 MHz. The one channel may be formed by combining more than one 20 MHz channels. The number of subcarriers and the number of resource units in one channel can be changed based on the bandwidth. In some embodiments, the OFDMA communication is realized by utilizing different resource units simultaneously for each STA.

Figure 3:
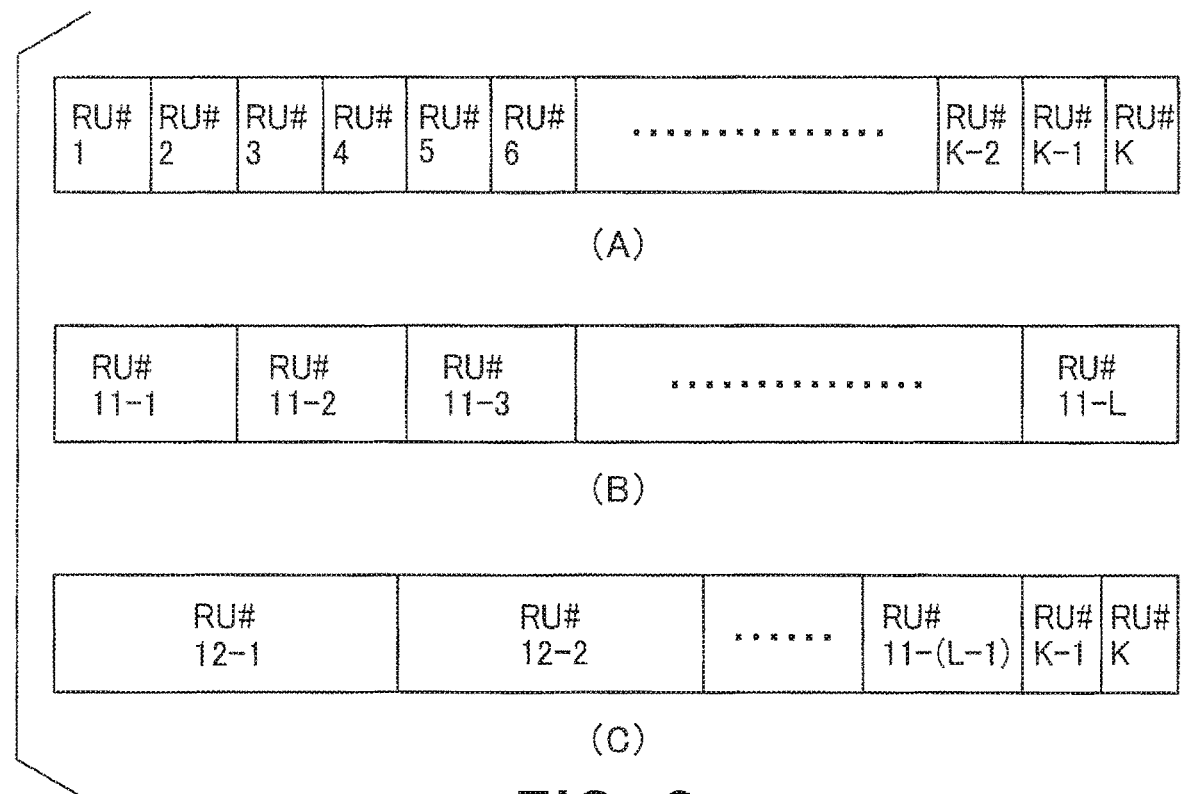
FIG. 3 illustrates a figure for explaining resource unit allocation.

The resource units may have the same or different bandwidth (the number of subcarriers) each other. FIG. 3 illustrates allocation patterns of resource units in one channel. FIG. 3(A) illustrates the allocation pattern where the bandwidth of each resource unit (RU #1, RU #2, RU #K) is the same. FIG. 3(B) illustrates the allocation pattern where each resource unit (RU #1, RU #2, RU #K) has a wider bandwidth than the bandwidth of each resource unit of FIG. 3(A). FIG. 3(C) illustrates the allocation pattern where three kinds of bandwidths are utilized. The resource units (RU #12-1, RU #12-2) have the widest bandwidth, the resource unit (RU #11-(L-1)) has the same bandwidth as the bandwidth of each resource unit of FIG. 3(B), and the resource units (RU #K-1, RU #K) have the same bandwidth as the bandwidth of each resource unit of FIG. 3(A).

Here, the number of resource units for each STA is not limited to a specific number. Each STA may utilize one or more resource units. In a case where the STA utilizes a plurality of resource units, the STA may bond resource units that are consecutive in the frequency domain into one resource unit. The STA may utilize resource units that are separately allocated in the frequency domain. RU #11-1 in FIG. 3(B) is one example of the resource unit created by bonding RU #1 and RU #2 in FIG. 3(A). The ID #11-1 is assigned to the resource unit created by bonding RU #1 and RU #2.

The resource unit may be defined by a plurality of subcarriers that are positioned non-consecutively in the frequency domain. The number of channels is not limited to one for performing the OFDMA communication. It may utilize the resource units both in the channel M and the channel N (see FIG. 2) by allocating the resource units in the channel N as allocated in the channel M. Here, the channel N is positioned non-consecutively in the frequency domain from the channel M. The way of allocating resource units may be the same or different in the channel M and the channel N. As described above, the bandwidth of one channel may be 20 MHz, 40 MHz, 80 MHz or 160 MHz, as one example. It can also utilize more than two channels. Here, the channel M and the channel N can be considered as one channel by bonding them.

Here, the STA that performs OFDMA may be required to receive and decode (e.g., including demodulation, decoding for error correction code and so on) physical packets that includes frames by at least a basic channel width for legacy standards (e.g., 20 MHz in the case of IEEE802.11a/b/g/n/ac standards). Carrier sensing is performed based on the basic channel width. The carrier sensing includes both physical carrier sensing based on busy/idle state of CCA (Clear Channel Assessment) and virtual carrier sensing based on the medium reservation time indicated in the reception frame. Such a mechanism that virtually determines that the medium is busy, or a period for which the medium is virtually busy, is referred to as a "NAV (Network Allocation Vector)". Here, carrier sensing information based on channel-based CCA or NAV may be commonly applied to the all resource units in the channel. For example, the state of resource units in a certain channel where the carrier sensing information indicates idle becomes idle.

In some embodiments, OFDMA can be performed on the basis of channel instead of on the basis of resource unit as described above. The channel-based OFDMA is referred to as MU-MC (Multi-User 15. Multi-Channel). In the MU-MC communication, the AP assigns a plurality of channels (for example, one channel width is 20 MHz) to a plurality of STAs, and performs simultaneous transmission to the plurality of STAs and simultaneous reception from the plurality of STAs. In some embodiments, OFDMA can be implemented as a resource unit-based OFDMA. In the later description of the resource unit-based OFDMA, a channel-based OFDMA (MU-MC) can be implemented by replacement of resource unit with channel.

Figure 4:
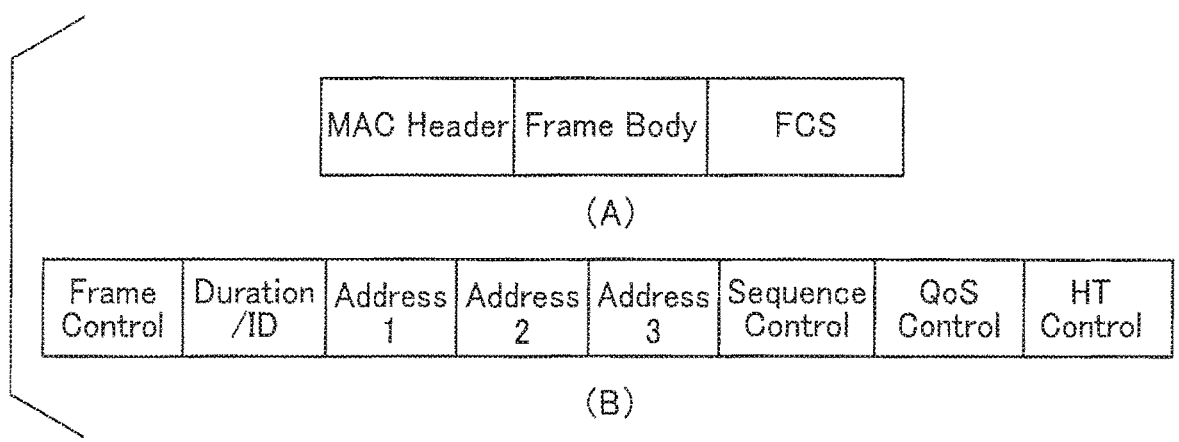
FIG. 4 illustrates a basic frame format of a MAC frame.

FIG. 4(A) illustrates a basic frame format of a MAC frame. A data frame, a management frame and a control frame according to some embodiments are based on this frame format (the details of each frame are described later). The frame format includes each filed of MAC header, frame body and FCS (Frame Check Sequence). As illustrated in FIG. 4(B), the MAC header includes frame control, duration/ID, address1, address2, address3, sequence control, QoS (Quality of Service) control and HT (High Throughput) control.

It does not always need to have the all fields. In some embodiments, some of them may not exist based on frame type. For example, there is a case where the address3 field does not exist. There is a case where both of or one of QoS Control and Control fields do not exist. In some embodiments, other fields that are not illustrated in FIG. 4 may exist. For example, address4 field may exist.

In some embodiments, the address1 field includes a receiver address (RA). In some embodiments, the address2 field includes a transmitter address (TA). In some embodiments, the address3 field includes a BSSID (Basic Service Set IDentifier) or a TA based on the usage of the frame. The BSSID is an identifier of BSS and it can target all BSSs by setting all bits to "1" (wildcard BSSID).

In some embodiments, the frame control field includes subfields such as type and subtype fields. In some embodiments, the type field identifies main three frame types: data frame, management frame and control frame. In some embodiments, the subtype field identifies detailed types of each main frame type. For example, the subtype field identifies BA frame, BAR frame, beacon frame, and so on among the management frames. A trigger frame that is described later may be identified by the combination of type and subtype fields.

In some embodiments, the duration/ID field includes the medium reservation time. In the case where the MAC frame directed to other STAs is received, it is regarded that the medium is virtually busy over the medium reservation time from the end of the physical packet including the MAC frame. As described above, such a mechanism that virtually determines that the medium is busy, or a period for which the medium is virtually busy, is referred to as a "NAV (Network Allocation Vector)". In some embodiments, the QoS field is utilized to perform QoS control where the frames are transmitted based on the priority. In some embodiments, the HT Control field is a subfield introduced in IEEE802.11n standard.

Figure 5:
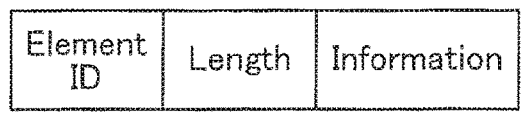
FIG. 5 illustrates an example format of information element.

The management frame sets information element (IE) to the frame body field. The IE has a unique element ID (IDentifier). It can set one or more element IDs in the frame body field. As illustrated in FIG. 5, the IE includes element ID field, length field and information field. The IE is identified by the element ID field. In some embodiments, the information field contains the information to be transmitted. In some embodiments, the length field contains the length of the information field.

The FCS field contains FCS (Frame Check Sequence) information as a code of checksum in order to detect frame error in the receiving side. Examples of the FCS information are CRC (Cyclic Redundancy Code) and so on.

Figure 6:
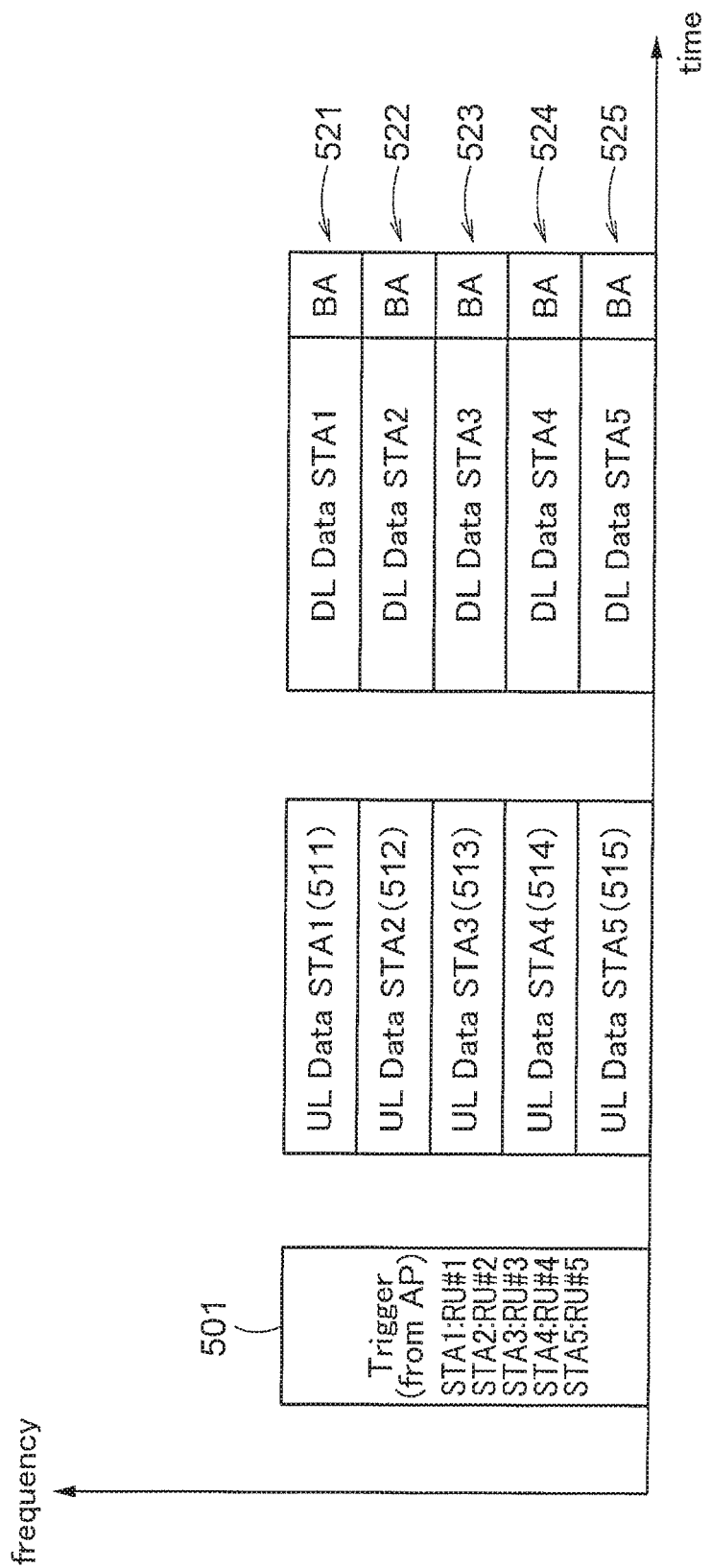
FIG. 6 illustrates an example of frame sequence according to some embodiments.

FIG. 6 illustrates an example of frame sequence between the AP 11 and the STAs 1 to 8 according to some embodiments. It assumes that single user communication has been performed between the AP 11 and a part of or all of STAs 1 to 8 based on CSMA/CA before the start of the frame sequence. The single user communication has been performed between the AP 11 and STA by utilizing one channel of the basic channel width (for example, 20 MHz). As one example of the single user communication where the STA stores data for uplink transmission, the STA acquires the access right (transmission right) on the wireless medium based on CSMA/CA. For example, the STA acquires the access right to transmit one frame if the state of CCA is idle during the carrier sensing time (waiting time) over the DIFS/AIFS [AC] time and randomly decided backoff time, where DIFS/AIFS [AC] indicates DIFS or AIFS determined based on access category (AC). The STA transmits the data frame including transmission data (more precisely, the physical packet including the data frame). If the AP receives the data frame successfully, it returns an ACK frame as acknowledgement response frame (more precisely, the physical packet including the ACK frame) after the elapse of SIFS time from the reception completion of the data frame. The STA identifies the success of the data frame transmission by receiving the ACK frame. The data frame transmitted to the AP may be an aggregation frame such as A-MPDU (medium access control (MAC) protocol data unit). In this case, the acknowledgement response frame from the AP may be a BA (Block Ack) frame. Here, the DIFS/AIFS [AC] means one of DIFS and AIFS [AC]. In the case of QoS, it means DIFS. In the case of non-QoS, it means AIFS [AC] decided based on access category (AC) of transmission data.

In some embodiments, the AP determines the start of OFDMA sequence (UL-OFDMA and DL-OFDMA) in any timing. The OFDMA sequence means communication including UL-OFDMA and DL-OFDMA during a certain period of time defined by the AR In some embodiments, OFDMA can be performed by utilizing the same channel (e.g., one channel of the basic channel width of 20 MHz) as the single user communication. In some embodiments, OFDMA can be performed by utilizing a plurality of resource units defined in the basic channel width of 20 MHz. OFDMA also can be performed by utilizing other channel widths such as 40 MHz and 80 MHz. OFDMA also can be performed in each channel by utilizing more than one 20 MHz channels simultaneously. It is not necessary to utilize the same position or the same assignment of resource units between UL-OFDMA and DL-OFDMA in the OFDMA sequence.

First, in some embodiments, the AP determines to perform UL-OFDMA in the OFDMA sequence. In this case, the AP generates a trigger frame 501 by deciding necessary information for UL-OFDMA. The AP transmits the trigger frame 501 (e.g., more precisely the physical packet including the trigger frame) based on the access right acquired by CSMA/CA. In some embodiments, the trigger frame 501 is transmitted by utilizing the same channel of the basic channel width as the single user communication. As one example, the physical packet including the trigger frame is generated by adding a physical header to the top of the trigger frame. As one example illustrated in FIG. 7, the physical header (PHY header) includes L-STF (Legacy-Short Training Field), L-LTF (Legacy-Long Training Field) and L-SIG (Legacy Signal Field) defined in IEEE802.11 standard. For example, the L-STF, L-LTF and L-SIG fields are recognizable by a legacy terminal that complies with IEEE802.11a. In some embodiments, the L-STF, L-LTF and L-SIG include information such as signal detection, frequency correction (channel estimation) and transmission rate, respectively. The trigger frame 501 may include fields other than the ones described here. For example, it may include fields that only the OFDMA terminal (non-legacy terminal) can recognize. The trigger frame 501 may be a frame that is receivable and decodable by both the legacy and OFDMA (non-legacy) terminals. Here, " . . . " in FIG. 7 means that any field other than the described ones may be present or absent in this position.

In some embodiments, when generating the trigger frame 501, the AP 11 selects STAs that perform UL-OFDMA as necessary information. In some embodiments, as a selection method, for example, the AP may gather information from each STA whether it has a request for UL-OFDMA transmission beforehand, and may select STAs that have the transmission request. In some embodiments, the AP may preferentially select a STA that has the maximum amount of transmission data based on transmission data amount of each STA. In some embodiments, the AP may select STAs that have about the same amount of data.

In some embodiments, when the AP manages the STAs by grouping, the AP may select a part of or all STAs that belong to the same group. In some embodiments, the AP may also select the group itself. In this case, it is assumed that the AP has grouped the STAs that belong to the AP at an association process or at a specific timing after the association process, and has sent identification information of each group and grouping information to each STA by utilizing a management frame and so on. The identification information may be group ID of IEEE802.11ac standard or other group ID defined separately. The grouping information includes a list of STAs that belong to each group. The AP may send the lists of all groups to each STA, or may send only the list of a group to which the subject STA belongs. As for a criterion for selecting a group, the AP may refer items such as whether each STA of the group has a request for UL-OFDMA transmission, amount of transmission data and so on.

The AP may select STAs or a group based on round-robin scheduling, or may select them randomly.

In some embodiments, the AP can select STAs that are expected to have the same or close amount of next transmission data or STAs that are expected to have the same or close generation cycle of transmission data (for example, STAs of which difference of the generation cycles are within a certain amount, or specific number of STAs that have the closest generation cycles).

The AP may select STAs that have the same data type of transmission data. In the case of QoS-based selection, the data type may be AC (Access Category). In some embodiments, the data type may be TID (Traffic ID).

In some embodiments, when a minimum number of STAs to be selected is defined, the AP may select equal to or more than the minimum number STAs. The selection methods described here are one examples, the AP may select STAs by utilizing other methods.

In some embodiments, for selected STA, the AP decides at least one resource unit that is utilized for UL-OFDMA. Moreover, the AP may individually or commonly decide the maximum length of packet (PPDU (Physical Protocol Data Unit)) that each STA transmits. For example, in the case where the AP receives, for next transmission, TXOP (transmission opportunity) length, data amount or information including both of them from each STA, the AP may decide PPDU length by utilizing the TXOP length or data amount (PPDU length and so on) notified from each STA. For example, when deciding the common packet length for each STA, the AP may decide the PPDU length based on the longest one among TXOPs or data amounts of STAs. The AP may also decide other items. For example, the AP may decide at least one of a method for error correction code or an MCS (Modulation and Coding Scheme) in order to decide transmission rate of PHY, MAC or both of them. In some embodiments, the AP may decide an MCS for each STA such that the PPDU length of each STA becomes equal or close each other. In the case where an MCS can be designated to a PHY header (e.g., preamble) as well as a frame, the AP may decide the MCS applied to the PHY header. In some embodiments, the AP may also decide transmission power of each STA. For example, the AP may decide the transmission power by measuring received power such that the received power (such as RSSI (received signal strength indicator)) from each STA becomes equal or within a certain range.

In some embodiments, the AP generates the trigger frame 501 after deciding items necessary to perform UL-OFDMA communication such as STAs that perform UL-OFDMA, resource units assigned to the STAs and so on. In some embodiments, the trigger frame 501 includes information (e.g., notification information) that is necessary to notify STAs in order to perform UL-OFDMA transmission.

Figures 7, 8, 9, 10, 11:
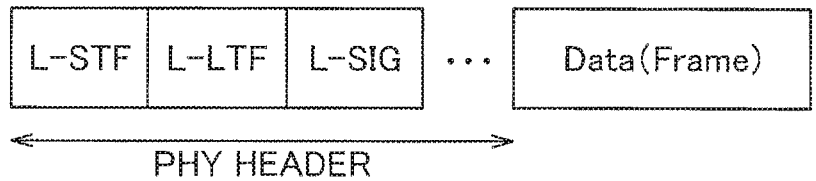
FIG. 7 illustrates a configuration example of physical header.
FIG. 8 illustrates a frame format example of a trigger frame.
FIG. 9 illustrates another frame format example of a trigger frame.
FIG. 10 illustrates another frame format example of a trigger frame.
FIG. 11 illustrates a configuration example of PHY packet for DL-OFDMA transmission.

FIG. 8 illustrates a frame format example of a trigger frame. The trigger frame 501 is defined based on the frame format of the common MAC frame illustrated in FIG. 5. The header field or frame body field of the trigger frame includes the common information field (COMMON Info) and STA information fields (STA info) for at least the number of STAs that perform UL-OFDMA.

In some embodiments, the type of frame control field is set to a value for control frame, and the subtype is set to a value newly defined for a trigger frame. In some embodiments, the configuration where the frame type of the trigger frame becomes management frame or data frame instead of control frame is not excluded. Some information of the trigger frame 501 (information of the common information field and the STA information field) may be added to a frame body of the existing management frame as information element. A value of the existing standard may be used as a value of the subtype.

As one example, the RA (receiver address) of the trigger frame 501 is a broadcast address or a multicast address, and is set to the address1 field. In some embodiments, the TA (transmitter address) is a MAC address or a BSSID of the AP, and is set to the address2 field.

In the sequence illustrated in FIG. 6, the AP selects five STAs 1 to 5, therefore five STA information fields 1 to 5 (STA Info 1 to 5) are set to the frame body field of the trigger frame. Information individually notified to each STA is set to each STA information field. Information commonly notified to the STAs 1 to 5 selected for UL-OFDMA is set to the common information field.

For example, information related to the number of STA information fields is set to the common information field. The number of STA information fields can be changed based on the number of selected STAs, therefore the number of STA information fields can be set to the common information field. In the case where the number of STA information fields is fixed, this information may be omitted.

In some embodiments, information related to transmission timing of UL-OFDMA may be set to the trigger frame. In the case where it is decided that uplink transmission is performed after the elapse of a certain period of time (e.g., predetermined IFS) from the reception completion of the trigger frame, this information may be omitted because each STA has already known the timing.

In some embodiments, in the case where packet length or time length of uplink transmission by each STA is common, information specifying the packet length, the time length or both of them may be set to the common information field.

In some embodiments, in the case where a group of STAs is selected as STAs for UL-OFDMA, identification information of the group (e.g., group ID) may be set to the common information field. Here, if there is a rule that all STAs that belong to the group are the STAs that are approved to perform UL-OFDMA, setting of STA identification to each STA information field may be omitted, as long as each STA can identify the STA information field assigned to the subject STA among the plurality of STA information fields. For example, in the case where the AP has notified position information of each STA's STA information field (such as an order from the beginning or ending of the STA information fields), setting of STA identification may be omitted. If the STA information field is decided unambiguously based on the position in the STA list of the group, setting of STA identification may also be omitted.

As one example, the STA information fields 1 to n include STA identification field (e.g., STA ID field), resource unit identification field (e.g., RU #field) and so on. Other fields individually notified to each STA may also be included in the SAT information fields. Identification of each STA is set to the STA ID field. As for the identification of each STA, association ID (AID), MAC address or any other unique ID may be utilized. In some embodiments, the association ID is an identification that is assigned in an association process between an AP and a STA in order for the STA to join the BSS of the AP.

The RU #field includes information to designate a resource unit that the corresponding STA utilizes for UL-OFDMA. In some embodiments, various formats of the information may be utilized as long as the resource unit can be designated. For example, resource units may be designated by resource unit numbers (identifications). In some embodiments, resource units may be designated by the order of resource unit from high frequency side or low frequency side. In some embodiments, resource units may also be designated by combination with the identification of channel that is utilized for UL-OFDMA. In some embodiments, a configuration is possible in which group identifications each of which identifies more than one resource units are defined and one or more group identifications are designated in the RU #fields. In this case, it is assumed that the STA can identify usable resource units from the group identifications.

As for other examples of parameters, the AP may set information related to at least one of a packet length (such as PPDU length) for allowing transmission, a method for error correction code or an MCS to decide transmission rate of PHY, MAC or both of them. The unit of the packet length may be data size or time length (occupancy time length in medium). In the case where the packet length is common among the STAs, the information related to the packet length may be set to the common information field instead of the STA information fields. The maximum length of the packet may be set by standard or system beforehand. In this case, the packet length may be set less than or equal to the maximum length. In some embodiments, instead of the packet length, it can also utilize a length of MAC frame, a length of MSDU (medium access control (MAC) service data unit) and so on. In some embodiments, as other examples, information of data type to be sent from each STA may be designated. As for the data type, it may set AC (Access Category) or TID (Traffic ID). The data type may be different for each STA, or may be common for each STA. In some embodiments, more than one data types may be designated. In some embodiments, information related to transmission power of each STA may be set. In some embodiments, in the case where it individually designates UL-OFDMA transmission timing of each STA (e.g., UL-OFDMA transmission timing is adjusted for each STA), it may set information related to the transmission timing. For example, adjustment amount from a predetermined timing may be set as the information.

FIG. 8 illustrates an example where the common information field and the STA information fields are set to the header field or the frame body field. As illustrated in FIG. 9, a part of or all of the common information field and the STA information fields may be set to PHY header. The PHY header of FIG. 9 includes the common information field and the STA information fields for the number of STAs after L-STF (Legacy-Short Training Field), L-LTF (Legacy-Long Training Field) and L-SIG (Legacy Signal Field). In some embodiments, in the case where all information necessary to notify is included in the PHY header, the common information field and the STA information fields may be omitted from the MAC frame.

In some embodiments, as illustrated in FIG. 10, a configuration is possible in which the common information field is omitted from the trigger frame (e.g., the trigger frame in FIG. 8). In some embodiments, when the number of STA information fields is fixed and all necessary information is notified by the STA information fields, the common information field may be omitted.

The trigger frame 501 (see FIG. 6) transmitted from the AP is received by the STAs 1 to 8. In some embodiments, the STAs 1 to 8 decode the trigger frame 501. In some embodiments, after the trigger frame 501 is determined to be successfully received based on FCS inspection (such as CRC), the STAs check whether the subject STA is designated by one of the STA information fields 1 to n. In some embodiments, the checking may be done by checking whether the identification of the subject STA is set to the STA information fields 1 to n. A configuration is possible in which the STA information field of the subject STA is checked only when a group ID of the subject STA has been specified in the common information field. In some embodiments, in the case where there is a rule that the STA is always designated when the group ID of the STA is designated, it may be determined that the subject STA is designated by identifying the group ID of the subject STA. In some embodiments, in the case where the identification of each STA is designated in the common information field as STAs that perform UL-OFDMA, it may be determined whether the subject STA is designated based on the common information field. It can also be determined by utilizing other methods.

The STA designated as a target of UL-OFDMA identifies a resource unit that is utilized by the STA. For example, the STA identifies the resource unit from the information set in the STA information (e.g., RU #).

In the example as shown in FIG. 1, the STAs 1 to 8 receive the trigger frame 501 (see FIG. 6). The STAs 1 to 5 determine that the subject STA is designated and the STAs 6 to 8 determine that the subject STA is not designated. The STA 1 to 5 generate data frames 511, 512, 513, 514 and 515 (see FIG. 6) including data for uplink transmission (e.g., generate packets including these data frames), and transmit them to the AP by utilizing resource units assigned to each STA. In some embodiments, in the case where parameters for transmission power, MCS, packet length and so on are designated, the STAs generate and transmit the data frames based on the parameters. For example, the resource unit #1 is assigned to the STA 1, the resource unit #2 is assigned to the STA 2, the resource unit #3 is assigned to the STA 3, the resource unit #4 is assigned to the STA 4, and the resource unit #5 is assigned to the STA 5. In some embodiments, the data frames 511 to 515 (see FIG. 6) are aggregation frames that aggregate a plurality of data frames, respectively. In some embodiments, the data frames 511 to 515 may be one data frame (non-aggregation frame), respectively.

In some embodiments, transmission of each data frame is performed after the elapse of time T1 (not illustrated in the figure) from the reception completion of the trigger frame 501 by the STAs 1 to 5. In some embodiments, these data frames are received by the AP simultaneously. In this way, UL-OFDMA transmission is performed. As one example, the time T1 is predefined IFS time [μs]. The predefined IFS time may be SIFS (=16 μs) defined in the MAC protocol of IEEE802.11 wireless LAN standard as a time interval of frames, or may be a larger or smaller value than SIFS. In some embodiments, in the case where the value of T1 is included in the common information field, the STA information fields or both of them, the STAs 1 to 5 obtains the value of the time T1 from the trigger frame 501. In some embodiments, the time T1 may be notified beforehand by other methods such as a beacon frame, any other management frames and so on.

In some embodiments, in the case where the AP has notified adjustment amounts of transmission timing for the STAs 1 to 5 by the common information field or the STA information fields in the trigger frame (see FIGS. 8 and 9), the STAs 1 to 5 may send data frames by adjusting the transmission timing based on the notified adjustment amounts.

In some embodiments, the data frames 511 to 515 transmitted by the STAs 1 to 5 may include different or the same contents. In some embodiments, when a plurality of STAs transmit or receive X-th frame(s) or the AP receives or transmits a plurality of X-th frames, the contents of the X-th frame(s) may be the same, or may be different.

In some embodiments, when the STA does not have data for uplink transmission, the STA may send a frame by predefined format. For example, the STA may send a frame that has the PHY header without the data field, or a frame that has the PHY header and the MAC header without the frame body field. Alternatively, the STA may perform nothing for data transmission. In some embodiments, the AP may determine that the STA does not have data to be transmitted when the AP receives that kinds of frame or the AP receives nothing from the STA.

In some embodiments, the AP 11 receives data frames from a plurality of STAs transmitted by UL-OFDMA, and checks CRC (Cyclic Redundancy Code) of each received data frame. In some embodiments, the data frames are aggregation frames. Therefore, for each STA, the AP checks CRC of a plurality of data frames. By checking CRC, the AP determines whether each of data frames included in the aggregation frame transmitted from each STA is successfully received or not. In some embodiments, the AP 11 generates a Block Ack frame (BA frame) for each STA as an acknowledgement response frame including a plurality of check results based on the check result for the STAs 1 to 5. As illustrated in FIG. 6, in some embodiments, the AP generates aggregation frames 521, 522, 523, 524, and 525 for each STA by aggregating one or more data frames including data for each STA 1 to 5 and the BA frames for each STA 1 to 5. The AP 11 transmits the aggregation frames 521 to 525 to each STA by utilizing the same resource units as the ones that each STA utilizes for UL-OFDMA transmission, after the elapse of a certain period of time (such as SIFS) from the reception completion of the data frames 511 to 515. In some embodiments, these aggregation frames are transmitted by adding PHY headers respectively. In some embodiments, identification of resource units to be received may be set in a certain field (e.g., SIG1 field) of the PHY header for each STA.

FIG. 11 illustrates a configuration example of PHY packet for DL-OFDMA transmission of the aggregation frames 521 to 525. As one example, the L-STF, L-LTF and L-SIG fields described in FIG. 7 are transmitted by utilizing 20 MHz channel width, and are set to the same value (e.g., bit sequence) for the all aggregation frames 521 to 525. In the SIG1 field, information connecting between identification of each STA and resource unit number. (e.g., identification) is set in order to designate a resource unit for each STA. The identification of each STA may be an association ID (AID), a partial AID, or other identifications such as a MAC address. In some embodiments, the SIG1 field is also send by 20 MHz channel width, and set to the same value (e.g., bit sequence) for the all aggregation frames 521 to 525. In some embodiments, all the STAs 1 to 5 (and also the other STAs 6 to 8) can decode the SIG1 field. In some embodiments, SIG2 fields are set for each resource unit, and may include information necessary for decoding such as MCS. In some embodiments, by decoding the SIG1 field, each STA that receives a signal from the AP 11 can identify the resource unit to be decoded by the subjected STA. In some embodiments, by defining ID that designates STAs of all groups or STAs of a specific group (e.g., broadcast ID or multicast ID), each STA may also set information connecting between the broadcast ID or multicast ID and resource units.

The STAs 1 to 5 receive the aggregation frames 521 to 525 by decoding signal of the assigned resource unit for each STA. The STAs 1 to 5 decode and check CRC of data frames included in the aggregation frames 521 to 525. The STAs 1 to 5 decode BA frames included in the aggregation frames 521 to 525, and identify whether the data frames transmitted by each STA are successfully received or not. In some embodiments, the STAs 1 to 5 may generate acknowledgement response frames (such as BA frames) corresponding to the data frames transmitted by the AP, and send the acknowledgement response frames (e.g., UL-OFDMA transmission) after the elapse of a certain period of time (such as SIFS) from the reception completion of the aggregation frames 521 to 525. In some embodiments, the STAs 1 to 5 may transmit (UL-OFDMA transmission) aggregation frames of the acknowledgement response frames and other frames by utilizing the same resource units as the ones that are assigned to each STA for DL-OFDMA. Later, DL-OFDMA and UL-OFDMA can be continued to repeat in a similar or same manner. As one example, a period for the OFDMA sequence may be notified by the trigger frame 501. For example, the OFDMA sequence may be continued by setting a medium reservation time specified by the duration/ID field of the trigger frame 501 as TXOP (Transmission Opportunity). In some embodiments, information related to OFDMA sequence period may be notified to each STA by utilizing the common information field.

Figure 12:
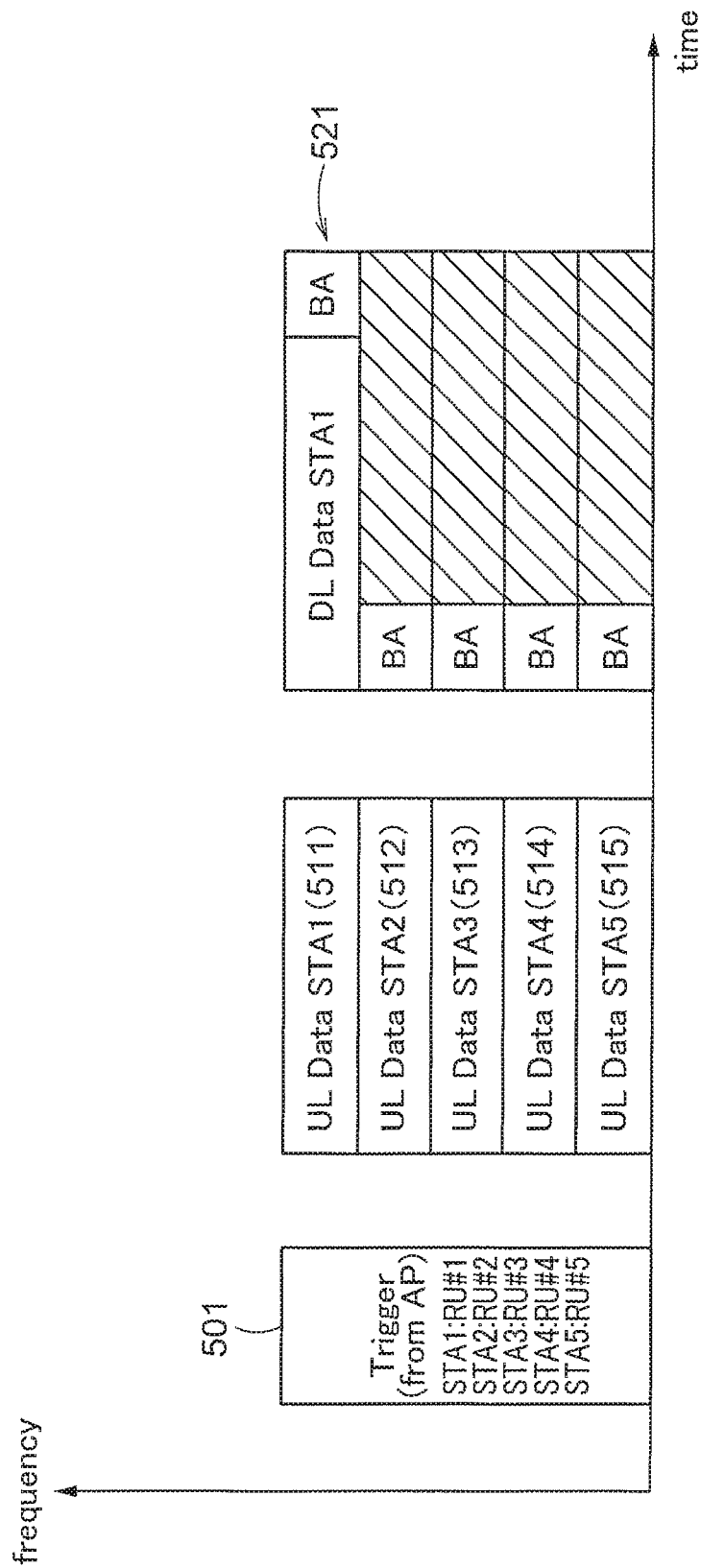
FIG. 12 illustrates another example of frame sequence according to some embodiments.

In the sequence illustrated in FIG. 6, there is a case where the AP does not have transmission data for all STAs 1 to 5 when performing DL-OFDMA transmission. For example, there is a case where the AP has transmission data for the STA 1 whereas the AP does not have transmission data for the STAs 2 to 5. In this case, the AP may send aggregation frame 521 for the STA 1, and may send only BA frames for the STAs 2 to 5. FIG. 12 illustrates an example sequence of this case. In the resource units for the STAs 2 to 5, in this case, there is no data transmission during the time from the reception completion of the BA frames to the end of the aggregation frame 521 transmitted by the resource unit for the STA 1, which is not efficient. In this case, in some embodiments, padding data is added to the ends of the BA frames transmitted by the resource units for the STAs 2 to 5 until the end of the aggregation frame 521 in order to notify other STAs of busy status of the resource units. In some embodiments, it is also possible to omit the padding data. The hatching in FIG. 12 illustrates the padding data (the same hereinafter).

The AP according to some embodiments has a feature to conduct scheduling of DL-OFDMA (e.g., determine which frame of which STA is assigned to which resource unit) efficiently in order to enhance an efficiency of DL-OFDMA transmission.

Figure 13:
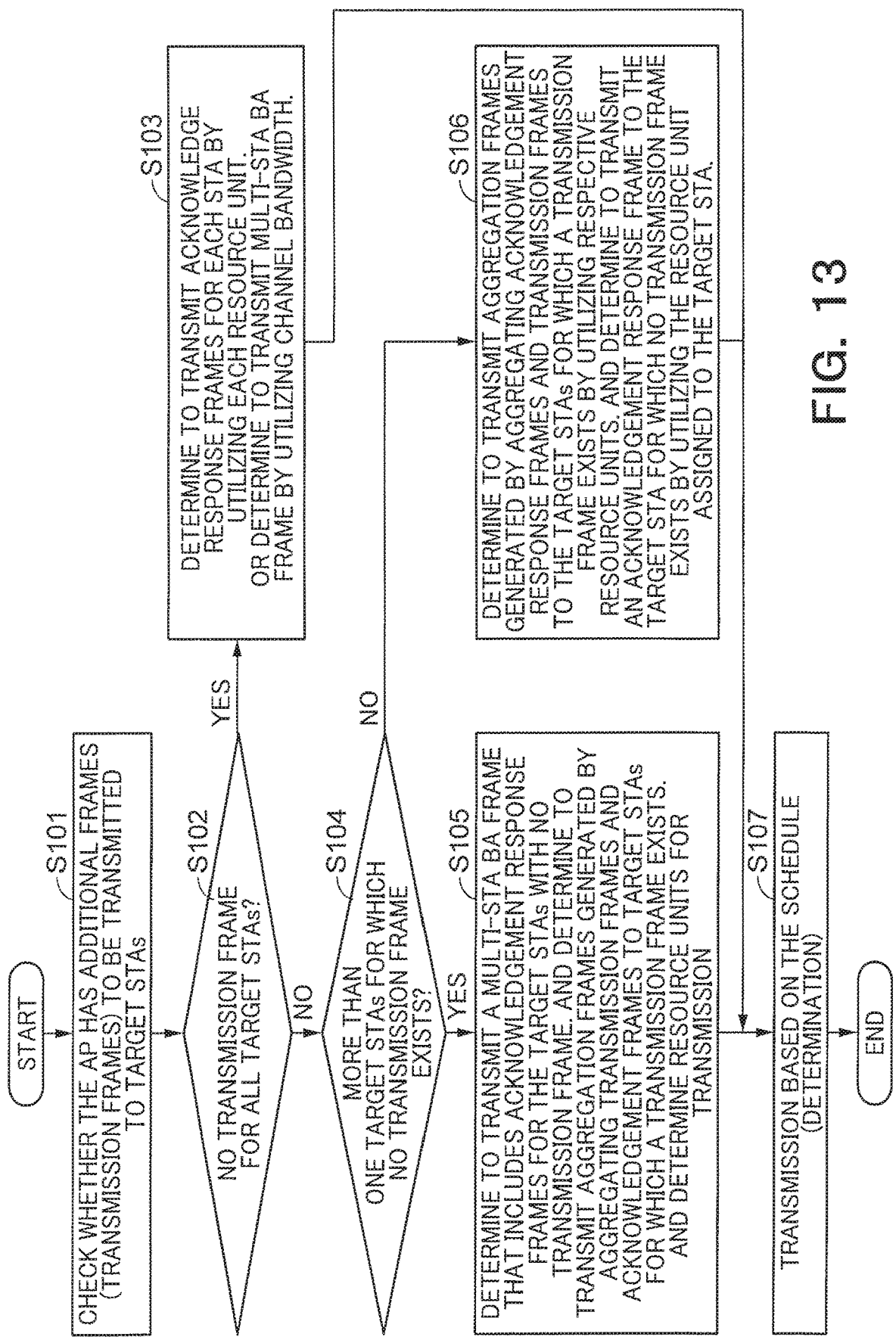
FIG. 13 illustrates a flowchart of a scheduling by the AP according to some embodiments.

FIG. 13 illustrates a flowchart of a scheduling of DL-OFDMA by the AP according to some embodiments. Although the timing of this action can be any time, as for an example, it may be after finishing sending the trigger frame 501 or after finishing receiving frames by UL-OFDMA.

The AP checks whether the AP has a frame to be transmitted to each target STA other than an acknowledgement response frame (hereinafter, a transmission frame) (S101). The target STA is either a STA designated by the trigger frame 501 or a STA that has performed UL-OFDMA transmission. As one example, the AP may determine whether the AP has a transmission frame for a target STA based on whether the AP has data addressed to the target STA in a buffer. In some embodiments, the transmission frame may be a newly transmitted frame or a retransmission frame of a frame that has been transmitted unsuccessfully. In some embodiments, the frame type may be data frame or management frame. Here, it is assumed that the frame type is data frame.

Figure 14:
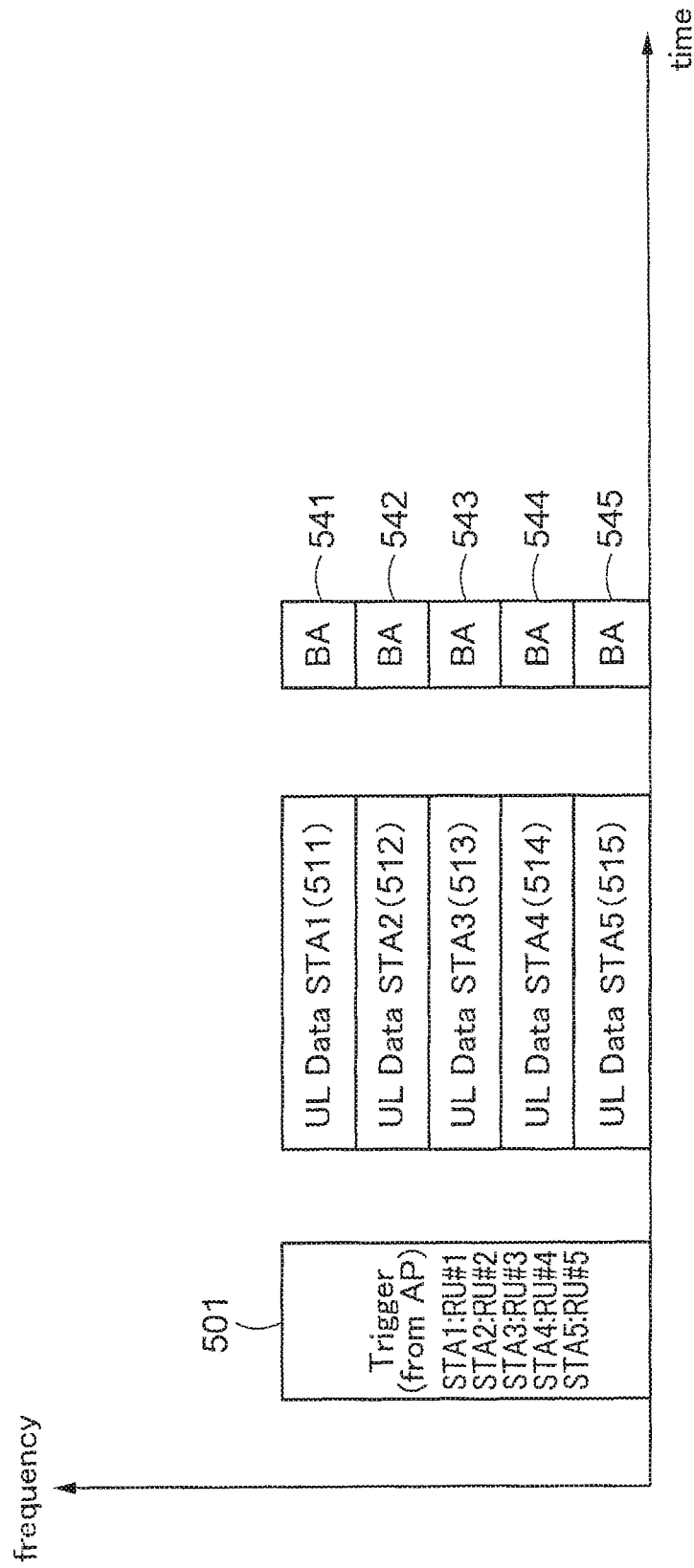
FIG. 14 illustrates another example sequence according to some embodiments.

If there is no transmission frame for all target STAs, the AP determines to transmit an acknowledgement response frame (such as an BA frame) to each target STA by utilizing a resource unit that is respectively assigned to each target STA for UL-OFDMA transmission (S103). In some embodiments, the AP sends acknowledgement response frames by DL-OFDMA after the elapse of a certain period of time (such as SIFS) from the reception completion of the data frames 511 to 515 transmitted by UL-OFDMA. FIG. 14 illustrates an example sequence of this case. The AP transmits BA frames 541 to 545 to the STAs 1 to 5 by DL-OFDMA.

Figure 15:
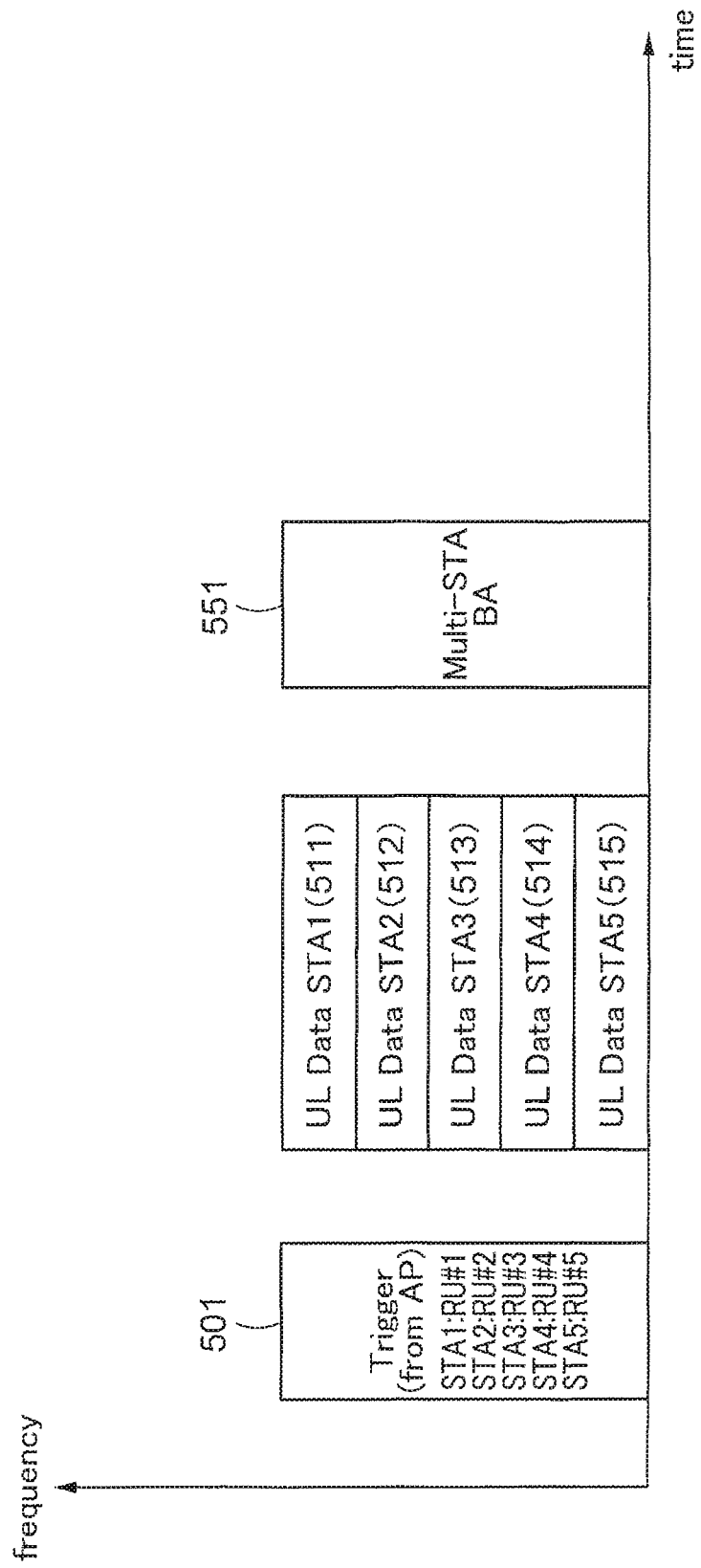
FIG. 15 illustrates another example sequence according to some embodiments.

In some embodiments, in step S103, the AP may determine to transmit a frame that includes all acknowledgement responses to target STAs (e.g., Multi-STA BA frame) by utilizing the channel bandwidth (e.g., 20 MHz bandwidth). In some embodiments, the AP sends the Multi-STA BA frame by utilizing the channel bandwidth after the elapse of a certain period of time (such as SIFS) from the reception completion of the data frames 515 to 515 transmitted by UL-OFDMA. FIG. 15 illustrates an example sequence of this case. The AP transmits the Multi-STA BA frame 551 to the STAs 1 to 5 by utilizing the channel bandwidth. As one example, the address of the Multi-STA BA frame is a broadcast address or a multicast address. In some embodiments, the AP may set one of MAC addresses of STAs designated by the trigger frame 501. The Multi-STA BA frame is a frame that is diverted from a BA frame in order to notify a plurality of STAs of acknowledgement responses. The details of the Multi-STA BA frame are described later.

Figure 16:
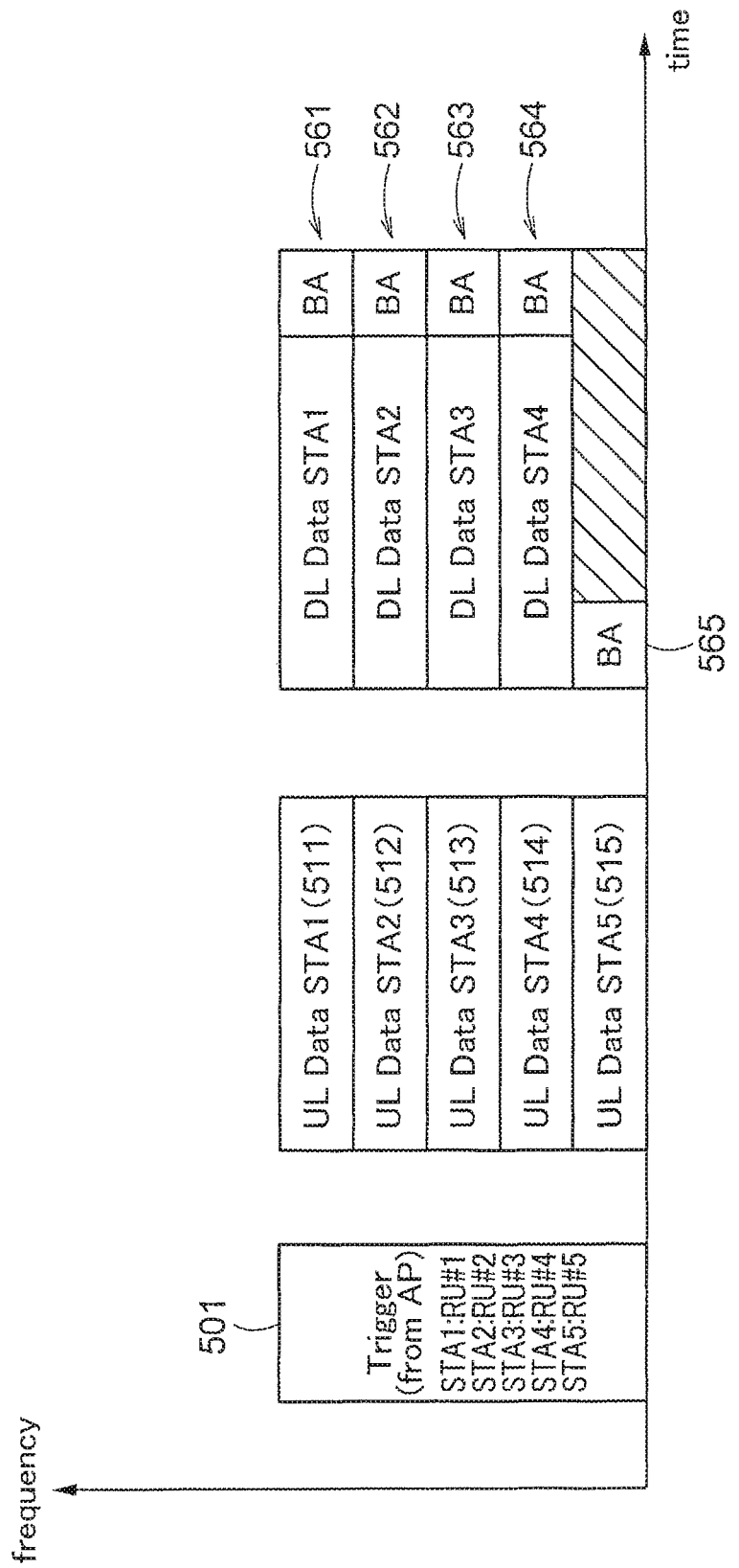
FIG. 16 illustrates another example sequence according to some embodiments.

Referring to FIG. 13, in the case where the AP determines that there is a transmission frame for at least one target STA in step S102, the AP determines whether there are more than one target STAs for which no transmission frame exists (S104). When there is only one target STA for which no transmission frame exists (e.g., there are more than one target STAs for which a transmission frame exists), the AP determines to transmit aggregation frames generated by aggregating acknowledgement response frames (such as BA frames) and transmission frames to the target STAs for which a transmission frame exists by utilizing respective resource units, and determines to transmit an acknowledgement response frame (such as a BA frame) to the target STA for which no transmission frame exists by utilizing the resource unit assigned to the target STA (S106). This determination is done because it is not possible to aggregate acknowledgement frames for a plurality of STAs and to improve efficiency when there is only one target STA for which no transmission frame exists. The AP performs DL-OFDMA transmission based on this determination after the elapse of a certain period of time (such as SIFS) from the reception completion of the data frames 511 to 515 transmitted by UL-OFDMA (S107). FIG. 16 illustrates an example sequence of this case. The AP transmits aggregation frames 561 to 564 to the STAs 1 to 4 and the BA frame

565 to the STA 5 (DL-OFDMA transmission). In some embodiments, as shown in FIG. 16, padding data is added to the end of the BA frame 565.

Figure 17:
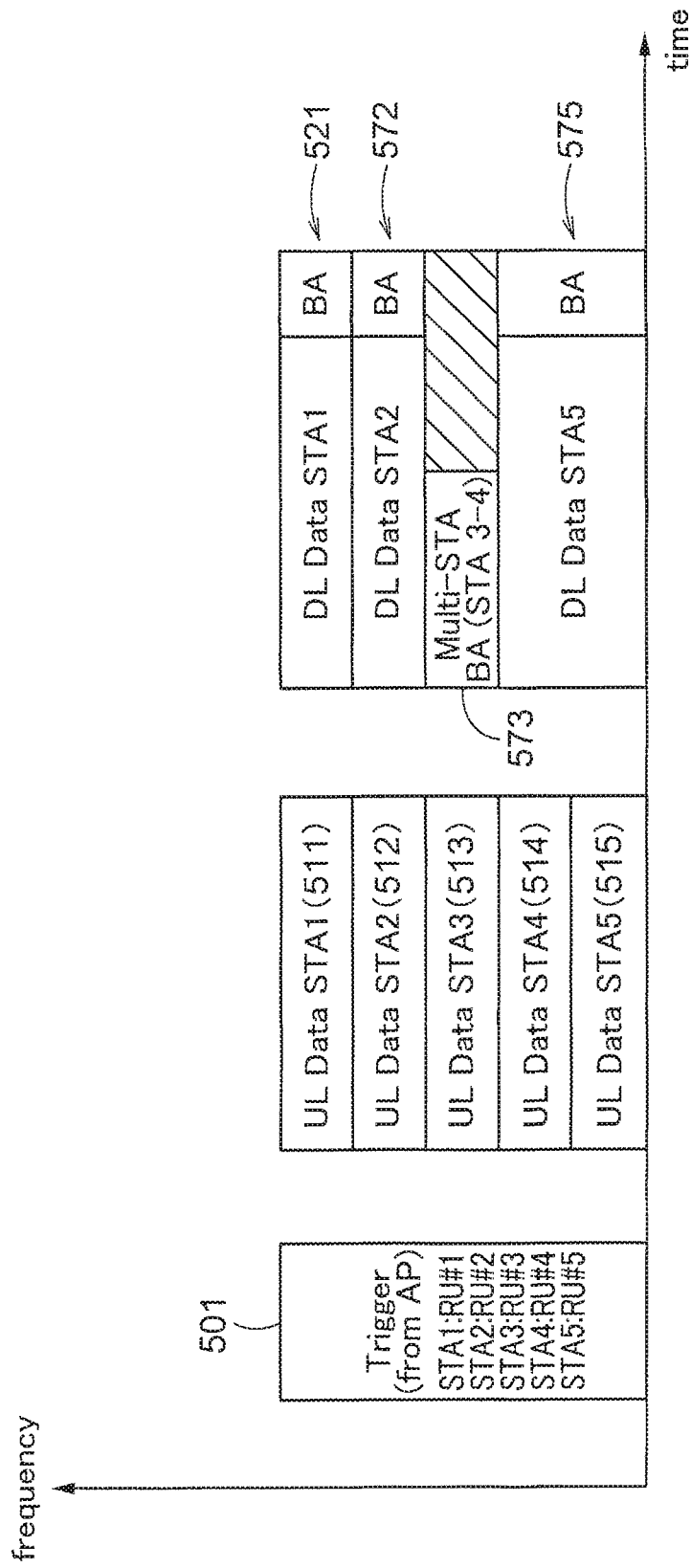
FIG. 17 illustrates another example sequence according to some embodiments.

Referring to FIG. 13, in the case where the AP determines that there are more than one target STAs for which no transmission frame exists, the AP determines to transmit a frame (e.g., Multi-STA BA frame) that includes acknowledgement response frames for the target STAs with no transmission frame to them, and determines to transmit aggregation frames generated by aggregating transmission frames and acknowledgement frames to target STAs for which a transmission frame exists (S105). Moreover, the AP determines a resource unit to transmit the Multi-STA BA frame and a resource unit to transmit the aggregation frames (S105). It is possible to create a space in resource units by including acknowledgement responses for a plurality of STAs to one Multi-STA BA frame and by assigning the Multi-STA BA frame to one resource unit. Therefore, at least one of aggregation frames may be assigned to a resource unit created by bonding more than one resource units. The AP performs DL-OFDMA transmission based on the decision after the elapse of a certain period of time (such as SIFS) from the reception completion of the data frames 511 to 515 transmitted by UL-OFDMA. FIG. 17 illustrates an example sequence of this case. The AP transmits aggregation frames 571 and 572 to the STAs 1 and 2 by utilizing the resource units utilized by UL-OFDMA transmission of STAs 1 and 2, and transmits the Multi-STA BA frame 573 that includes acknowledgement responses for the STAs 3 and 4 by utilizing the resource unit utilized by UL-OFDMA transmission of the STA3, and transmits the aggregation frame 575 to the STA 5 by utilizing a resource unit created by bonding two resource units utilized by UL-OFDMA transmission of the STAs 4 and 5. In some embodiments, the identification of the resource unit created by bonding may be a newly defined identification, or may be expressed by utilizing the identifications of the two resource units before bonding and information that indicates the bonding. In some embodiments, padding data is added to the end of the Multi-STA BA frame 573 such that the Multi-STA BA frame has the same length as the aggregation frames. The STA 5 can transmit more data because it can utilize more communication resource compared to the STAs 1 and 2. In this way, it is possible to improve efficiency of DL-OFDMA.

Figure 18:
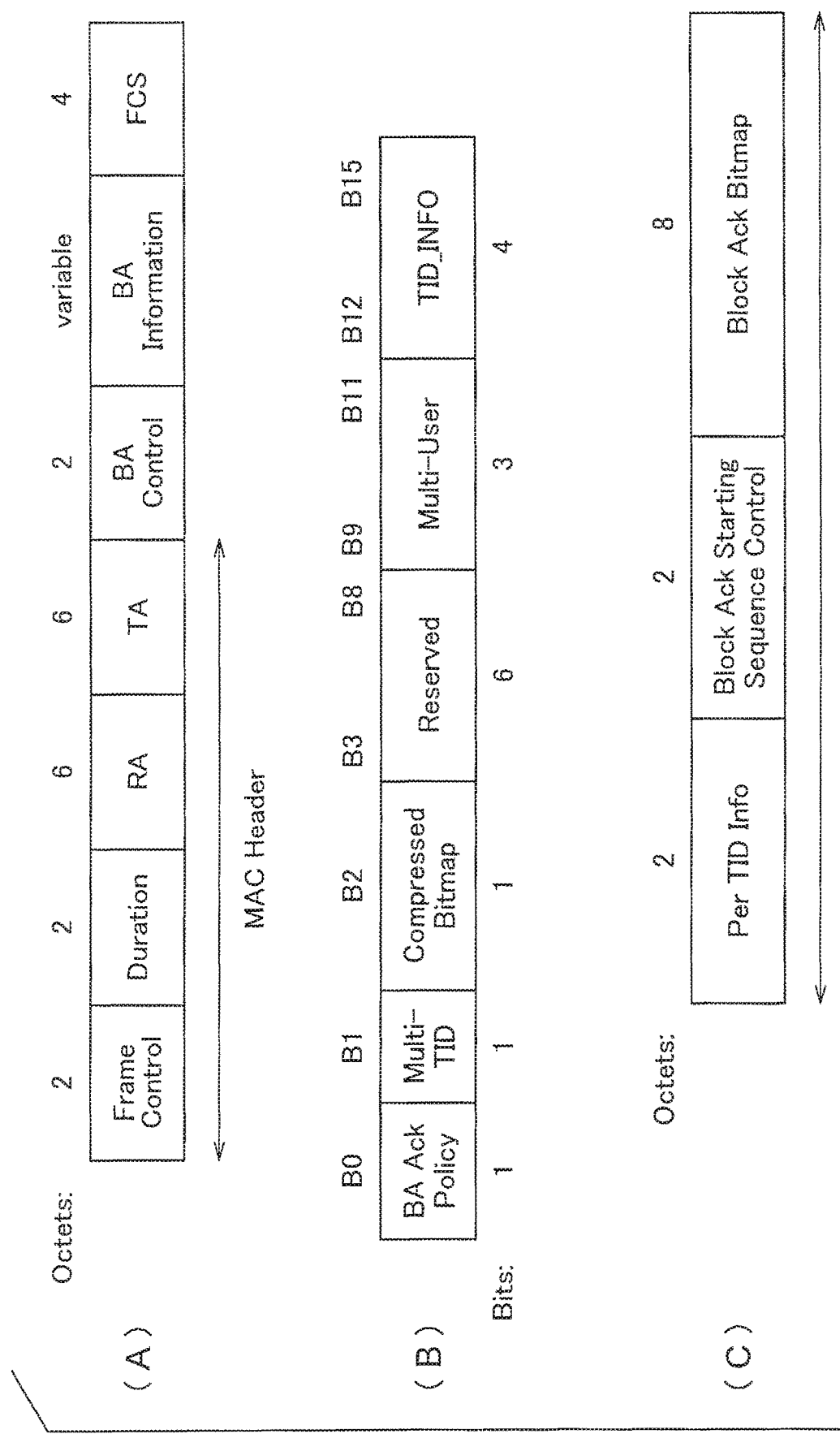
FIG. 18 illustrates a figure for explaining the Multi-STA BA frame.

Here, it describes the Multi-STA BA frame. The Multi-STA BA frame is a frame that is diverted from a Block Acknowledgement frame (BA frame) in order to notify acknowledgement responses for a plurality of STAs by one frame. When the Multi-STA BA frame is diverted from a BA frame, as like a common BA frame, the frame type of the Multi-STA BA frame can be control frame and the frame subtype of the Multi-STA BA frame can be BlockAck. FIG. 18(A) illustrates an example format of the Multi-STA BA frame diverted from a BA frame. FIG. 18(B) illustrates as example format of BA control field in a BA frame. FIG. 18(C) illustrates an example format of BA information field in a BA frame. In some embodiments, when diverting from a BA frame, it may be specified in the BA control field that the Multi-STA BA frame is an extended BA frame format in order to notify acknowledgement responses for a plurality of STAs. For example, in IEEE802.11 standard, the case where Multi-TID subfield is 1 and compressed bitmap subfield is 0 is reserved currently. The case may be utilized to specify that it is an extended BA frame format in order to notify acknowledgement responses for a plurality of STAs. In FIG. 18(B), bit area of B3 to B8 is a reserved subfield, a part of or all of the area may be utilized to define that it is an extended BA frame format in order to notify acknowledgement responses for a plurality of STAs. Some embodiments, may not notify this kind of notification explicitly.

In some embodiments, the RA field in the BA frame may be broadcast address, multicast address, or unicast address of one of STAs designated by the trigger frame. In some embodiments, in the Multi-User subfield of the BA Control field, it may set the number of users (STAs) that are reported by the BA information field. In the BA information field, for each user (STA), it sets a subfield for setting Association ID (AID) (e.g., Per TID Info in FIG. 18(C)), Block Ack Starting Sequence Control subfield and Block Ack Bitmap subfield.

In the Association ID (Per TID Info) subfield, AID is set in order to identify users. In some embodiments, when a frame transmitted by a STA is one data frame (e.g., non-aggregation frame), Block Ack Starting Sequence Control subfield and Block Ack Bitmap subfield may be omitted. When a frame transmitted by a STA is an aggregation frame, a sequence number of the first MSDU (medium access control (MAC) service data unit) of acknowledgement response specified by the BlockAck frame is set in the Block Ack Starting Sequence Control subfield. In some embodiments, in the Block Ack Bitmap subfield, it can set a bitmap (e.g., BlockAck bitmap) that includes bits representing reception success or failure of each sequence number of Block Ack Starting Sequence number or later. The STA that receives the Multi-STA BA frame checks the type and the subtype of the frame control field. If these fields represents Control and BlockACK respectively, the STA checks the RA field (e.g., a field that includes broadcast address), and confirms transmission success or failure of each data frame by identifying acknowledgement response (e.g., success or failure) for each data frame included in the frame (e.g., aggregation frame) transmitted by the STA from the Block Ack Bitmap field. For example, the STA identifies the TID Info subfield that includes the STA's AID from the BA information field, and identifies a value (e.g., starting sequence number) set in the Block Ack Starting Sequence Control subfield following the identified TID Info subfield, and identifies transmission success or failure of each sequence number of starting sequence number or later from the Block Ack Bitmap. In some embodiments, the bit length of the AID may be shorter than the length of the TID Info subfield. For example, the AID may be included in a part of the TID Info subfield (for example, 11 bits (B0-B10) from the top among two octets (16 bits)).

In some embodiments, when pluralities of STAs transmit one data frame for UL-OFDMA instead of aggregation frame, a BA frame may be diverted as follows. The BA frame utilizes one bit of the TID Info subfield of each BA information field (for example, 12-th bit from the beginning (B11 when the beginning is B0) among 2 octets (16 bits))) as a bit to indicate ACK or BA (ACK/BA bit), and sets ACK in the bit. In some embodiments, when a value to indicate ACK is set, the Block Ack Starting Sequence Control subfield and the Block Ack Bitmap subfield are omitted. In this way, it is possible to notify ACK for the plurality of STAs by utilizing one BA frame. As described before, in the case where pluralities of STAs transmit aggregation frames, it sets a value to indicate BA to ACK/BA bit. In this way, it is possible to perform acknowledgement response for the plurality of STAs by diverting a BA frame when the pluralities of STAs transmit either aggregation frame or one data frame.

As one example of process by STA after a data frame is transmitted by a resource unit, the STA receives a signal from the AP, and searches the STA's AID and resource unit information from SIG1 field of the received signal. In some embodiments, when there is not the subject STA's AID, the subject STA may receive the Multi-STA BA frame by decoding resource unit designated as broadcast or multicast (resource unit to which broadcast ID or multicast ID is specified). The receiver address of the Multi-STA BA frame is broadcast address or multicast address.

Figure 19:
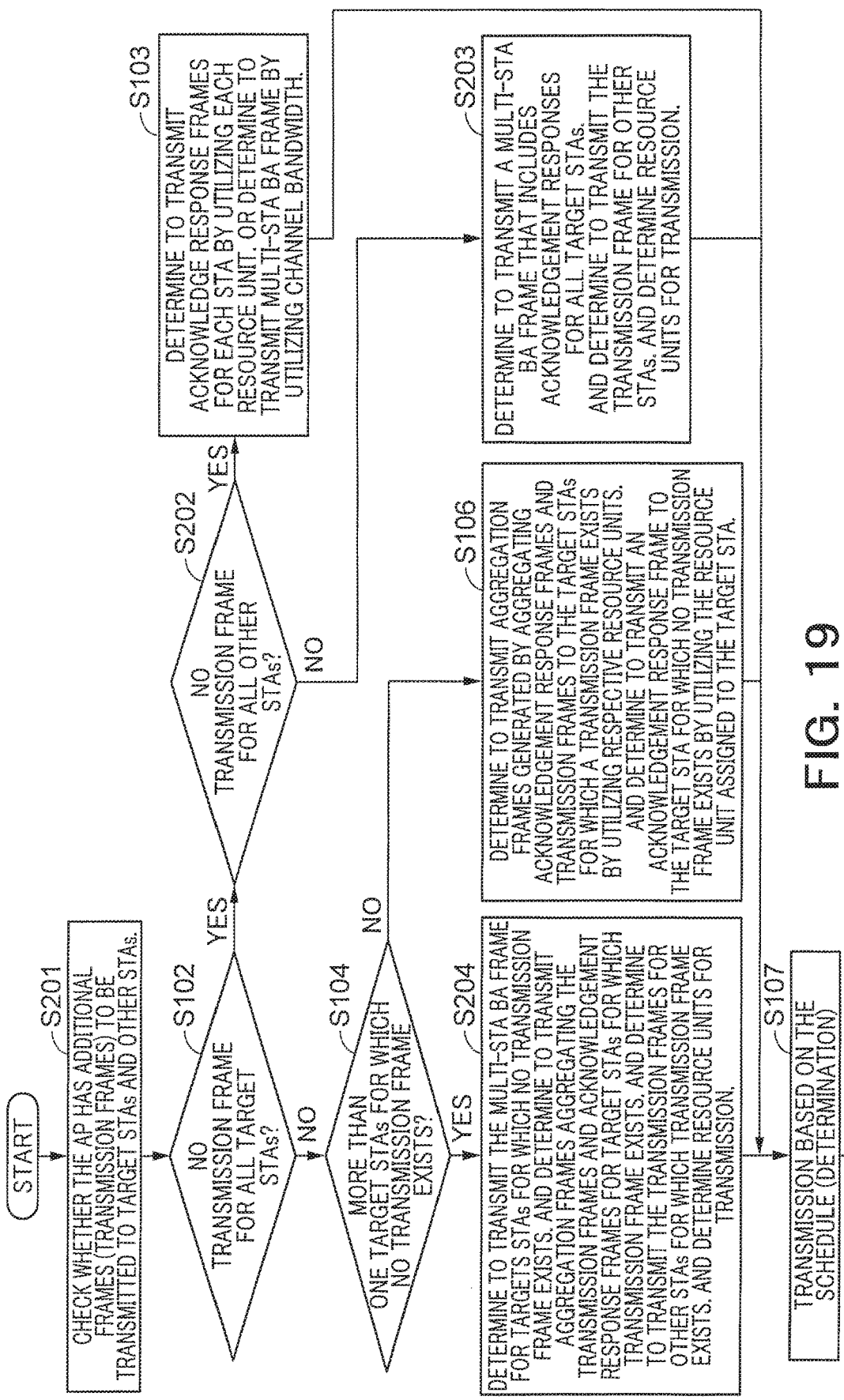
FIG. 19 illustrates a flowchart of other scheduling example by the AP according to some embodiments.
Figure 20:
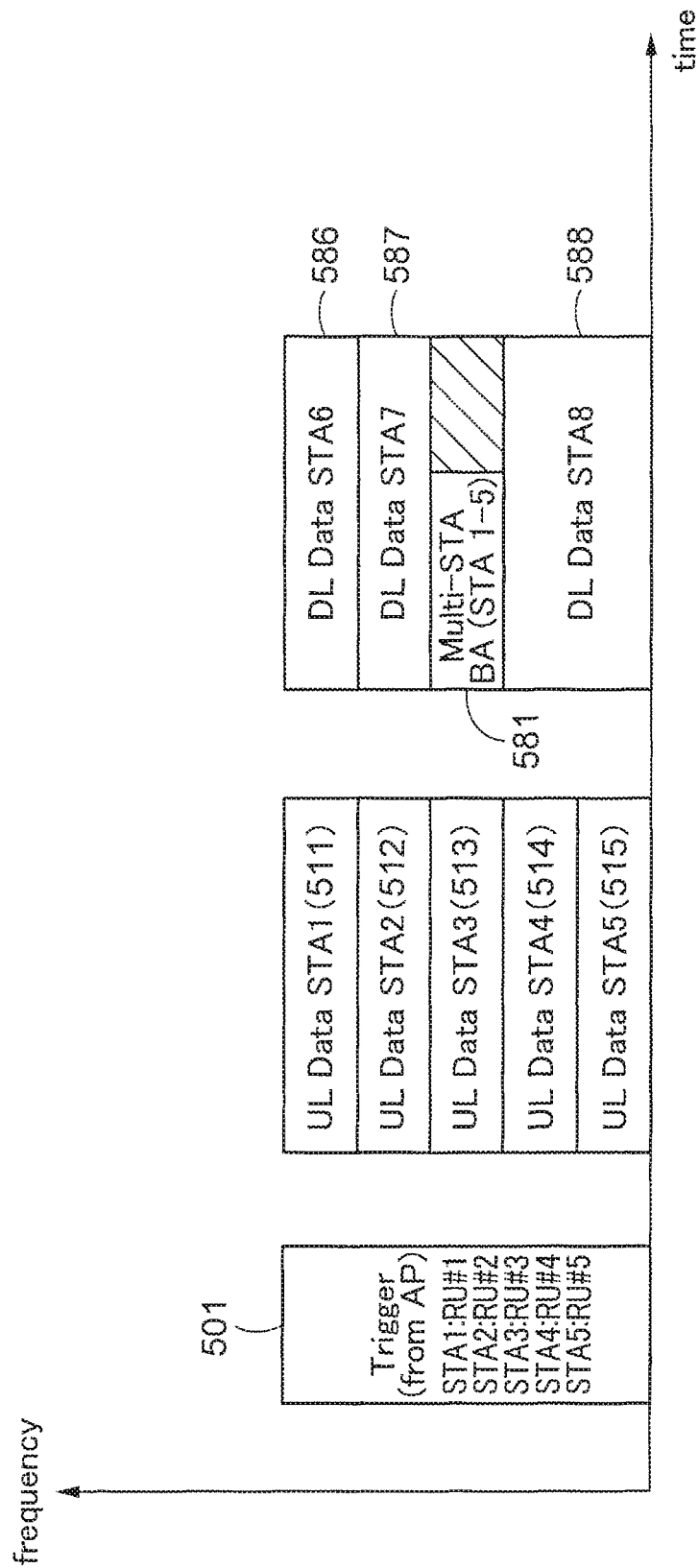
FIG. 20 illustrates another example sequence according to some embodiments.

FIG. 19 illustrates a flowchart of other scheduling example of DL-OFDMA performed by the AP according to some embodiments. In the flowchart of FIG. 13, in step S101, the AP checks whether the AP has a frame to be transmitted (e.g., transmission frame) to each target STA (e.g., STA designated by a trigger frame or STA that has performed UL-OFDMA transmission). In the flowchart of FIG. 19, the AP also checks whether the AP has a transmission frame for STAs that are not designated by a trigger frame (e.g., other STAs) (S201). In the case where there is no transmission frame for all target STAs (YES in S102) and there is no transmission frame for all other STAs (YES in S202), the AP performs S101 as in the case with FIG. 13. In some embodiments, in the case where there is no transmission frame for all target STAs (YES in S102) and there is a transmission frame for one or more other STAs (NO in S202), the AP determines to transmit a frame that includes acknowledgement responses for all target STAs (Multi-STA BA frame), and determines to transmit the transmission frame for other STAs to which the transmission frame is addressed (S203). Moreover, the AP determines a resource unit to transmit the Multi-STA BA frame and a resource unit to transmit the transmission frame (S203). In some embodiments, the AP may designate one resource unit to the Multi-STA BA frame. For the other STAs to which the transmission frame is transmitted, the AP may determine resource units to be designated based on the number of the other STAs and usable resource units. In the case where one resource unit is designated to the Multi-STA BA frame, as one example, the maximum number of the other STAs that can be designated is a value that is obtained by subtracting one from the number of usable resource units. In some embodiments, based on the decision, the AP performs DL-OFDMA transmission after the elapse of a certain period of time (such as SIFS) from the reception completion of the data frames 511 to 515 transmitted by UL-OFDMA. FIG. 20 illustrates the sequence in this case.

In FIG. 20, the AP transmits the Multi-STA BA frame 581 that includes acknowledgement responses for STAs 1 to 5 by utilizing the resource unit that the STA 3 has utilized for UL-OFDMA transmission. The AP transmits data frame 586 for the STA 6 by utilizing the resource unit that the STA 1 has utilized for UL-OFDMA transmission. The AP transmits data frame 587 for the STA 7 by utilizing the resource unit that the STA 2 has utilized for UL-OFDMA transmission. The AP transmits data frame 588 for the STA 8 by utilizing the resource unit that is bonding resource units that the STA 4 and the STA 5 have utilized for UL-OFDMA transmission. In some embodiments, the data frames 586 to 588 may be an aggregation frame that is aggregating a plurality of data frames, or may be one data frame. The address of the data frames 586 to 588 are the address of STAs 6 to 8, respectively. They are different from the addresses of the STAs 1 to 5 that have performed UL-OFDMA transmission. In some embodiments, the padding data is added to the end of the Multi-STA BA frame 581 such that the frame length becomes equal to the other frames 586 to 588.

Figure 21:
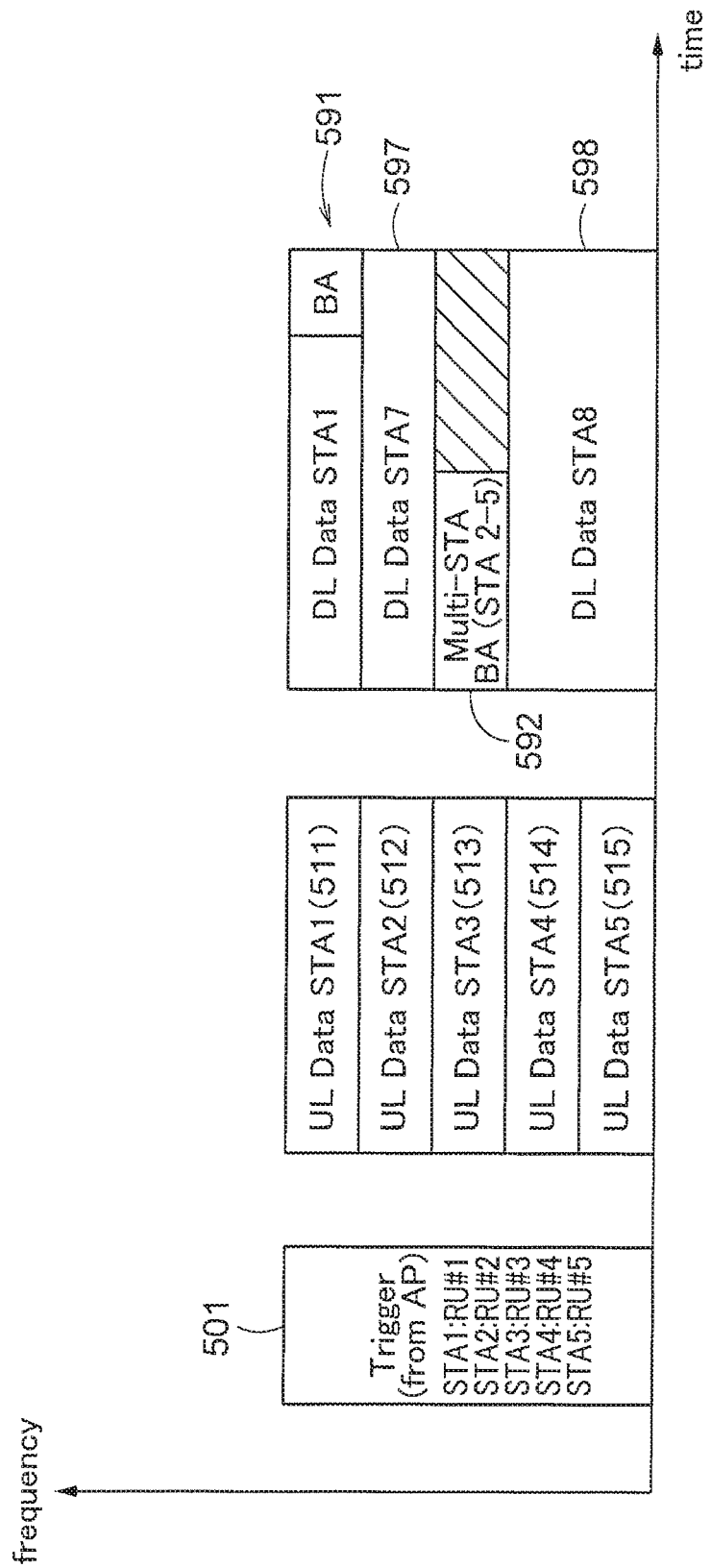
FIG. 21 illustrates another example sequence according to some embodiments.

Referring to FIG. 19, when the AP has a transmission frame for at least one of target STAs (NO in S102) and the number of target STAs for which the AP does not have a transmission frame is one (NO in S104), the AP performs step S106 as in the case with FIG. 13. In some embodiments, when the AP has a transmission frame for other STAs, the AP may generate an aggregation frame by aggregating the transmission frame for other STAs and the acknowledgement response frame (such as BA frame) for the single target STA. In some embodiments, when the number of target STAs for which no transmission frame exists is more than one (YES in S104), the AP determines to transmit the Multi-TA BA frame for targets STAs for which no transmission frame exists, and to transmit aggregation frames aggregating the transmission frames and acknowledgement response frames for target STAs for which transmission frame exists, and to transmit the transmission frames for other STAs for which transmission frame exists (S204). Moreover, the AP determines a resource unit to transmit the Multi-STA BA frame, a resource unit to transmit the aggregation frames, and a resource unit to transmit the transmission frames for the other STAs (S204). It is possible to designate more resource units in preference to target STAs compared to other STAs, and is possible to avoid selecting other STAs as a target of DL-OFDMA. Based on the decision, the AP performs DL-OFDMA transmission after the elapse of a certain period of time (such as SIFS) from the reception completion of the data frames 511 to 515 transmitted by UL-OFDMA (S107). FIG. 21 illustrates the sequence in this case.

In FIG. 21, the AP transmits the aggregation frame 591 to the STA 1 by utilizing the resource unit that the STA 1 has utilized for UL-OFDMA transmission. The AP transmits the Multi-STA BA frame 592 that includes acknowledgement responses for the STAs 2 to 5 by utilizing the resource unit that the STA 3 has utilized for UL-OFDMA transmission. The AP transmits the data frame 597 to the STA 7 that is one of other STAs by utilizing the resource unit that the STA 2 has utilized for UL-OFDMA transmission. The AP transmits the data frame 598 to the STA 8 that is one of other STAs by utilizing the resource unit that is bonding two resource units that the STAs 5 and 6 have utilized for UL-OFDMA transmission. In some embodiments, the data frames 597 and 598 may be an aggregation frame aggregating a plurality of data frames, or may be single data frame. In some embodiments, the padding data is added to the end of the Multi-STA BA frame 592 such that the frame length becomes equal to the other frames 591, 597 and 598. In some embodiments, the AP may transmit the aggregation frame 591 instead of transmitting the data frame 597 by bonding two resource units that the STAs 1 and 2 have utilized for UL-OFDMA transmission.

At S105 of FIG. 13 and S203 and S204 of FIG. 19, the AP aggregates acknowledgement responses for a plurality of STAs to single Multi-STA BA frame, and transmits the single Multi-STA BA frame by utilizing single resource unit. In this case, in some embodiments, the utilized resource unit satisfies transmission quality of MCS that is necessary to transmit the frame for the plurality of STAs. The details are described later.

When the AP performs UL-OFDMA or DL-OFDMA with each STA, the AP measures transmission quality of a plurality of resource units between the AP and each STA beforehand. For example, the transmission quality is SNR (Signal to Noise Ratio) and so on. It can be considered to designate resource units for each STA by utilizing a predefined relationship between a range of transmission quality and usable MCS. In some embodiments, in the case where single Multi-STA BA frame is transmitted, the AP may utilize the resource unit that satisfies transmission quality of MCS necessary to transmit the Multi-STA BA frame for any one of the plurality of STAs.

In some embodiments, the resource unit may be selected among the resource units that pluralities of STAs have utilized for UL-OFDMA transmission. In some embodiments, the resource unit in which an aggregation frame (aggregation of transmission frame and BA frame) is to be transmitted to a STA by DL-OFDMA may be excluded from selection targets, as a general rule that the resource unit is utilized by the STA.

In some embodiments, if there is no resource unit that satisfies transmission quality commonly for the plurality of STAs to which the Multi-STA BA frame is transmitted, the AP may transmit acknowledgement responses for the plurality of STAs separately by utilizing a plurality of Multi-STA BA frames. Here, it may transmit a BA frame only for single STA by utilizing the resource unit designated to the single STA (resource unit that the single STA has utilized in UL-OFDMA), and may transmit the Multi-STA BA frame for a plurality of STAs other than the single STA by utilizing the resource unit that commonly satisfies transmission quality of MCS necessary for the plurality of STAs.

Figure 22:
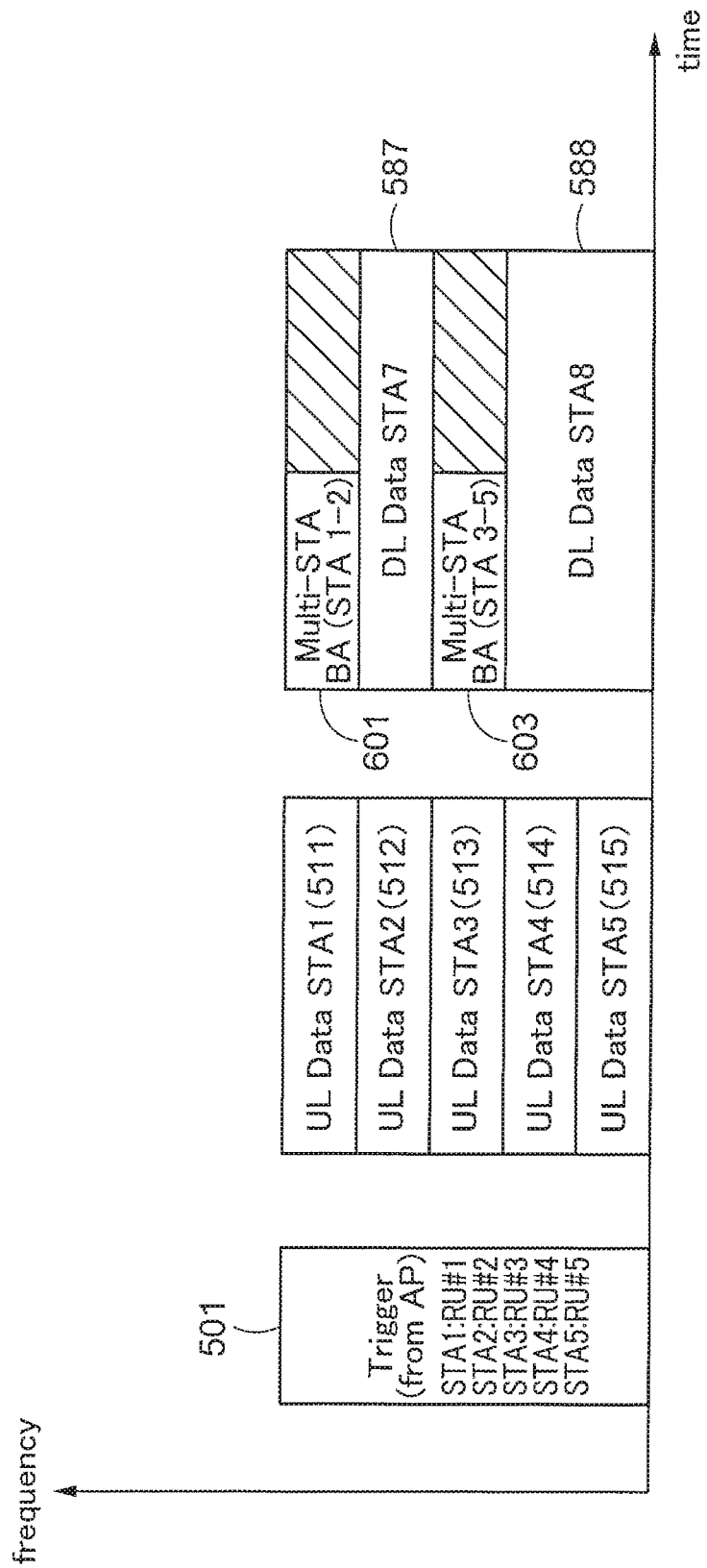
FIG. 22 illustrates another example sequence according to some embodiments.

FIG. 22 illustrates a variation example of the sequence in FIG. 20 that transmits Multi-STA BA frame for STAs 1 to 5 by dividing into two frames. In FIG. 22, the AP transmits the Multi-STA BA frame 603 that includes acknowledgement responses for the STAs 3 to 5 by utilizing the resource unit that STA 3 has utilized for UL-OFDMA transmission. As for the STAs 1 and 2, the AP transmits the Multi-STA BA frame 601 that includes acknowledgement responses for the STAs 1 and 2 by utilizing the resource unit for the STA 1, when transmission quality of the resource unit for STA 3 does not satisfy transmission quality of necessary MCS. Although, in the sequence of FIG. 20, the AP transmits the data frame 586 to the STA 6 by utilizing the resource unit for the STA 1, in the sequence of FIG. 22, the AP does not transmit a data frame for the STA 6, because the Multi-STA BA frame 601 is transmitted in the resource unit. In some embodiments, the padding data is added to the end of the Multi-STA BA frames 601 and 603 such that the frame length becomes equal to the other frames 587 and 588.

In this way, it is possible to get resource units that are not in use by aggregating acknowledgement responses for a plurality of STAs, and to transmit data frames for other STAs additionally by utilizing the resource units that are not in use.

Figure 23:
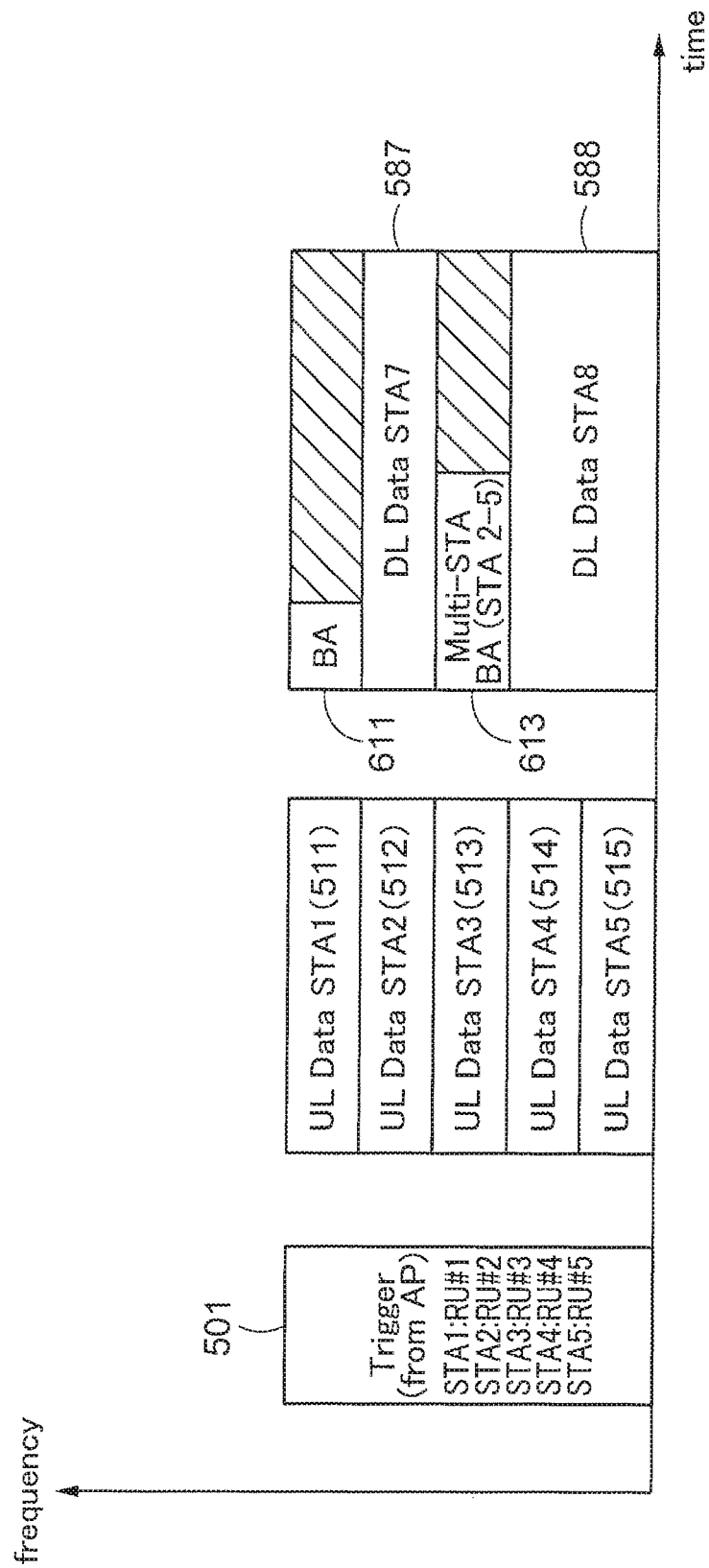
FIG. 23 illustrates another example sequence according to some embodiments.

In the example of FIG. 22, the AP transmits two Multi-STA BA frames. In some embodiments, in the case where only single STA (for example, STA 1) does not satisfy a criterion of transmission quality of MCS necessary for transmitting the Multi-STA BA frame by the resource unit for the STA 3, the AP may transmit an ordinary BA frame for the STA 1. FIG. 23 illustrates an example sequence of this case. The AP transmits BA frame 611 by utilizing the resource unit for the STA 1 (e.g., a resource unit that STA 1 has utilized for UL-OFDMA), and transmits the Multi-STA BA frame 613 that includes acknowledgement responses for STAs 2 to 5 by utilizing the resource unit for STA 3.

In some embodiments, when selecting resource units to transmit Multi-STA BA frames, the AP may select resource units that are not able to be bonded with other resource units. Among a plurality of resource units utilized for OFDMA, there may be resource units that are not able to be bonded with other resource units because of bonding rule of resource units. For example, there is a case where a resource unit that includes two frequency components positioned both sides of DC component in the frequency is not able to be bonded to other resource units. This kind of resource units may only be used without bonding. In some embodiments, by preferentially selecting that kind of resource units as the resource units for Multi-STA BA frames, it is possible to enhance a possibility that the AP can utilize the resource units created by bonding for STAs to which other frames such as data frames and aggregation frames are transmitted, and is possible to perform more flexible resource unit assignment.

Figure 24:
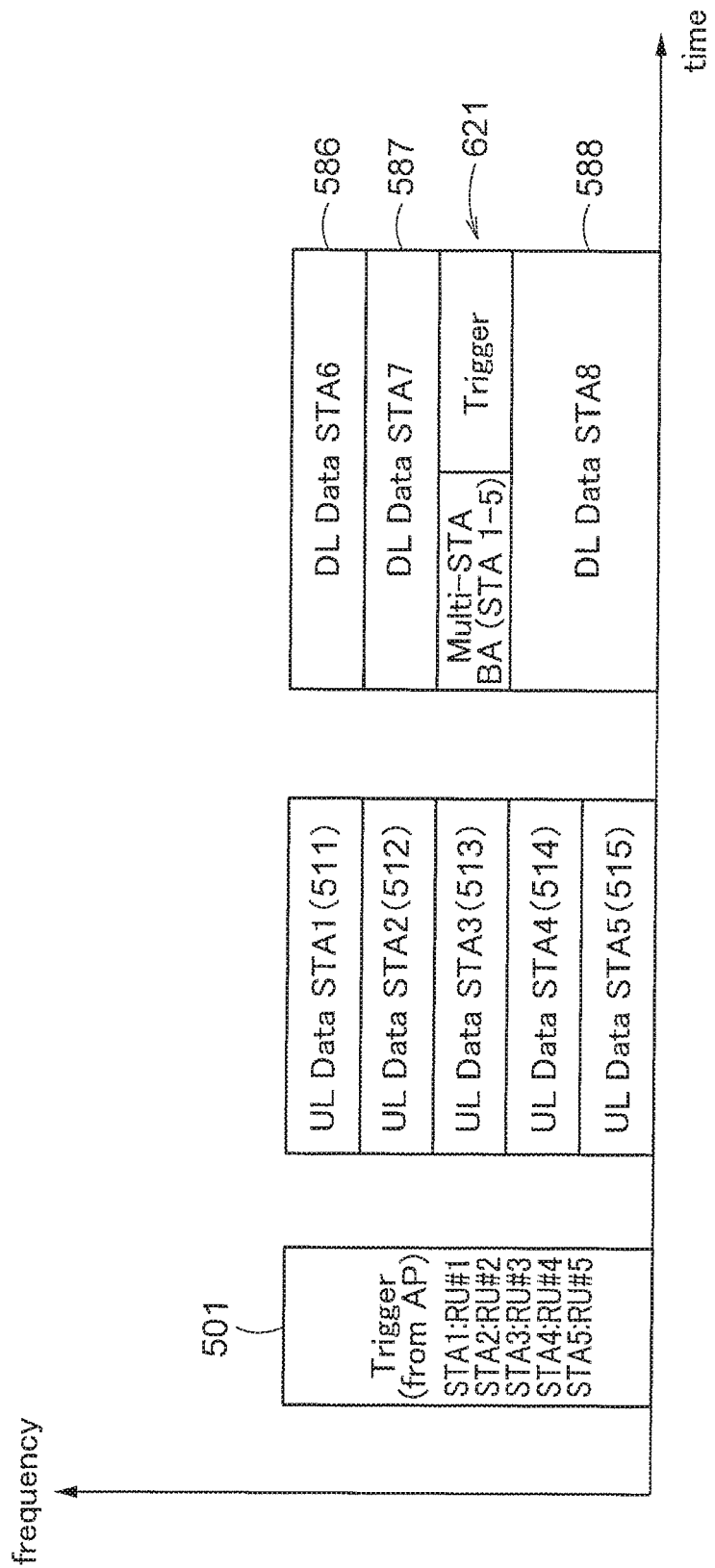
FIG. 24 illustrates another example sequence according to some embodiments.

At step S101 of FIG. 13 and step S203 and S204 of FIG. 19, the AP transmits the Multi-STA BA frame as single frame. It is possible to generate an aggregation frame by aggregation the Multi-STA BA frame and other types of frame, and to transmit the aggregation frame. In this case, in some embodiments, the AP may aggregate a trigger frame as the other types of frame. FIG. 24 illustrates an example to transmit the aggregation frame aggregating the Multi-STA BA frame and the trigger frame instead of transmitting the Multi-STA BA frame 581 in the sequence of FIG. 20. The AP transmits the aggregation frame 621 aggregating the Multi-STA BA frame that includes acknowledgement responses for the STAs 1 to 5 and the trigger frame. In this trigger frame, as one example, the AP designates a part of or all of STAs 1 to 5 as target STAs to which UL-OFDMA transmission (not illustrated) is permitted after the elapse of a certain period of time from the completion of the DL-OFDMA. It is also possible to designate a part of or all of STAs 6 to 8 as well as a part of or all of STAs 1 to 5, as target STAs. The configuration of the trigger frame may be the same as the examples in FIG. 8 to FIG. 10. In this way, it is possible to utilize resource units effectively and enhance communication efficiency.

Figure 25:
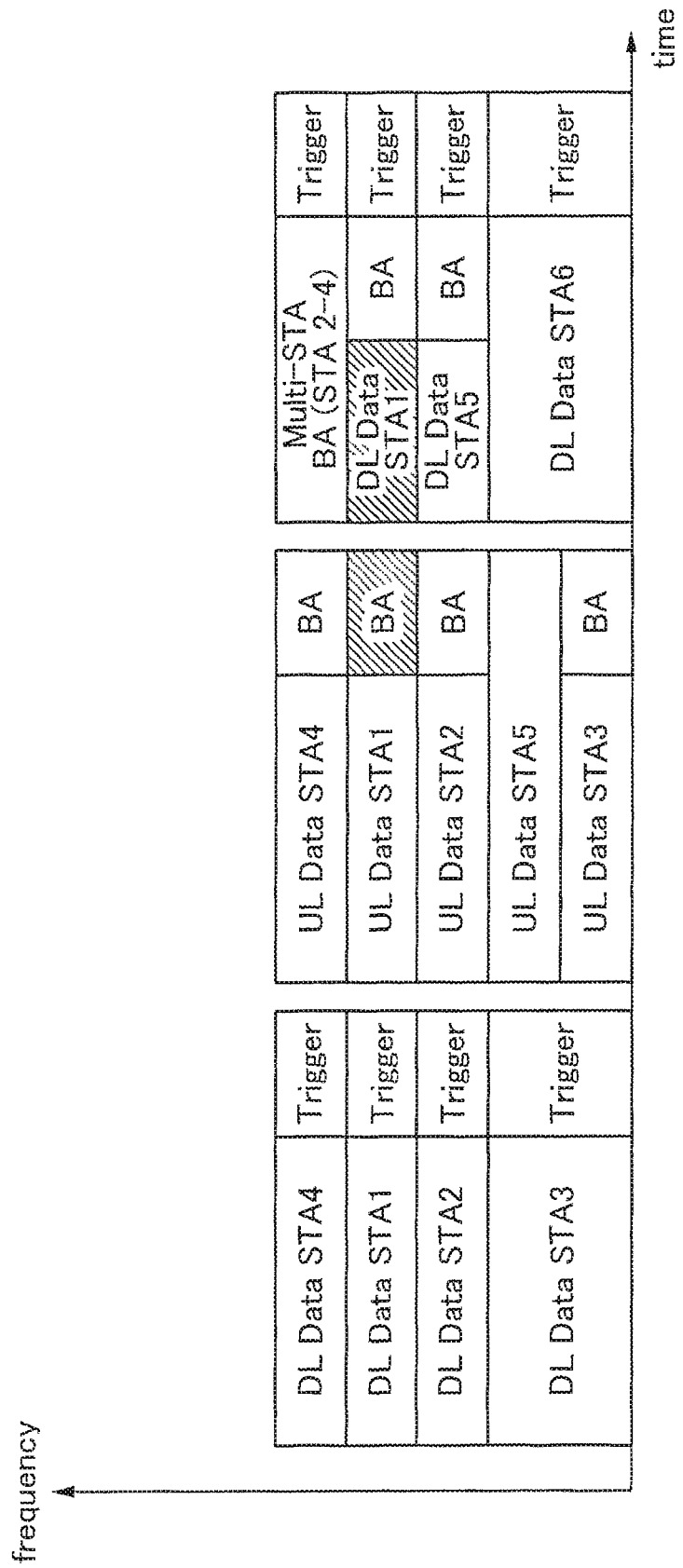
FIG. 25 illustrates another example sequence according to some embodiments.

In the previous description, it shows the basic sequence that the AP transmits the trigger frame, and pluralities of STAs perform UL-OFDMA transmission in response to the trigger frame, and the AP performs DL-OFDMA transmission in response to the UL-OFDMA. The timing of DL-OFDMA performed by the AP is not limited to this sequence. For example, the AP may acquire the access right (e.g., transmission right) by carrier sense based on CSMA/CA, and may perform DL-OFDMA transmission based on the access right. In DL-OFDMA transmission, there are various variations such as the way that the AP transmits aggregation frames that include a trigger frame for each resource unit. In this sequence, it is also possible to improve efficiency by transmitting a Multi-STA BA frame that includes acknowledgement responses for a plurality of STAs by utilizing one resource unit. FIG. 25 illustrates an example of this sequence.

The AP transmits the aggregation frames by DL-OFDMA by utilizing resource units respectively different for STA 4, STA 1, STA 2 and STA3. The STA 3 utilizes a resource unit bonding two resource units. Each aggregation frame includes a plurality of data frames and a trigger frame. In some embodiments, the trigger frames may be the same content for all STAs, or may be different content for each STA. As one example, the trigger frame for the STA 4 may designate the STA 4 and the resource unit that the STA 4 utilizes, the trigger frame for the STA 1 may designate the STA 1 and the resource unit that the STA 1 utilizes, the trigger frame for the STA 2 may designate the STA 2 and the resource unit that the STA 2 utilizes, and the trigger frame for the STA 3 may designate the STAs 3 and 5 and the resource units that the STA 3 and 5 utilize respectively. In this case, the receiver addresses of trigger frames for STAs 4, 1 and 2 are MAC addresses of STAs 4, 1 and 2, and the receiver address of trigger frame for STA 3 may be broadcast address or multicast address. In the predetermined region (such as SIG1 field in FIG. 11) of PHY header added to the beginning of frames transmitted by DL-OFDMA, the trigger frame may contain identification of STA (such as AID) and identification of resource unit that is to be decoded by the STA by associating them each other. In some embodiments, in the case where all STAs are required to decode a specific resource unit, the trigger frame may define an ID to designate all STAs (e.g., broadcast ID), and may set the broadcast ID and identification of the specific resource unit by associating them each other.

The STAs 4, 1, 2, 5 and 3 receive a signal transmitted from the AP, and identify and decode resource units to be decoded from PHY header, and acquire aggregation frames. The STAs 4, 1, 2, and 3 perform CRC check of data frames in the aggregation frames, and generates BA frames in accordance to the check results. They also generate frames (e.g., a plurality of data frames) for uplink transmission according to the trigger frames in the aggregation frames. They generate aggregation frames aggregating the plurality of data frames and the BA frames. The STA 5 generates a frame (e.g., aggregation frame aggregating a plurality of data frames) according to the trigger frame in the aggregation frame. The STAs 4, 1, 2, 5, and 3 transmit the aggregation frames respectively after the elapse of a certain period of time from the reception completion of DL-OFDMA. In this way, UL-OFDMA is performed. In some embodiments, in the case where the STA receives the data frames in the aggregation frames from the AP and the subject STA is not specified in the trigger frame of the aggregation frame, it can be considered that the subject STA is allowed to transmit only an acknowledgement response frame (such as an BA frame) after the elapse of a certain period of time (such as SIFS).

The AP receives the aggregation frames transmitted from these STAs by UL-OFDMA. Here, it is assumed that the AP fails to receive the BA frame of the aggregation frame from the STA 1 (e.g., the shaded part of BA frame in FIG. 25). The AP generates a frame for each STA that is targeted for the next DL-OFDMA transmission according to the scheduling. Here, there is no data frame additionally transmitted for the STAs 2, 3 and 4, therefore, the AP generates the Multi-STA BA frame that includes acknowledgement responses of the STAs 2, 3 and 4, and generates an aggregation frames aggregating the Multi-STA BA frame and a trigger frame. For the STA 1, the AP generates the aggregation frame by aggregating the BA frame that includes an acknowledgement response of the STA 1, a retransmission frame for the frame that is failed in transmission (e.g., shaded part of data frame for STA 1 in FIG. 25), and a trigger frame. For the STA 5, there is a data frame to be transmitted additionally to the STA 5. Therefore, it generates an aggregation frame by aggregating the data frame, the BA frame that includes an acknowledgement response for the STA 5 and the trigger frame. Moreover, there is a data frame that is to be transmitted to the STA 6. Therefore, the AP generates an aggregation frame by aggregating the data frame and the trigger frame. The trigger frame included in each aggregation frame may be the same content, or may be different each other. The AP transmits these aggregation frames after the elapse of a certain period of time from the reception completion of UL-OFDMA. In this way, it performs UL-OFDMA. In this sequence, in some embodiments, it is also possible to increase usable resource units and is possible to perform effective transmission by transmitting the Multi-STA BA frame. Here, the combinations or orders of frames in the illustrated aggregation frames are one examples, it is not limited to them. In this example, the AP retransmits the frame to the STA 1 that is failed in transmission. In some embodiments, The AP may transmit a BAR (Block Ack Request) frame instead.

Figure 26:
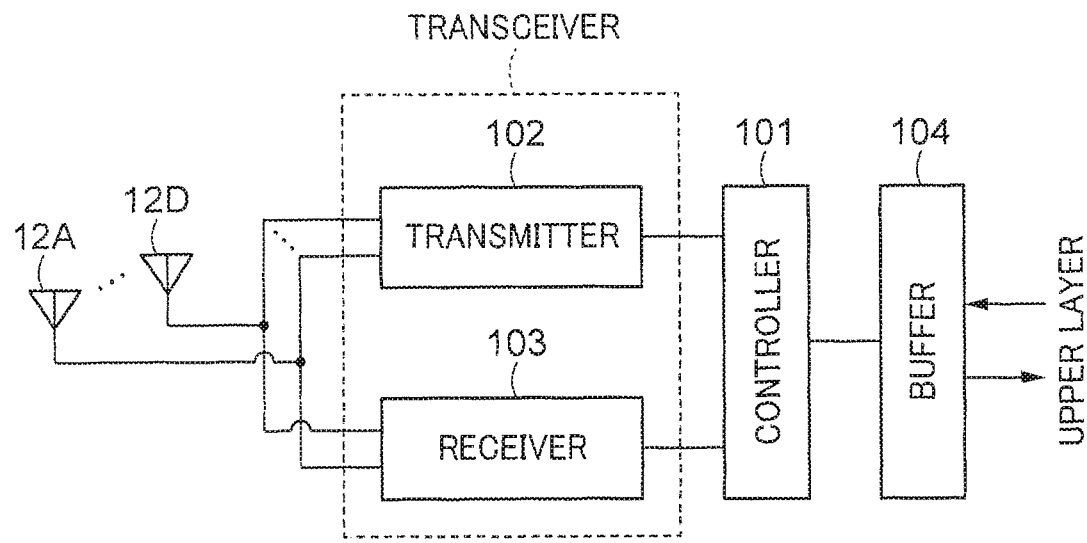
FIG. 26 illustrates a functional block diagram of a wireless communication device installed in the AP 11 according to some embodiments.

FIG. 26 illustrates a functional block diagram of a wireless communication device installed in the AP 11. As described before, the AP 11 connects with at least a network of the STAs 1 to 8 illustrated in FIG. 1. In some embodiments, the AP 11 can connect with another network. FIG. 26 illustrates a configuration of the wireless communication device connected with the network of the STAs 1 to 8.

The wireless communication device of the AP 11 includes a controller 101, a transmitter 102, a receiver 103 and antennas 12A, 12B, 12C, 12D, and a buffer 104. Here, the number of antennas is four. In some embodiments, the wireless communication device may include at least one antenna. The controller 101 corresponds to a controller in order to control communication with STAs, or baseband circuitry. The transmitter 102 and receiver 103 correspond to a transceiver in order to perform transmission and reception of frames via the antennas, or RF circuitry. In some embodiments, the process of the controller 101 and all or a part of digital domain processes of the transmitter 102 and the receiver 103 may be executed by software (program) that operates on a processor such as a CPU, may be executed by hardware or may be executed by both software and hardware. In some embodiments, The AP may include a processor to perform the process of the controller 101 and all or a part of processes of the transmitter 102 and the receiver 103. The buffer 104 is a storage device for transferring such as frames between an upper layer and the controller 101. In some embodiments, the buffer 104 may be a volatile memory such as a DRAM, or may be nonvolatile memory such as a NAND and MRAM. The upper layer stores frames received from the other network in the buffer 104 in order to relay them to the network of the STAs 1 to 8. The upper layer may receive frames or their payload received from the network of the STAs from the controller 101 via the buffer 104. The upper layer may perform the upper process of MAC layer such as TCP/IP and UDP/IP. In some embodiments, the controller 101 may perform TCP/IP and UDP/IP, and the upper layer may perform the process of application layer upper than these processes. In some embodiments, the process of the upper layer may be executed by software (program) that operates on a processor such as a CPU, may be executed by hardware or may be executed by both software and hardware.

In some embodiments, the controller 101 mainly performs the process of MAC layer and a part of process of PHY layer (for example, the process for OFDMA). The controller 101 controls communication with each STA by transmitting and receiving frames via the transmitter 102 and the receiver 103. In some embodiments, the controller 101 may control to transmit a beacon frame in order to notify STAs of such as attribution of BSS (Basic Service Set) of the AP and synchronization information, regularly. In some embodiments, the controller 101 may include a clock generator in order to generate a dock, and may manage inner time by utilizing the clock generated by the clock generator. The controller 101 may output the clock generated by the clock generator. In some embodiments, the controller 101 may receive a clock generated by an external clock generator, and may manage the inner time by utilizing the clock.

The controller 101 performs association process in response to association request from STAs, and establishes a wireless link with the STAs by exchanging necessary information such as capabilities and attribution of each other (it may include capability information that indicates whether it supports OFDMA). In some embodiments, the controller 101 may perform authentication process with the STAs beforehand, as needed. The controller 101 confirms the status of the buffer 104 by checking the buffer 104 regularly. In some embodiments, the controller 101 may confirm the status of the buffer 104 when a trigger is given from an external device such as the buffer 104.

In any timing, the controller 101 selects a plurality of STAs that are designated to perform UL-OFDMA among the STAs to which the AP has established the wireless link (STAs that has OFDMA capability). Moreover, it determines a packet length (such as PPDU length), MCS and any other parameters, as needed. The detailed are described before. In some embodiments, the controller 101 may notify STAs of the correspondence between resource units and their identifications, and information related to channels utilized by OFDMA, beforehand. The correspondence and the information may be defined by a system or specification. All or a part of the information may be notified by the trigger frame. The controller 101 sets information for designating selected STAs, information for designating resource units and other parameters, in the common information field or the STA information fields of the trigger frame or both of them. The controller 101 may set information for specifying TXOP for OFDMA sequence in the common information field of the trigger frame. The controller 101 may set the period in the duration/ID field as the medium reservation time.

The controller 101 transmits the generated trigger frame from the transmitter 102 by utilizing, for example, the 20 MHz channel width that a legacy STA can also receive. As one example, if the controller 101 acquires the access right of wireless medium by performing carrier sense according to CSMA/CS before transmission, the controller 101 outputs the trigger frame to the transmitter 102. The transmitter 102 generates PHY packet by performing desired PHY layer processes such as coding and modulation process of the inputted trigger frame and adding of PHY header. Moreover, the transmitter 102 performs such as DA conversion, filter processing for extracting desired bandwidth component, and frequency conversion (up-conversion) for the PHY packet, amplifies the signal generated by these processes by using a preamplifier (PA), and outputs the amplified signal from one or more antennas as radio. In some embodiments, the transmitter 102 may include a transmitter system for each antenna, and may transmit the same signals simultaneously by performing the processes of PHY layer in each transmitter system. In some embodiments, it is also possible to control transmission m directivity by utilizing a plurality of antennas.

In some embodiments, signals received by each antenna are processed by each receiver system corresponding to each antenna in the receiver 103. For example, after transmitting the trigger frame, the signals of data frames (including the case of aggregation frames) transmitted from a plurality of STAs that are designated by the trigger frame are received simultaneously by each antenna. Each received signal is amplified by LNA (Low Noise Amplifier), is applied to frequency conversion (e.g., down-conversion), and is filtered in order to extract desired bandwidth component in each receiver system. In some embodiments, the extract signal is converted into a digital signal by AD converter. After the PHY layer processes to the digital signals such as demodulation and decoding for error correction code and the process of PHY header, data frames are inputted to the controller 101. In some embodiments, each receiver system may support different frequency bandwidths and the receiver system may be allocated for each resource unit. In some embodiments, each receiver system may support the same frequency bandwidth and the signals received by the receiver systems may be synthesized by utilizing diversity technique. In this case, in some embodiments, the signal of each resource unit may be extracted by digital filtering. In some embodiments, in the case where OFDMA is not performed, it is possible to be a configuration that only one antenna is connected with the receiver 103 and the other antennas are not connected.

In any timing, the controller 101 performs scheduling of DL-OFDMA that is performed after a certain period of time from UL-OFDMA. The timing of the scheduling of DL-OFDMA occurs, for example, at or after the point of transmission completion of the trigger frame (described before), at or after the point of reception completion of the data frames transmitted by UL-OFDMA in response to the trigger frame (as described before), or after checking CRC of the data frames described later. In some embodiments, the controller 101 may perform the scheduling before transmitting the trigger frame. The operation of the scheduling is described in FIG. 13 or FIG. 19.

The controller 101 checks CRC of data frames that are received simultaneously from STAs by UL-OFDMA. In some embodiments, in the case of aggregation frame, the controller 101 checks CRC of a plurality of data frames included in the aggregation frame. In accordance with the scheduling, the controller 101 generates frames to be transmitted to STAs that are targeted for DL-OFDMA transmission, and assigns these frames to resource units (including bonding resource units).

The controller 101 controls to transmit the generated frames from the transmitter 102 by utilizing resource units to which each frame is assigned after the elapse of a certain period of time from the reception completion of data frames transmitted from STAs by UL-OFDMA. The transmitter 102 generates PHY packet by performing desired PHY layer processes to each frame such as coding and modulation process and adding of PHY header. Moreover, the transmitter 102 performs such as DA conversion, filter processing for extracting desired bandwidth component and frequency conversion (up-conversion) for the PHY packet, and amplifies the signal generated by these process by utilizing preamplifier (PA), and outputs the amplified signal from one or more antennas as radio.

In some embodiments, the controller 101 may access a storage device that stores information such as notification information to be transmitted to each STA by utilizing such as the trigger frame, or notification information from each STA, or both of them. In some embodiments, the controller 101 may read the information from the storage device. The storage device may be an inner memory, external memory, volatile memory, or nonvolatile memory. The storage device may be such as an SSD or hard disk other than the memory. The storage device may be the buffer 104. Above mentioned division of the processes between the controller 101 and the transmitter 102 is one example, and other embodiments can be different from the example. For example, the controller 101 may perform until the digital processes and DA conversion, and the transmitter may perform the processes after the DA conversion. The division of the processes between the controller 101 and the receiver 103 is also the same. The receiver 103 may perform before the AD conversion, and the controller 101 may perform the digital processes including the processes of AD conversion or later. As one example, the baseband circuitry according to some embodiments corresponds to the controller 101, a part of the transmitter 102 that performs PHY layer processes and the DA conversion, and a part of the receiver 103 that performs the processes of the AD conversion or later. The RF circuitry corresponds to a part of the transmitter 102 that performs the processes after the DA conversion and a part of the receiver 103 that performs the processes before the AD conversion. The wireless communication circuitry according to some embodiments includes at least the baseband circuitry among the baseband circuitry and the RF circuitry. In some embodiments, the wireless communication circuitry includes both the baseband circuitry and the RF circuitry. The processes may be divided between blocks, or between the baseband circuitry and the RF circuitry, by utilizing a different manner from the one described here.

Figure 27:
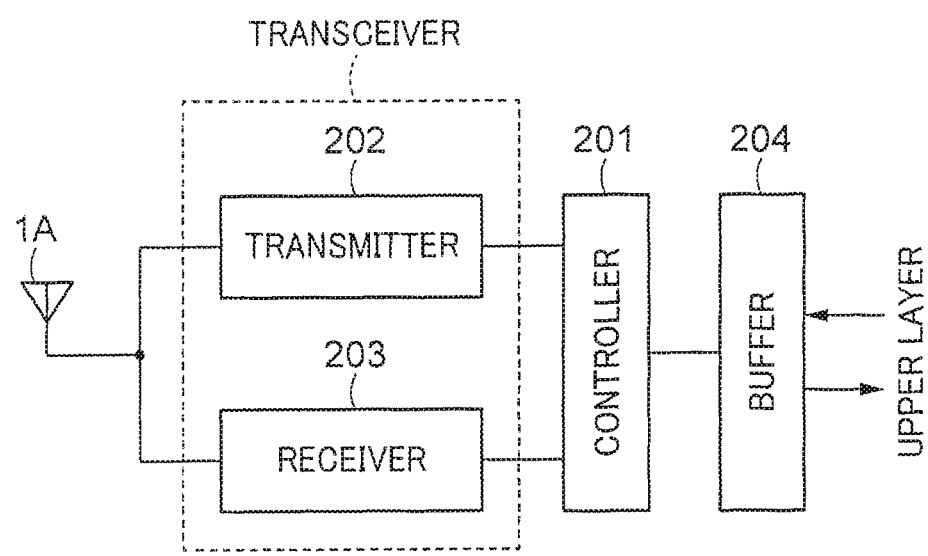
FIG. 27 illustrates a functional block diagram of a wireless communication device installed in the STA according to some embodiments.

FIG. 27 illustrates a functional block diagram of a wireless communication device installed in the STA. In some embodiments, the wireless communication devices installed in the STAs 1 to 8 in FIG. 1 have the same configuration as the configuration as shown in FIG. 27.

Referring to FIG. 27, the wireless communication device of the STA includes a controller 201, a transmitter 202, a receiver 203 and at least one antenna 1A, and a buffer 204. The controller 201 corresponds to a controller in order to control communication with the AP 11 or baseband circuitry. The transmitter 202 and receiver 203 correspond to a transceiver in order to perform transmission and reception of frames or RF circuitry. The process of the controller 201 and all or a part of digital domain processes of the transmitter 202 and the receiver 203 may be executed by software (program) that operates on a processor such as a CPU, may be executed by hardware or may be executed by both software and hardware. In some embodiments, the STA may include a processor to perform the process of the controller 201 and all or a part of processes of the transmitter 202 and the receiver 203.

The buffer 204 is a storage device for transferring such as frames between an upper layer and the controller 201. The buffer 204 may be a volatile memory such as a DRAM, or may be nonvolatile memory such as a NAND and MRAM. The upper layer generates frames to be transmitted to other STAs, the AP 11 or a device of other network such as a server, and so on, and it stores the frames in the buffer 204. The upper layer receives frames transmitted from other STAs, the AP 11 or the device via the buffer 204. The upper layer may perform the upper process of MAC layer such as TCP/IP and UDP/IP. In some embodiments, the controller 201 may perform TCP/IP and UDP/IP, and the upper layer may perform the process of application layer upper than these processes. The process of the upper layer may be executed by software (program) that operates on a processor such as a CPU, may be executed by hardware or may be executed by both software and hardware.

In some embodiments, the controller 201 mainly performs the process of MAC layer and a part of process of PHY layer (for example, the process for OFDMA). The controller 201 controls communication with the AP 11 by transmitting and receiving frames via the transmitter 202 and the receiver 203. In some embodiments, the controller 201 may include a clock generator in order to generate a clock, and may manage inner time by utilizing the clock generated by the clock generator. The controller 201 may output the clock generated by the clock generator. In some embodiments, the controller 201 may receive a clock generated by an external clock generator, and may manage the inner time by utilizing the clock.

As one example, the controller 201 performs association process by sending association request to the AP 11 after receiving a beacon frame and confirming the attribution of BSS of the AP 11 and the synchronization information. In this way, the controller 201 establishes a wireless link with the AP 11 by exchanging necessary information such as capabilities and attribution of each other. In some embodiments, the controller 201 may include capability information that indicates whether it supports OFDMA. In some embodiments, the controller 201 may perform authentication process with the AP beforehand, as needed. In some embodiments, the controller 201 confirms the status of the buffer 204 by checking the buffer 204 regularly. In some embodiments, the controller 201 may confirm the status of the buffer 204 when a trigger is given from an external device such as the buffer 204. In some embodiments, when the controller 201 confirms frames such as data frames to be transmitted to the AP 11, the controller 201 may transmit the frames via the transmitter 202 and the antenna 1A after acquiring the access right of wireless medium based on CSMA/CA and so on.

The transmitter 202 generates PHY packet by performing desired PHY layer processes such as coding and modulation process of inputted frames from the controller 201 and adding of PHY header. In some embodiments, the transmitter 202 performs such as DA conversion, filter processing for extracting desired bandwidth component and frequency conversion (up-conversion) for the PHY packet, and amplifies the signal generated by these processes by utilizing a pre-amplifier (PA), and outputs the amplified signal from one or more antennas as radio. In some embodiments, the transmitter 202 may include a transmitter system for each antenna, and may transmit the same signals simultaneously by performing the processes of PHY layer in each transmitter system. In some embodiments, it is also possible to control transmission directivity by utilizing a plurality of antennas.

Signal received by the antenna 1A is processed by the receiver 203. The received signal is amplified by LNA in the receiver 203, is applied to frequency conversion (down-conversion), and is filtered to desired bandwidth component. The filtered signal is converted into a digital signal by AD converter. After the PHY layer processes for the digital signal such as demodulation and decoding for error correction code and the process of PHY header, frames such as data frames are inputted to the controller 201.

When the STA receives the trigger frame from the AP 11, the controller 201 confirms in the trigger frame whether the STA that installs the controller 201 is designated as a target STA for UL-OFDMA. In some embodiments, the controller 201 may confirm whether identification information of the STA is stored in one of the STA information fields or the common information field. In some embodiments, in the case where there is a rule that all STAs belong to a group ID are permitted to become target STAs for OFDMA when the group ID is specified in the common information field, the controller 201 may determine whether the subject STA is designated as a target based on whether the subject STA belongs to the group of the group ID. In this case, in some embodiments, the STAs have acquired information related to a list of STAs that belong to each group from the AP 11. In some embodiments, when information related to the duration of OFDMA sequence is set to the fields such as the Duration/ID field or the common information field of the trigger frame, the controller 201 grasps the duration of OFDMA sequence from the information. For example, the STA may determine not to perform single user transmission based on CSMA/CA, during the duration.

When the STA is designated as a target STA for UL-OFDMA, the controller 201 of the STA acquires information of resource unit utilized by the STA and other parameters, from the common information field, the STA information fields or both of them. According to the information, the controller 201 reads data frames stored in the buffer 204, and controls to transmit them to the AP 11 after the elapse of a certain period of time from the reception completion of the trigger frame. As one example of data frames to be read, in the case where the packet length (such as PPDU length) is designated, the controller 201 selects and reads data frames such that the length of the packet to be transmitted becomes equal to or less than the designated packet length. In the case where access category is designated, the controller 201 reads data frames of the designated access category. The controller 201 may read a plurality of data frames and generate aggregation frames. In some embodiments, in the case where the packet length becomes less than the designated packet length, the controller 201 may add padding data to the end of the data frame. Moreover, in the case where adjustment amount of transmission timing is designated, it transmits at the timing shifted by the adjustment amount after the elapse of a certain period of time from the reception completion of the trigger frame. The data frames are transmitted as PHY packets via the transmitter 202 and antenna 1A. The operation of the transmitter 202 is as described above.

After transmitting the data frames, the controller 201 receives a signal transmitted from the AP 11 by DL-OFDMA. The controller 201 identifies the resource unit designated to its STA from a certain field of PHY header (such as SIG1 field in FIG. 11). In some embodiments, in the case where the STA receives a signal of DL-OFDMA although it is not designated by the trigger frame, the controller 201 checks whether there is a resource unit designated to the STA in the certain field.

The controller 201 acquires frames by decoding a signal of the resource unit designated to its STA. In the case where the acquired frame is an acknowledgement response frame (such as BA frame, Multi-STA BA frame, ACK frame), the controller 201 confirms transmission success or failure of its STA (e.g., whether the data frames transmitted from its STA are successfully received by the AP 11).

In the case where the acquired frame is an aggregation frame including an acknowledgement response frame and a data frame, the controller 201 confirms transmission success or failure of its STA based on the acknowledgement frame, and checks CRC of the data frame. In the case where the acquired frame is a data frame, the controller 201 checks CRC of the data frame (e.g., for an aggregation frame including a plurality of data frames, the controller 201 checks CRC for each data frame).

In some embodiments, in the case where there is a rule that when the STA receives data frames from the AP, the controller 201 can perform uplink transmission continuously after the elapse of a certain period of time (such as SIFS) from the reception completion, the controller 201 may transmit an acknowledgement response frame by utilizing the same resource unit that is utilized to receive the data frames or a resource unit determined by other method after the elapse of a certain period of time from the reception completion of the data frames. In some embodiments, in the case where the trigger frame is included in the aggregation frame of this DL-OFDMA and its STA is designated by the trigger frame, the controller 201 may transmit the acknowledgement response frame, or an aggregation frame including the acknowledgement response frame and data frames based on the trigger frame.

For the data frames determined to be failure in transmission, the controller 201 performs retransmission process of the data frames as needed. For example, the controller 201 may retransmit the data frames by UL-OFDMA when its STA is designated by the next trigger frame. In some embodiments, the controller 201 may transmit these data frames based on the trigger frame when the aggregation frame of this DL-OFDMA includes the trigger frame and its STA is designated by the trigger frame. In some embodiments, the controller 201 may acquire the access right by CSMA/CA or by exchanging a RTS frame and a CTS frame after the end of the duration of the OFDMA sequence, and may retransmit the data frames (single user transmission). The controller 201 may retransmit them by utilizing other methods.

Here, it mainly describes a case where a frame transmitted by UL-OFDMA is a data frame. The frame may be a management frame or a control frame.

In some embodiments, the controller 201 may access a storage device that stores information such as notification information for the AP 11, notification information from the AP 11 or both of them, and the controller 201 may read the information from the storage device. The storage device may be an inner memory, external memory, volatile memory, or nonvolatile memory. The storage device may be such as an SSD or hard disk other than the memory. In some embodiments, the storage device may be the buffer 204.

Above mentioned division of the processes between the controller 201 and the transmitter 202 is one example, and other embodiments can be different from the one example. For example, the controller 201 may perform until the digital processes and DA conversion, and the transmitter may perform the processes after the DA conversion. In some embodiments, the division of the processes between the controller 201 and the receiver 203 is also the same. In some embodiments, the receiver 203 may perform before the AD conversion, and the controller 201 may perform the digital processes including the processes of AD conversion or later. As one example, the baseband circuitry according to some embodiments corresponds to the controller 201, a part of the transmitter 202 that performs PHY layer processes and the DA conversion, and a part of the receiver 203 that performs the processes of AD conversion or later. The RF circuitry corresponds to a part of the transmitter 202 that performs the processes after the DA conversion and a part of the receiver 203 that performs the processes before the AD conversion. The wireless communication circuitry according to some embodiments includes at least the baseband circuitry among the baseband circuitry and the RF circuitry. In some embodiments, the wireless communication circuitry includes both the baseband circuitry and the RF circuitry. It may divide the processes between blocks, or may divide the processes between the baseband circuitry and the RF circuitry by utilizing a different manner from the one described here.

Figure 28:
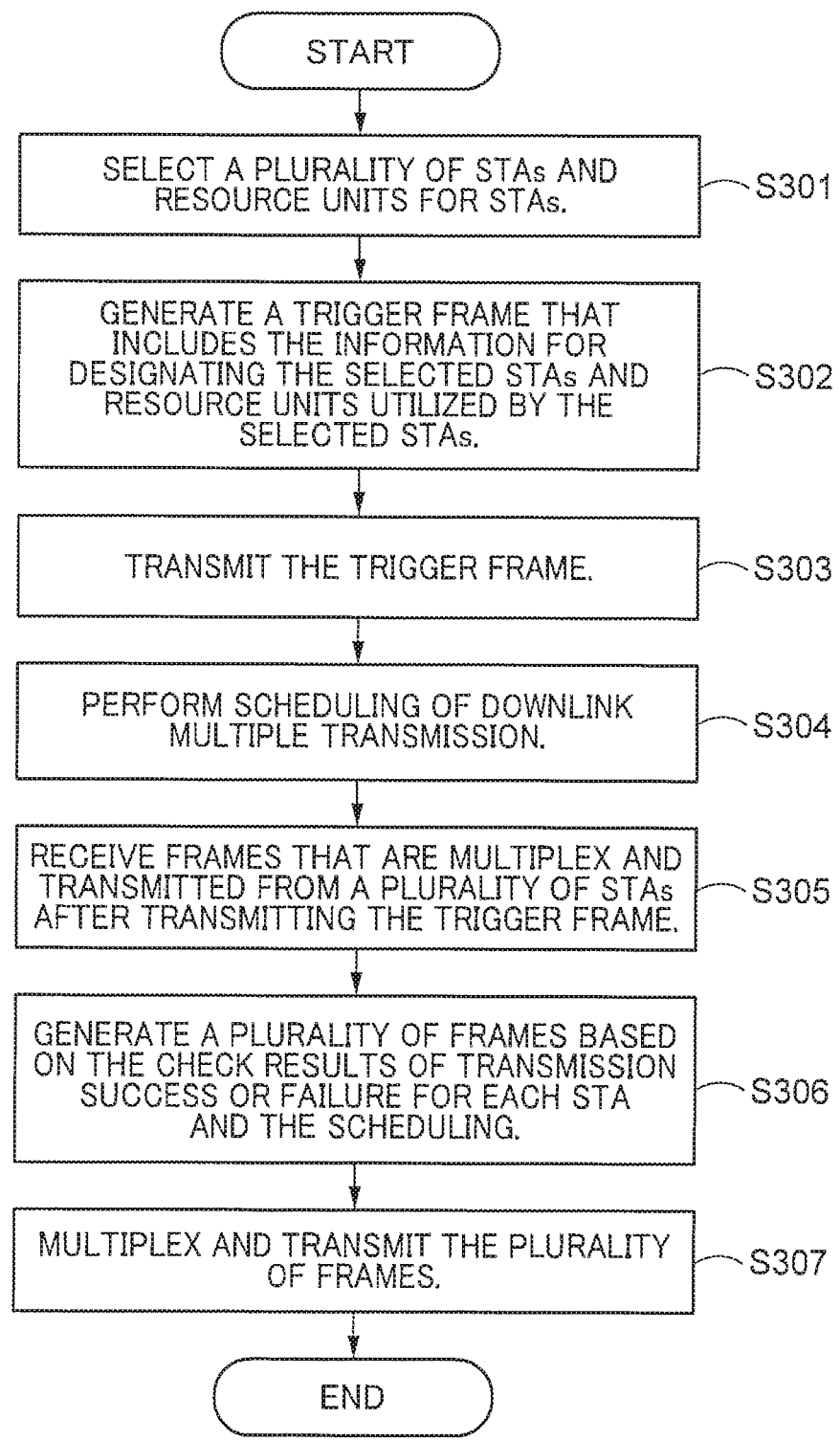
FIG. 28 illustrates a flowchart of operation of the AP according to some embodiments.

FIG. 28 illustrates a flowchart of operation of the AP according to some embodiments. The controller 101 in the AP selects a plurality of STAs (or a plurality of wireless communication devices) that become targets for UL-OFDMA. The controller 101 also selects resource units utilized by the selected STAs (S301). As needed, the controller 101 determines parameters such as MCS and packet length. The controller 101 generates a trigger frame in which information that designates the selected STAs and resource units, and the parameter information is set (S302). The controller 101 in the AP transmits the trigger frame via the transmitter 101 after acquiring the access right in order to transmit the trigger frame by carrier sensing and so on (S303).

After transmitting the trigger frame, the controller 101 in the AP schedules DL-OFDMA performed after the elapse of a certain period of time from the completion of the above UL-OFDMA (S304). The details of the scheduling are the same as the one described by using FIG. 13 or FIG. 19.

The controller 101 in the AP waits to receive frames such as data frames each of which is transmitted by utilizing the designated resource unit, from the plurality of STAs designated by the trigger frame. The controller 101 receives via the receiver 103 the frames simultaneously such as the data frames that are multiplexed and transmitted from the plurality of STAs (S305). The controller 101 checks whether it succeeds in receiving each frame (such as CRC check). The controller 101 generates a plurality of frames for a plurality of STAs based on the check result regarding the success or failure of the reception of the frames (CRC results) and the scheduling in step S304 (S306). The controller 101 transmits the generated frames (DL-OFDMA transmission) after the elapse of a certain period of time from the reception completion of the frames that are multiplexed and transmitted from the plurality of STAs in step S305 (S307).

Figure 29:
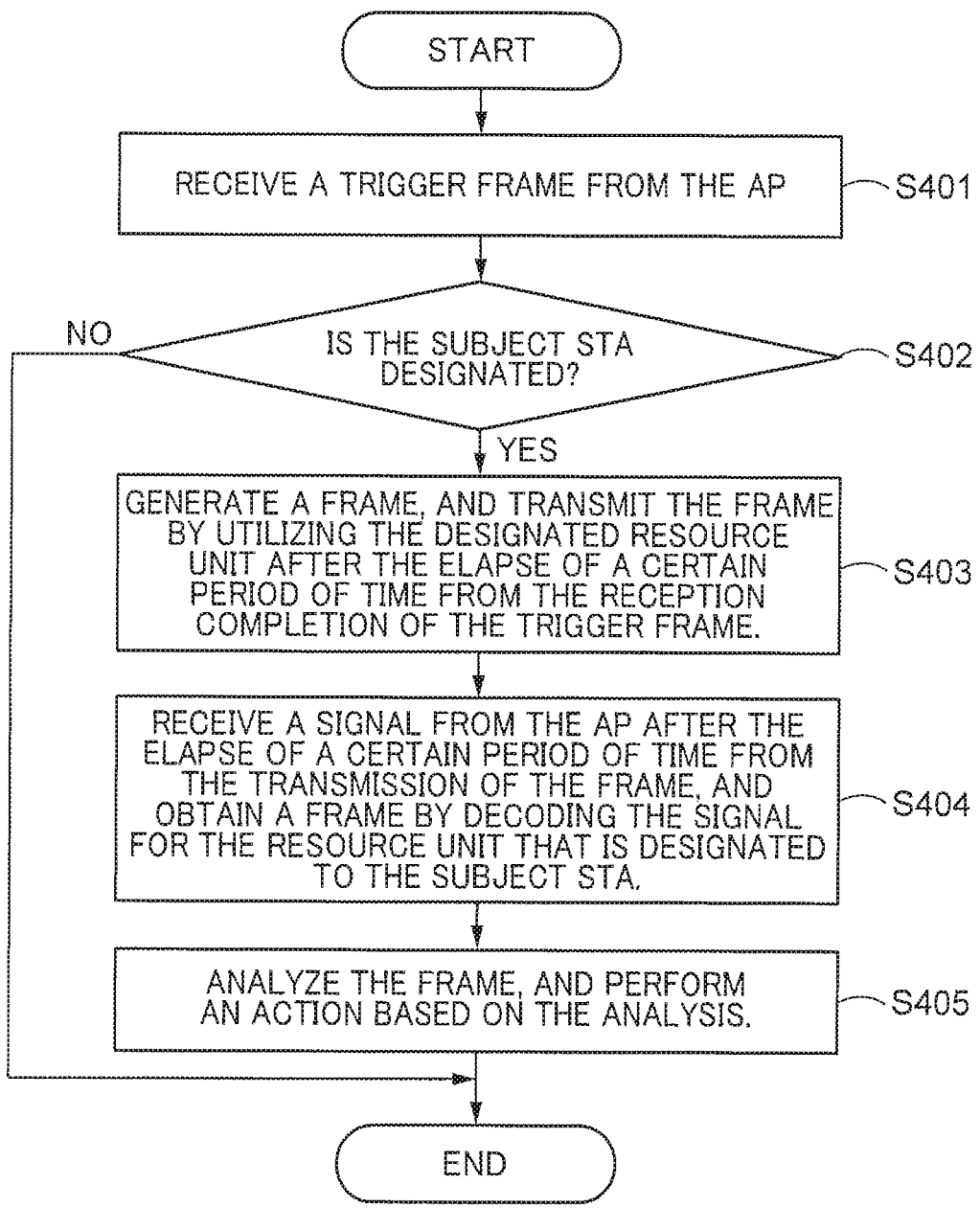
FIG. 29 illustrates a flowchart of operation of the STA according to some embodiments.

FIG. 29 illustrates a flowchart of operation of the STA according to some embodiments. The controller 201 in the STA receives the trigger frame transmitted from the AP via the receiver 202 (S401). In some embodiments, in the trigger frame, necessary information such as information for designating the plurality of STAs targeted for UL-OFDMA and information for designating resource units utilized by each STA is set in the common information field, the STA information fields or both of them.

The controller 201 in the STA checks whether its STA is designated as targets for UL-OFDMA in the trigger frame (S402). In some embodiments, when it is designated, the controller 201 grasps the resource unit that is utilized by its STA, and necessary parameters for transmission as needed. The controller 201 generates frames such as data frames based on the parameters, and transmits the frames (e.g., physical packets including the data frames) to the AP via the transmitter 202 by utilizing the resource unit designated by the trigger frame, after the elapse of a certain period of time from the reception completion of the trigger frame (S403).

The controller 201 in the STA receives a frame transmitted from the AP after the elapse of a certain period of time from the transmission of the data frame (S404). In some embodiments, the controller 201 grasps the resource unit designated to its STA from a predefined field in the PHY header added to the frame transmitted from the AP, and acquires the frame by decoding a signal of the m designated resource unit. The controller 201 analyzes the frame, and determines whether the frame is such as BA frame, Multi-STA BA frame or aggregation frame aggregating a plurality of frames, and it operates based on the determination (S405). If there is a trigger frame in the aggregation frame, the controller 201 may repeat the same steps from step S401. If the receiver address of the acquired frame is broadcast address, multicast address to which the STA belongs, or the MAC address of the STA, the STA processes the frame.

In some embodiments, the controller 201 utilizes UL-OFDMA for uplink multiplex transmission and DL-OFDMA for downlink multiplex transmission. In some embodiments, the controller 201 can utilize UL-MU-MIMO (Uplink Multi-Input Multi-Output) and DL-MU-MIMO (Downlink Multi-Input Multi-Output), respectively. In the DL-MU-MIMO, the AP transmits frames by utilizing orthogonal beams in space for each STA, which is named as beam forming technique. In the UL-MU-MIMO, a plurality of STAs transmits frames simultaneously by utilizing the same frequency band. In some embodiments, the AP decodes the frames by utilizing the responses of uplink propagation paths between the AP and the STAs.

In the UL-MU-MIMO, the AP 11 can separate data frames spatially from data streams simultaneously received from the STAs 1 to 4. In order to achieve this, the AP 11 utilizes the responses of uplink propagation paths between the AP and the STAs 1 to 4. The AP can estimate the response of uplink propagation path for each STA by utilizing preambles added to the head of the frames transmitted by UL-MU-MIMO from the plurality of STAs. These preambles correspond to the communication resource according to some embodiments. Hereinafter, it describes about the preambles.

The preamble is comprised of a given bit sequence. The AP 11 can separate (e.g., decode) fields after the preamble (such as data field) correctly in space by estimating the responses of uplink propagation paths by the give big sequence. This can be performed by utilizing know methods such as ZF (Zero-Forcing), MMSE (Minimum Mean Square Error) and maximum likelihood estimation method or any other optional methods. As one example, the preamble field is positioned in the PHY header set before the front of MAC frame. In the field before the preamble field in the PHY header, each STA transmits the same signal. The preambles of STAs can be orthogonal each other. The orthogonality of preambles means that the AP 11 can identify the preamble for each STA from the signals simultaneously received from each STA. In this way, the AP 11 can estimate the responses of propagation paths between the AP 11 and each STA by utilizing the preamble for each STA.

As a method for orthogonalizating preambles between STAs, the AP 11 may utilize any of time method, frequency method or coding method. In the case of time orthogonalization, the AP 11 divides preamble fields into a plurality of segments, and transmits a preamble by utilizing a different segment for each STA. In one segment, only one STA transmits the preamble. In other words, temporal position when each STA transmits the preamble is different each other. While a certain STA transmits the preamble, the other STAs transmit nothing. In some embodiments, in the case of time orthogonalization, the preamble includes information when to transmit as well as preamble data to be transmitted. In the case of frequency orthogonalization, each STA transmits the preamble data by utilizing the frequencies that are orthogonal to each other. The preamble includes information about the frequencies (e.g., subcarriers) that are to be utilized for transmission. In some embodiments, in the case of code orthogonalization, each STA transmits data that is positioned in the different rows (or different columns) of orthogonal matrix each other. Each row (or each column) of the orthogonal matrix is orthogonal each other. By utilizing any of these orthogonalization methods, the AP 11 can identify the preamble of each STA.

In order for each STA to utilize the preamble orthogonal to each other, the AP 11 can notify preamble information utilized by each STA. In particular, the AP 11 can need information such as transmission timing of each preamble for the time orthogonalization, transmission frequency of each preamble for the frequency orthogonalization and code pattern (which rows (or which columns) of the orthogonal matrix) for the code orthogonalization. The AP 11 may set the information in the trigger frame transmitted by the AP for STAs that is permitted to perform UL-MU-MIMO. In some embodiments, the AP 11 may notify each STA of the information beforehand by utilizing other methods. In any cases, when UL-MU-MIMO transmission is performed, each STA has grasped information related to the preamble that is utilized by each STA.

As another multiplex transmission method, it is possible to utilize a transmission method combining OFDMA and MU-MIMO (OFDMA & MU-MIMO). In the OFDMA & MU-MIMO, a plurality of STAs performs MU-MIMO by utilizing the same resource unit.

For the multiplex transmission in some embodiments, it is possible to utilize OFDMA, MU-MIMO or combination of both.

As described above, according to some embodiments, it is possible to communicate efficiently when performing multiplex transmission with a plurality of STAs.

Figure 30:
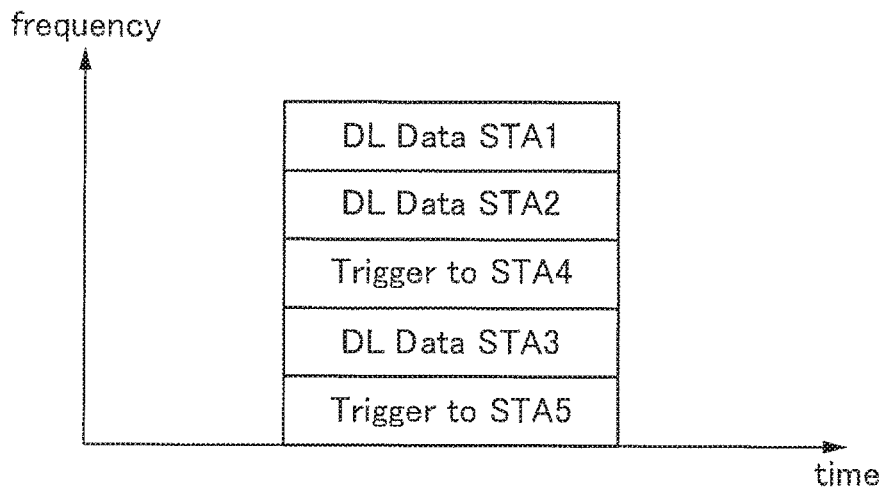
FIG. 30 illustrates an example of transmission of plural kinds of frames by DL-OFDMA.

When an AP performs DL-OFDMA transmission, the AP may transmit not only one kind of frames but also plural kinds of frames to a plurality of STAs as described in the embodiments of FIGS. 1-29. For example, as illustrated in FIG. 30, the AP may transmit the data frames to the STAs 1 to 3 and the trigger frames to the STAs 4 and 5 by DL-OFDMA that utilizes different resource units for each frame. Here, for example, "Trigger to STA 4" means that the receiver address of the trigger frame to be transmitted to the STA 4 is the MAC address of the STA 4. In this situation, based on the kinds of frames, there may be a frame that needs to be transmitted by utilizing an MCS as high as possible, or may be a frame that can be transmitted by utilizing a lower MCS. For example, it can improve efficiency by sending a data frame by utilizing an MCS as high as possible. On the other hand, for frames such as a trigger frame or a BA frame, it is considered that there is no problem to utilize a lower MCS so long as it satisfies a designated rate, because their frame lengths are short and their transmission and reception rates are limited by specification. Communication quality of each resource unit or communication quality of channel bandwidth is usually different among a plurality of STAs. Even in the same STA, communication quality is different based on resource units. In some embodiments, an efficient scheduling can be performed based on communicate quality of resource unit for each STA, communication quality of channel bandwidth (bandwidth that includes a plurality of resource units) for each STA, and a kind of frame to be transmitted to each STA, when an AP sends plural kinds of frames by DL-OFDMA.

Figure 31:
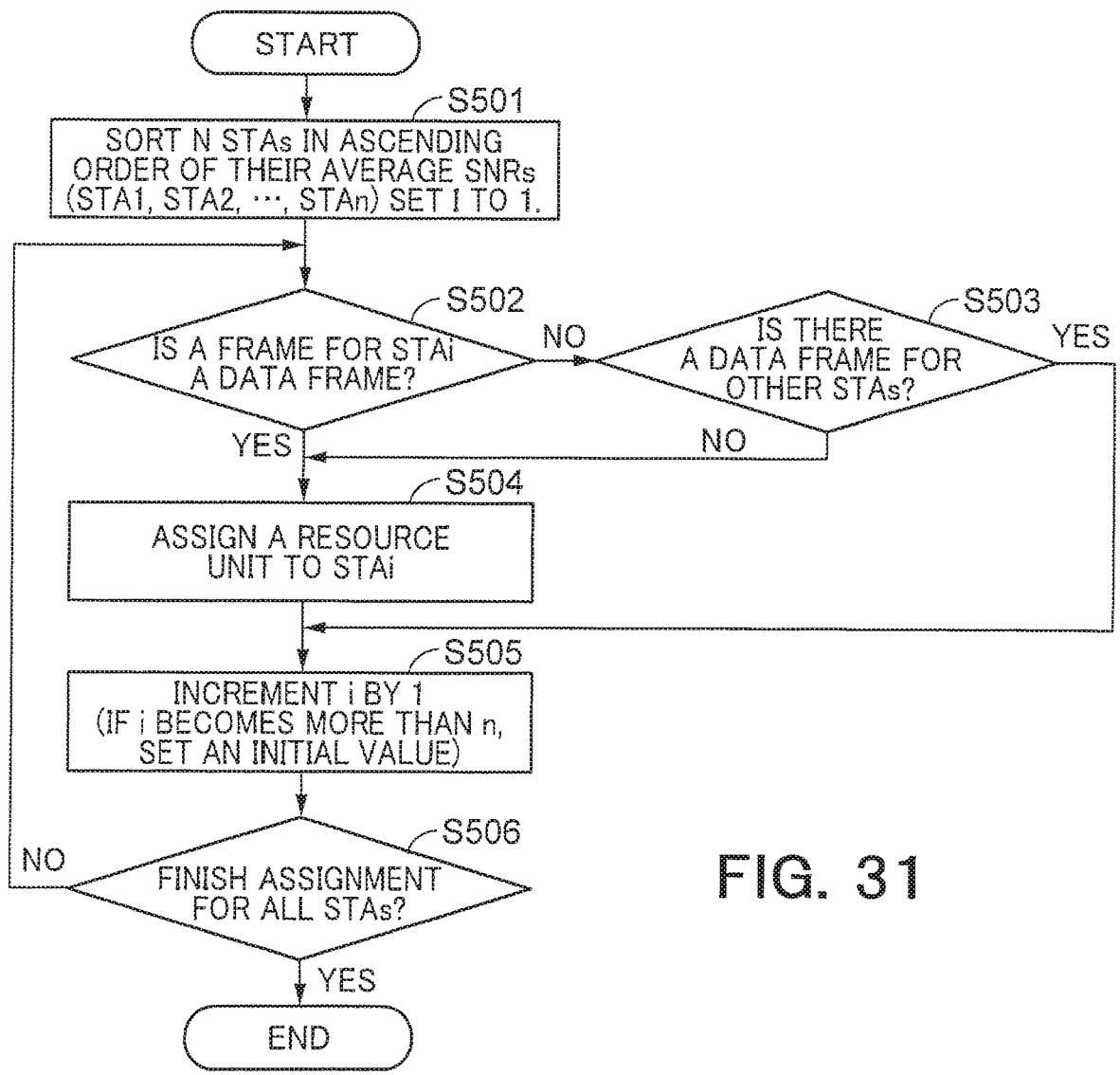
FIG. 31 illustrates a flowchart of scheduling by the AP according to some embodiments.

FIG. 31 illustrates a flowchart of scheduling controlled by a controller of an AP according to some embodiments. The AP measures communication quality of a plurality of resource units that are usable for OFDMA between the AP and each one of a plurality of STAs, beforehand. Here, the communication quality is SNR (Signal Noise Ratio), but it is not limited to SNR. For example, it may utilize RSSI (Received Signal Strength Indicator). The SNR may be a value measured by the STA for each resource unit, a value measured by the AP for each resource unit, or a value such as the average of both. Moreover, for each STA, the AP calculates the average of SNRs of the plurality of resource units as an average SNR. In some embodiments, instead of calculating the average SNR, the AP may measure the SNR of channel bandwidth (for example, 20 MHz channel bandwidth) that includes the plurality of resource units, and may utilize it. The AP may measure the communication quality between the AP and each STA regularly, or may measure it when the AP determines to perform DL-OFDMA, or may measure in other timing. Referring to FIG. 31, the AP sorts the plurality of STAs that are selected as the targets of DL-OFDMA (target STAs) in ascending order of their average SNRs (S501). When there are N STAs, each STA is described as $STA_1$, $STA_2$, $STA_n$ in ascending order of their average SNRs. Any single STA is described as $STA_i$. The AP selects the $STA_i$ that has the minimum average SNR (that is $STA_1$), and checks whether a frame for the $STA_i$ is a data frame (S502). In the case where the frame is a data frame, the AP assigns a resource unit that is selected from a plurality of usable resource units to the $STA_1$. As one example, the selected resource unit is the resource unit that has the highest SNR for the $STA_1$. In some embodiments, in the case where the AP assigns a plurality of resource units by bonding, as one example, the AP may select the combination of resource units to be bonded that has the maximum average or the maximum summation of SNRs. The selection example described here is one example, and it can be selected by other methods. For example, the AP selects the STA that has the next lower average SNR among STAs to which resource units are not assigned (select the STA with i incremented by 1) (S505 and S506), and goes back to step S502.

When the AP determines that a frame for $STA_i$ is not a data frame in step S502, the AP determines whether there is a STA to which a data frame is to be transmitted among other target STAs to which resource units are not assigned (S503). The frame other than a data frame is a control frame or a management frame. For example, it may be a trigger frame, BA frame, Multi-STA frame, ACK frame and so on.

If there is not such a STA, the AP assigns a resource unit to the $STA_i$ determined in step S502 (S504). As one example, the assigned resource unit may be any resource unit that satisfies the communication quality of a certain MCS necessary to transmit a frame (not a data frame) among the resource units that are not assigned yet, or may be the resource unit that has the maximum SNR for the $STA_i$ among them. On the other hand, if there is a STA to which a data frame is to be transmitted among other target STAs, the AP skips a resource assignment for the $STA_i$ determined in step S502, and selects the STA that has the next lower average SNR (select the STA with i incremented by 1) (S505 and S506).

Later, the AP repeats the same process until the AP assigns resource units to all STAs. When it updates i that has a value n in step S505, the AP sets an initial value to i. In other words, the AP selects the STA that has the minimum average SNR among STAs to which resource units are not assigned.

By scheduling as described above, it is possible to communicate effectively by enhancing a possibility that pluralities of frames to be transmitted to a plurality of STAs by DL-OFDMA are transmitted successfully.

Figure 32:
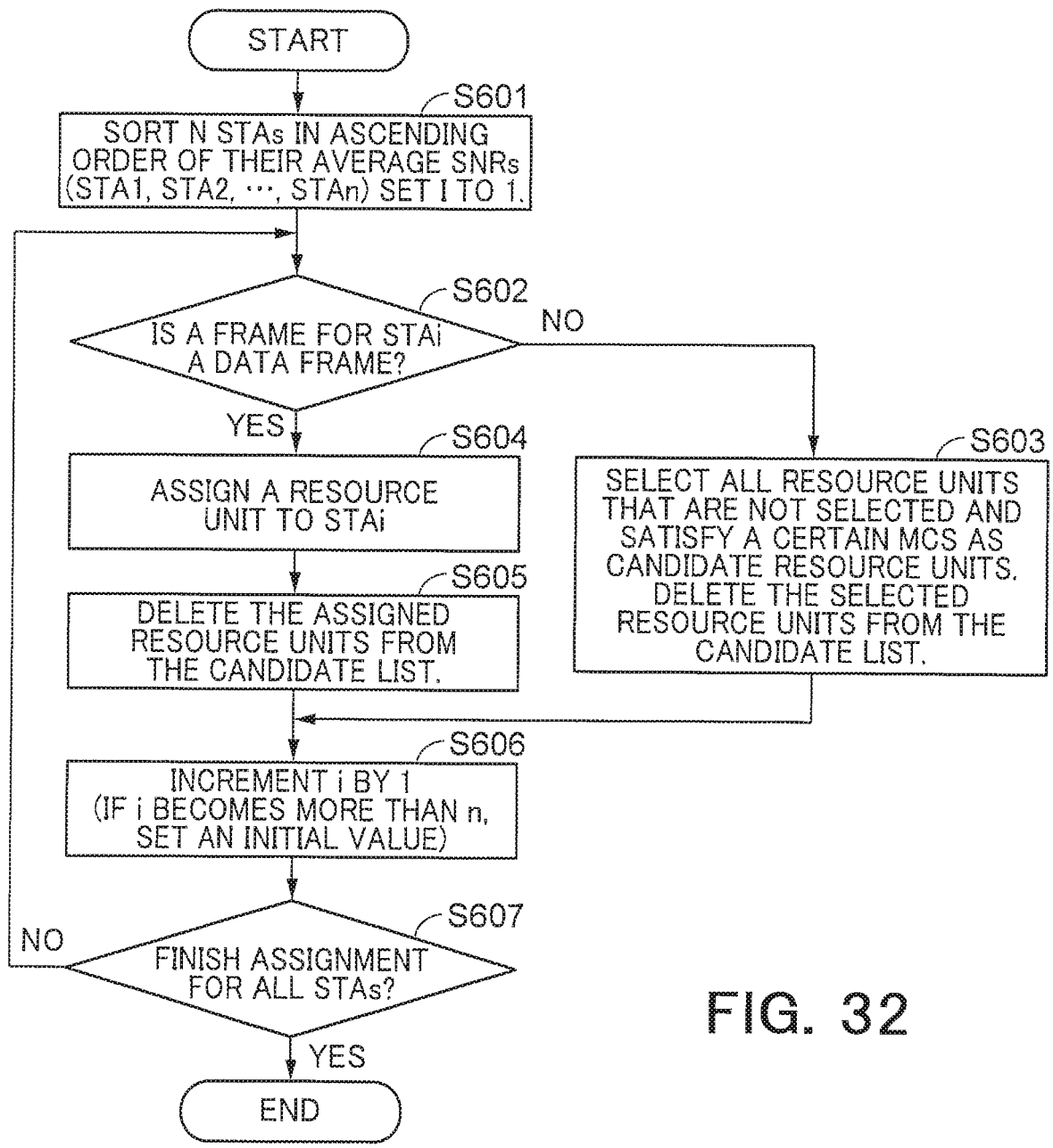
FIG. 32 illustrates another example of flowchart of scheduling by the AP according to some embodiments.

FIG. 32 illustrates a flowchart of scheduling controlled by the controller of the AP according to some embodiments. The AP measures communication quality between the AP and each one of a plurality of STAs beforehand by utilizing a similar or same manner as the description for FIG. 31. In some embodiments, the AP prepares a list of usable resource units as a candidate list.

The AP sorts a plurality of STAs that are selected as the targets for DL-OFDMA (target STAs) in ascending order of their average SNRs (S601). When there are N STAs, each STA is described as $STA_1$, $STA_2$, . . . , $STA_n$ in ascending order of their average SNRs. Any single STA is described as $STA_i$. The AP selects the $STA_i$ that has the minimum average SNR (that is $STA_1$), and checks whether a frame for the $STA_i$ is a data frame (S602). In the case where the frame is not a data frame (in the case of non-data frame), the AP selects all resource units from the candidate list that are not selected and satisfy a certain MCS, and assigns these resource units to the $STA_i$ temporally as candidate resource units (S603). At this point, the resource unit that is to be assigned to the STA, finally is not determined. In some embodiments, the AP deletes the resource unit that is temporally assigned to the $STA_i$ from the candidate list.

When the frame for the $STA_i$ is a data frame, the AP selects a resource unit for the $STA_i$ from the candidate list or from a plurality of candidate resource units if there are (if it remains) more than one candidate resource units that are temporally assigned to the STA in step S603. Moreover, the AP assigns the selected resource unit to the STA (S604). As one example, the resource unit to be selected is the resource unit that has the highest SNR for the STA. When the resource unit is assigned from the candidate list, the AP deletes the resource unit from the candidate list (S605). When the resource unit is assigned from the plurality of candidate resource units that are assigned temporally to the STA in step S603, the AP deletes the assigned resource unit from the candidate resource units for the STA. When the number of candidate resource units becomes one, the AP determines to assign the one candidate resource unit to the STA.

After step S605, the AP selects the STA that has the next lower average SNR (select the STA with i incremented by 1) (S606 and S607), and goes back to step S602.

Later, the AP repeats the same process until it assigns resource units to all STAs.

By scheduling as described above, it is possible to communicate effectively by enhancing a possibility that pluralities of frames to be transmitted to a plurality of STAs by DL-OFDMA are transmitted successfully.

Figure 33:
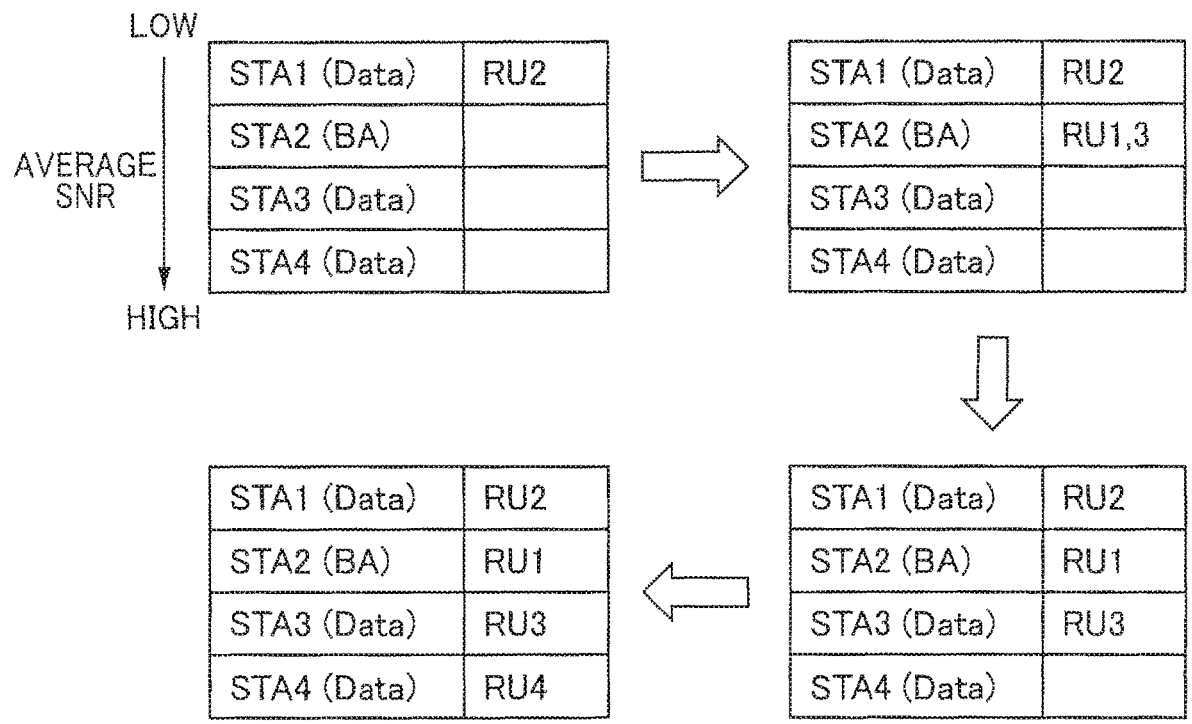
FIG. 33 is a figure to explain an operation sample of FIG. 32.

FIG. 33 is a figure to explain an operation sample of FIG. 32. First, it is assumed that the resource units 1 to 4 are registered in the candidate list. The AP sorts the four STAs as $STA_1$, $STA_2$, $STA_3$, $STA_4$ in ascending order of their average SNRs. First, the AP selects the $STA_1$, and selects the resource unit 2 that has the highest SNR for the $STA_1$, because a frame for the $STA_1$ is a data frame, and the AP assigns the resource unit (see the upper left corner of FIG. 33). It deletes the resource unit 2 from the candidate list.

Next, the AP selects the $STA_2$, and identifies all resource units that satisfy a certain MCS from the resource units remained in the candidate list, because a frame for the $STA_2$ is a BA frame (non-data frame). Here, the AP identifies the resource units 1 and 3, and it assigns them temporally to the $STA_2$ as candidate resource units (the utter right corner of FIG. 33). The AP deletes the resource units 1 and 3 from the candidate list.

Next, the AP selects the $STA_3$, and the AP assigns the resource unit 3 that has the highest SNR for the $STA_3$ from the candidate list or the candidate resource units 1 and 3 that are temporally assigned to the $STA_2$, because a frame for $STA_3$ is a data frame. Here, the AP deletes the resource unit 3 from the candidate resource units for the $STA_2$. Only the resource unit 1 remains in the candidate resource unit for the $STA_2$. In some embodiments, the AP determines to assign the resource unit 1 to the $STA_2$.

Next, the AP selects the $STA_4$, and it assigns the resource unit (e.g., resource unit 4) that has the highest SNR for the $STA_4$ from the candidate list, because a frame for $STA_4$ is a data frame. Here, the AP does not perform assignment from the candidate resource units to the $STA_4$ because there is no STA that is assigned more than one candidate resource units at this point.

Figure 34:
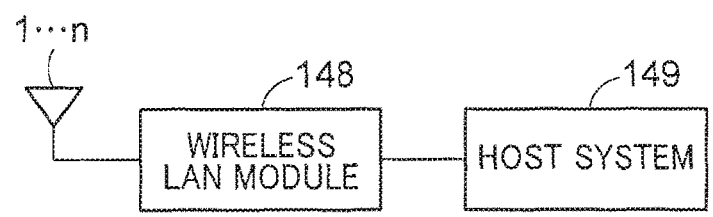
FIG. 34 illustrates an example of the entire configuration of a STA (non-AP terminal) or an AP.

FIG. 34 illustrates an example of the configuration of a STA (e.g., non-AP terminal) or an AR The configuration is one example, and other embodiments are not limited to it. The STA or AP includes one or more antennas 1 to n (n is an integer more than one), a wireless LAN module 148 and a host system 149. The wireless LAN module 148 corresponds to the wireless communication device according to some embodiments. The wireless LAN module 148 includes a host interface, and connects with the host system 149 via the host interface. It may connect with the host system 149 via a connection cable, or directly. In some embodiments, the wireless LAN module 148 may be embedded on a substrate by soldering, and it may connect with host system 149 via a line on the substrate. The host system 149 performs communication with an external device via the wireless LAN module 148 and antennas 1 to 2, based any communication protocol. The communication protocol may include TCP/IP and a protocol of upper layer than TCP/IP. Alternatively, the wireless LAN module 148 may include TCP/IP, and the host system 149 may perform the protocol of upper layer than TCP/IP. In this case, the configuration of the host system 149 can be simplified. For example, the STA or AP according to some embodiments may be a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device, a vehicle and so on. The wireless LAN module 148 (or the wireless communication device) may have functions of other wireless communication standards such as LTE, LTE-Advanced (standards for mobile phones) as well as the IEEE802.11.

Figure 35:
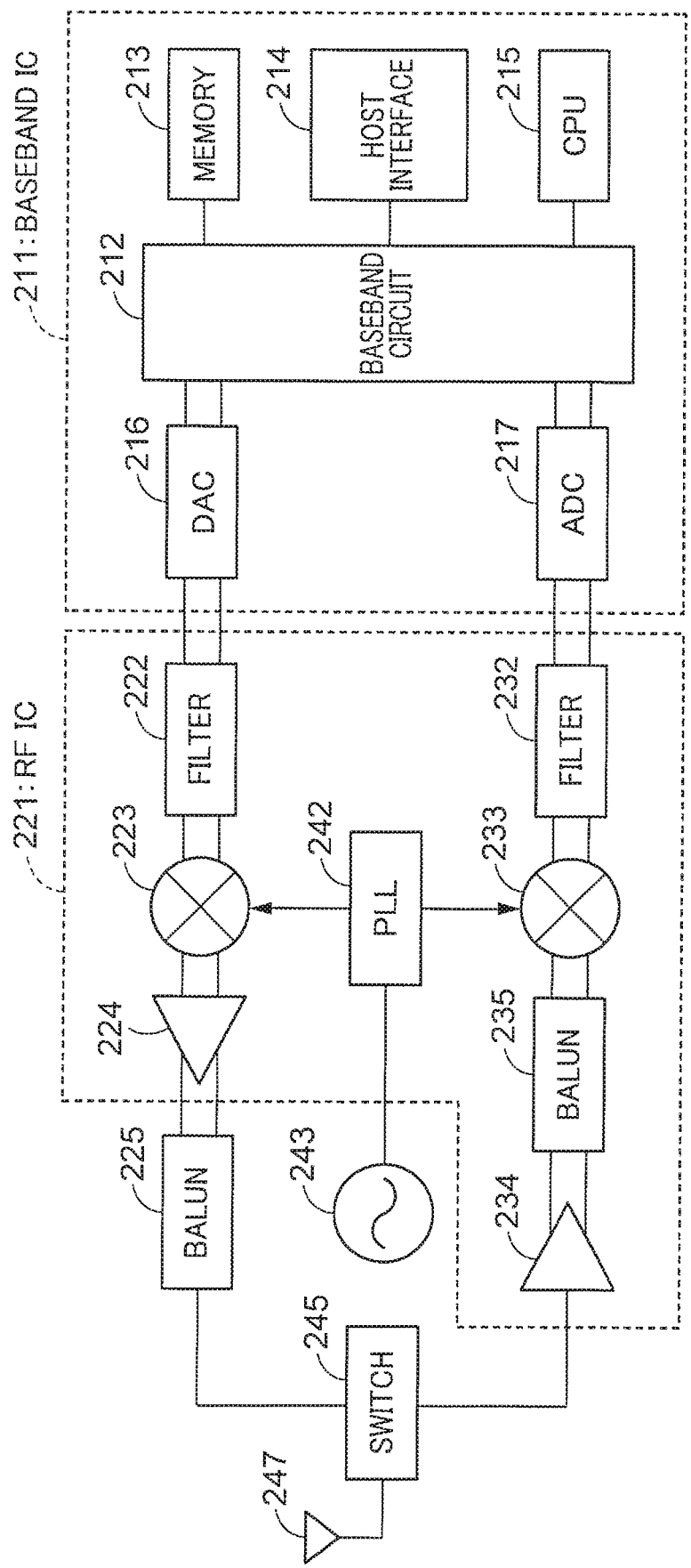
FIG. 35 illustrates an example of the hardware configuration of the wireless LAN module included in the AP or STA according to some embodiments.

FIG. 35 illustrates an example of the hardware configuration of the wireless LAN module. The configuration can be applied to the wireless communication device included in any one of a STA (non-AP terminal) and an AR In other words, the configuration is one specific example of the wireless communication devices illustrated in FIG. 26 or 27. Although the number of antennas is one in this example, it is possible to include more than one antenna. In this case, more than one set of transmitter system (216, 222 to 225), receiver system (217, 232 to 235), a phase-locked loop (PLL) 242, crystal oscillator 243 and switch 245 may be included for each antenna, and each set may connect with baseband circuitry 212.

Referring to FIG. 35, the wireless LAN module (e.g., wireless communication device) includes baseband IC (Integrated Circuit) 211, RF (Radio Frequency) IC 221, balun 225, switch 245, and antenna 247.

Referring to FIG. 35, the baseband IC 211 includes the baseband circuitry (control circuitry) 212, memory 213, host interface 214, CPU 215, DAC (Digital to Analog Converter) 216, and ADC (Analog to Digital Converter) 217.

Referring to FIG. 35, the baseband IC 211 and the RF IC 221 may be embedded on the same substrate. Moreover, the baseband IC 211 and the RF IC 221 may be included in one chip. One of or both of the DAC 211 and the ADC 217 may be included in the RF IC 221, or may be included in other IC. One of or both of the memory 213 and the CPU 215 may be included in other IC.

Referring to FIG. 35, the memory 213 stores data to be exchanged with the host system. Moreover, the memory 213 stores information such as notification information to be transmitted to an AP or STA, notification information transmitted from an AP or STA, or both of the information. The memory 213 may store program needed to execute the CUP 215, and it may be utilized as a work memory when the CPU 215 executes the program. The memory 213 may be a volatile memory such as a DRAM, or may be nonvolatile memory such as a NAND and MRAM.

Referring to FIG. 35, the host interface 214 is an interface to connect with the host system. The interface may be UART, SPI, SDIO, USB, PCI, Express and so on.

Referring to FIG. 35, the CPU 215 is a processor to control the baseband circuitry 212 by executing the program. The baseband circuitry 212 performs mainly processes of MAC layer and PHY layer. The baseband circuitry 212, or the CPU 215, or both of them correspond to a controller for controlling communications.

In some embodiments, at least one of the baseband circuitry 212 or the CPU 215 may include a clock generator to generate a dock, and it may manage inner time by the clock generated by the clock generator.

For example, the baseband circuitry 212 generates two kinds of baseband signals (hereinafter, digital I signal and digital Q signal) by applying the process to a frame to be transmitted as the process of PHY layer, such as PHY header adding, coding, encrypting, modulating (includes MIMO modulation) and so on.

Referring to FIG. 35, the DAC 216 performs DA conversion of an input signal from the baseband circuitry 212. In particularly, the DAC 216 converts the digital I signal into the analog I signal, and converts the digital Q signal into the analog Q signal. In some embodiments, the DAC 216 may take a configuration to transmit a single signal without applying orthogonal modulation. In some embodiments, in the case where it includes more than one antennas and a plurality of transmission signals (either single signal, or I and Q signals) are assigned and transmitted from each antenna, the DAC 216 may include a plurality of DACs according to the number of antennas.

As one example, the RF IC 221 is RF analog IC, or high frequency IC, or both of them. The RF IC 221 includes filter 222, mixer 223, preamplifier (PA) 224, PLL (Phase Locked Loop) 242, LNA 234, balun 235, and mixer 233, and filter 232. Some of these elements may be included in the baseband IC 211 or other IC. For example, the PA 224 may be included in the other IC. The filter 222 and 223 may be a bandpass filter or a lowpass filter.

Referring to FIG. 35, the filter 222 extracts desired band signals from each of the analog I and the analog Q signals inputted from the DAC 216. The PLL 242 generates a signal of a certain frequency locked with the phase of an input signal, by performing division or multiplication or both of them for oscillation signal inputted from the crystal oscillator 243. In some embodiments, the PLL 242 includes VCO (Voltage Controlled Oscillator), and obtains the signal of a certain frequency by performing a feedback control utilizing the VCO, based on the oscillation signal inputted from the crystal oscillator 243. The generated signal of a certain frequency is inputted to the mixer 223 and the mixer 233. The PLL 242 corresponds to one example of generating devices to generate a signal of a certain frequency.

Referring to FIG. 35, the mixer 223 converts the analog I and Q signals that have passed the filter 222 into a radio frequency (up-conversion) by utilizing the signal of a certain frequency provided from the PLL 242. The PA 224 amplifies the analog I and Q signals in a radio frequency generated by the mixer 223, to the desired output power. The balun 225 is a converter to convert a balanced signal (differential signal) into an unbalanced signal (single end signal). In the RF IC 221, a balanced signal is utilized. On the other hand, from the output of the RF IC 221 to the antenna 247, an unbalanced signal is utilized. Therefore, the balun 225 performs the signal conversion.

Referring to FIG. 35, the switch 245 is connected with the balun 225 in the transmission side when transmitting, and is connected with the LNA 234 in the reception side or the RF IC 221, when receiving. The baseband IC 211 or the RF IC 221 may control the switch 245. It may include other IC in order to control the switch 245, and the other IC may control the switch 245.

The analog I and Q signals in a radio frequency amplified by the PA 224 is applied to a balanced-unbalanced conversion, and then outputted from the antenna 247 as radio.

Referring to FIG. 35, the antenna 247 may be a chip antenna, an antenna created by a line printed on a printed substrate, or an antenna created by utilizing a linear conductive element.

Referring to FIG. 35, the LNA in the RF IC 221 amplifies a signal received via the antenna 247 and the switch 245 to a level where the signal is to be decodable, while suppressing a noise. The balun 235 performs an unbalance-balance conversion to the signal amplified by the LNA 234. The mixer 233 converts the received signal that is converted into a balanced signal by the balun 235, into a baseband signal by down-conversion, by utilizing the signal of a certain frequency provided from the PLL 242. More specifically, the mixer 233 generates carrier waves whose phases are shifted by 90° each other based on the signal of a certain frequency provided from the PLL 242, and it generates an I signal (In-phase) having the same phase as the received signal and a Q (Quad-phase) signal whose phase is 90° behind that of the received signal, by orthogonally demodulating the received signal converted by the balun 235 with the carrier waves whose phases are shifted by 90° each other. The filter 232 extracts desired frequency components from these I and Q signals. The I and Q signals extracted by the filter 232 are applied to a gain adjustment, and then outputted from the RF IC 221.

Referring to FIG. 35, the ADC 217 in the baseband IC 211 performs AD conversion to the input signal from the RF IC 221. More specifically, the ADC 217 converts the I signal into a digital I signal, and converts the Q signal into a digital Q signal. Alternatively, it may take a configuration to receive a single signal without applying orthogonal demodulation.

In some embodiments, in the case where there is more than one antenna, the ADC 217 may include a plurality of ADCs according to the number of antennas. Based on the digital I and Q signals, the baseband circuitry 212 obtains a frame by performing the PHY layer processes (may include MIMO demodulation) such as demodulating, error correction code, and the process of PHY header. The baseband circuitry 212 performs the MAC layer processes of the frame. In some embodiments, in the case where the baseband circuitry 212 includes TCP/IP, it is possible to perform the process of TCP/IP.

The detail descriptions of each unit described above are obvious from the description of FIGS. 26 and 27, and overlapped explanations are omitted.

Figure 36:
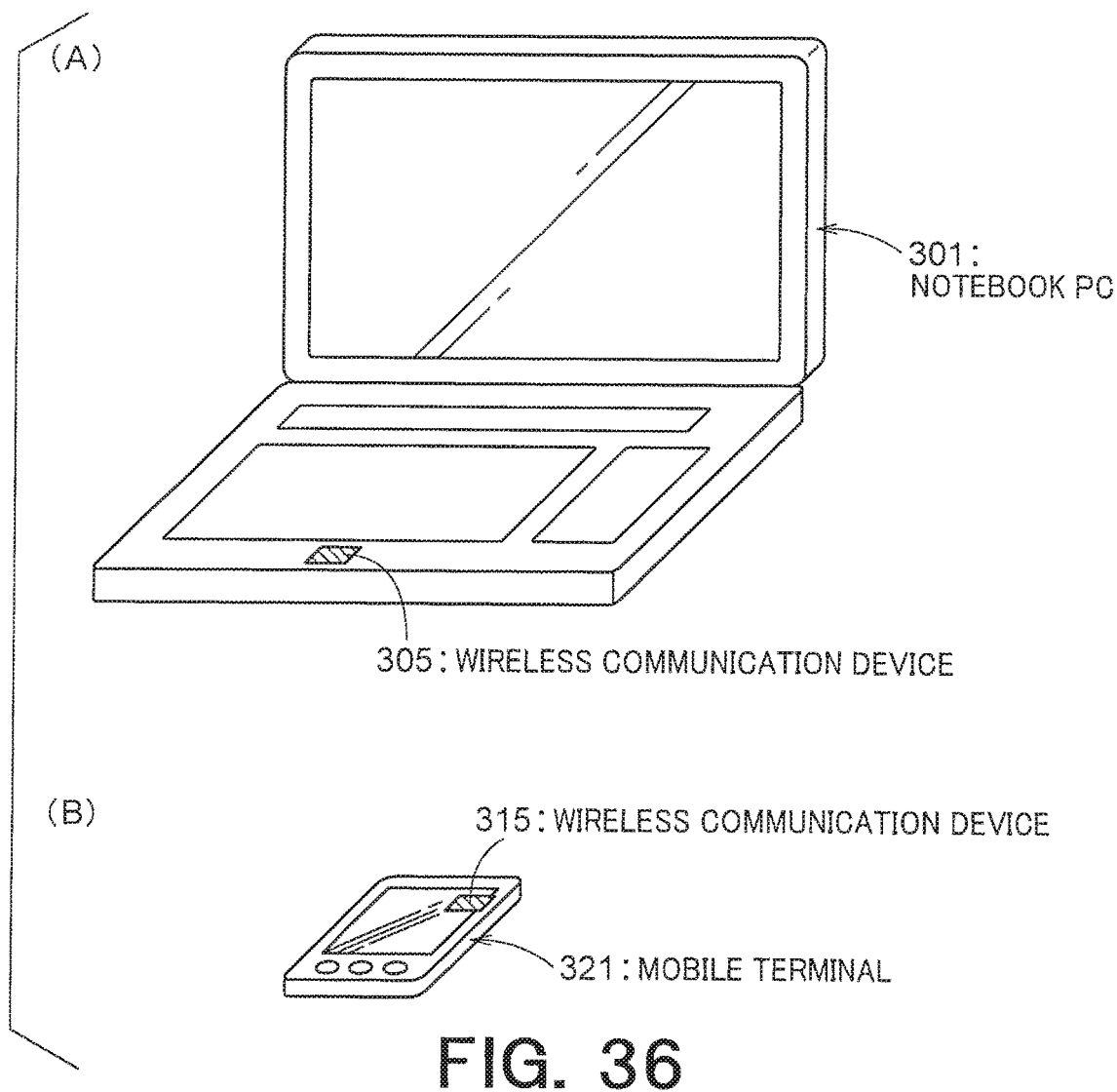
FIG. 36 illustrates perspective views of wireless terminal according to some embodiments.

FIG. 36(A) and FIG. 36(B) are perspective views of wireless terminal according to some embodiments. The wireless terminal in FIG. 36(A) is a notebook PC 301 and the wireless terminal in FIG. 36(B) is a mobile terminal 321. Each of them corresponds to one form of a STA (that may indicate an AP). The notebook PC 301 and the mobile terminal 321 are equipped with wireless communication devices 305 and 315, respectively. The wireless communication devices provided in the STAs (such as FIG. 27 and FIG. 35) and the AP 11 (such as FIG. 26 and FIG. 35) that have been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device, a vehicle and so on.

Figure 37:
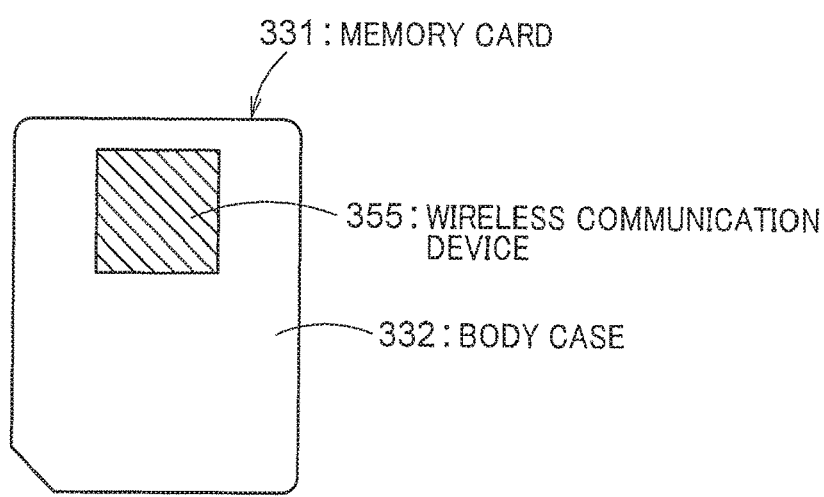
FIG. 37 illustrates an example of a wireless communication device mounted on a memory card.

In some embodiments, wireless communication devices installed in a STA and the AP 11 can also be provided in a memory card. FIG. 37 illustrates an example of a wireless communication device mounted on a memory card. A memory card 331 contains a wireless communication device 355 and a body case 332. The memory card 331 uses the wireless communication device 355 for wireless communication with external devices (such as a STA, the AP 11 or both of them). Here, in FIG. 37, the description of other installed elements (for example, a memory, and so on) in the memory card 331 is omitted.

Second Embodiment

In a second embodiment, a bus, a processor unit and an external interface unit are provided in addition to the configuration of the wireless communication device according to any of the embodiments as described in FIGS. 1-37 (hereinafter "first embodiments," e.g., the wireless communication device installed in the AP, the STA or both of them). The processor unit and the external interface unit are connected with an external memory (e.g., a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be the controller according to the second embodiment or a processor that performs the process of the controller, or may be another processor that performs a process relating to extending or altering the functions of the process of the controller. The processing unit in which the firmware operates may be included in the AP, the STA, or both of them according to the second embodiment. Alternatively, the processing unit may be included in the integrated circuitry of the wireless communication device installed in the AP, or in the integrated circuitry of the wireless communication device installed in the STA.

Third Embodiment

In a third embodiment, a clock generator is provided in addition to the configuration of the wireless communication device according to any of the first embodiments (e.g., the wireless communication device installed in the AP, the STA or both of them). The clock generator generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Fourth Embodiment

In the seventh embodiment, a power source unit, a power source controlling unit and a wireless power feeding unit are included in addition to the configuration of the wireless communication device according to any of the first embodiments (the wireless communication device installed in the AP, the STA or both of them). The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Fifth Embodiment

In a fifth embodiment, a SIM card is added to the configuration of the wireless communication device according to the fourth embodiment. For example, the SIM card is connected with the transmitter (102 or 202), the receiver (103 or 203) or the controller (101 or 201) of the wireless communication device, or more than one of them. Thus, by adopting a configuration in which the SIM card is included in the wireless communication device, authentication processing can be easily performed.

Sixth Embodiment

In a sixth embodiment, a video image compressing/decompressing unit is added to the configuration of the wireless communication device according to the second embodiment. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Seventh Embodiment

In a seventh embodiment, an LED unit is added to the configuration of the wireless communication device according to any of the first embodiments. For example, the LED unit is connected with the transmitter (102 or 202), the receiver (103 or 203) or the controller (101 or 201) of the wireless communication device, or more than one of them. Thus, by adopting a configuration in which the LED unit is included in the wireless communication device, notifying the operation state of the wireless communication device to a user can be easily done.

Eighth Embodiment

In an eighth embodiment, a vibrator unit is included in addition to the configuration of the wireless communication device according to any of the first embodiments. For example, the vibrator unit is connected with the transmitter (102 or 202), the receiver (103 or 203) or the controller (101 or 201) of the wireless communication device, or more than one of them. Thus, by adopting a configuration in which the vibrator unit is included in the wireless communication device, notifying the operation state of the wireless communication device to the user can be easily done.

Ninth Embodiment

In a ninth embodiment, a display is included in addition to the configuration of the wireless communication device (the wireless communication device of the AP, the STA or both of them) according to any one of the first embodiments. The display may be connected to the controller (101 or 201) of the wireless communication device via a bus (not shown). As seen from the above, the configuration including the display to display the operation state of the wireless communication device on the display allows the operation status of the wireless communication device to be easily notified to a user.

In the present disclosure, (1) the frame type in the wireless communication system, (2) a technique of disconnection between wireless communication devices, (3) an access scheme of a wireless LAN system and (4) a frame interval of a wireless LAN are described.

(1) Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in an upper layer of some embodiments and generated by, for example, a user's operation.

The control frame is a frame used to perform control at the time of transmission and reception (or exchange) of the data frame with the different wireless communication device. A response frame transmitted for the acknowledgment in a case where the wireless communication device receives the data frame or the management frame, belongs to the control frame.

These three types of frames are subjected to processing based on the necessity in the physical layer and then transmitted as physical packets via an antenna. Here, in a procedure of connection establishment, a connection request frame and a connection reception frame denote the management frame, and it is possible to use the response frame of the control frame as a confirmation frame with respect to the connection reception frame.

(2) Technique of Disconnection Between Wireless Communication Devices

For disconnection, there are an explicit technique and an implicit technique. As the explicit technique, a frame to disconnect any one of the connected wireless communication devices is transmitted. This frame is classified into the management frame. The frame for disconnection may be referred to as "release frame" by the meaning of releasing connection, for example. Normally, it is determined that the connection is disconnected at the timing of transmitting the release frame in a wireless communication device on the side to transmit the release frame and at the timing of receiving the release frame in a wireless communication device on the side to receive the release frame. Afterward, it returns to the initial state in a communication phase, for example, a state to search for a wireless communication device of the communicating partner. This is because, at the time of transmitting the frame for disconnection, a physical wireless link may not be secured, for example, the communication distance to the wireless communication device of connection destination is separated and radio signals cannot be received or decoded.

On the other hand, as the implicit technique, it is determined that the connection state is disconnected in a case where frame transmission (e.g., transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the release frame cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (e.g., until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (e.g., in a communication range) (e.g., whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

In some embodiments, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (e.g., in a communication range) (e.g., whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. In some embodiments, regarding the timer to limit the retransmission of the management frame in the latter case, although the same one as that in the former case is used as the second timer, a different timer may be used.

(3) Access Scheme of Wireless LAN System

For example, there is a wireless LAN system with an assumption of communication or competition with a plurality of wireless communication devices. CSMA/CA is set as the basis of an access scheme in the IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices that subtract the earliest time in a random time is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

(4) Frame Interval of Wireless LAN

The frame interval of the IEEE802.11 wireless LAN is described. There are six types of frame intervals used in the IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in the IEEE802.11 wireless LAN, and a strict period from a previous frame is not discussed. Therefore, the definition is followed in the explanation of the IEEE802.11 wireless LAN system. In the IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where the right of priority according to the traffic type is not distinguished, AIFS is used in a case where the right of priority by traffic identifier (TID) is provided.

Since operation is similar between DIFS and AIFS, AIFS is chiefly used to give an explanation below. In the IEEE802.11 wireless LAN, access control including the start of frame exchange in the MAC layer is performed. In addition, in a case where QoS (Quality of Service) is supported when data is transferred from an upper layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails.

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 38:
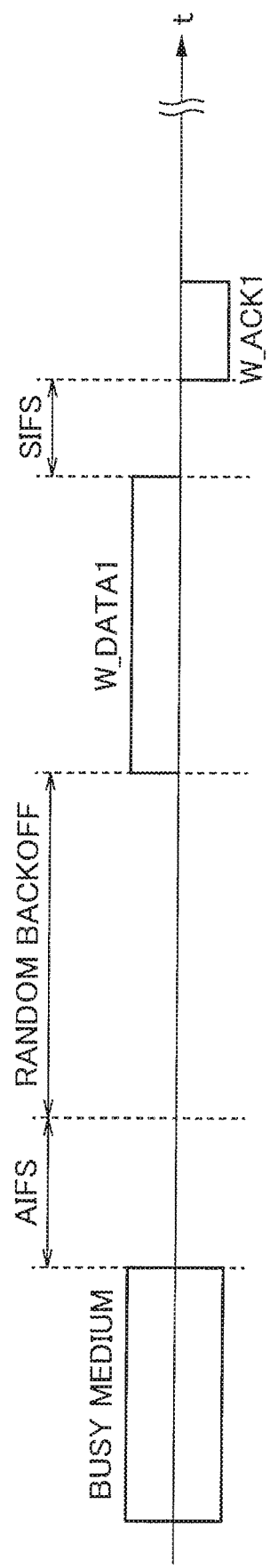
FIG. 38 illustrates one example of frame exchange in a competitive period based on the random access in the IEEE802.11 wireless LAN.

Here, FIG. 38 illustrates one example of frame exchange in a competitive period based on the random access in the IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (or random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters to which the value of each access category such as AIGS, CWmin and CWmax is set can be set every communication group (which is a basic service set (BSS) in the IEEE802.11 wireless LAN), the default values are defined.

For example, in the definition of 802.11ac, with an assumption that SIFS is 16 μs and the slot time is 9 μs, and thereby PIFS is 25 DIFS is 34 μs, the default value of the frame interval of an access category of BACKGROUND (AC_BK) in AIFS is 79 the default value of the frame interval of BEST EFFORT (AC_BE) is 43 the default value of the frame interval between VIDEO(AC_VI) and VOICE (AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate.

Figure 39:
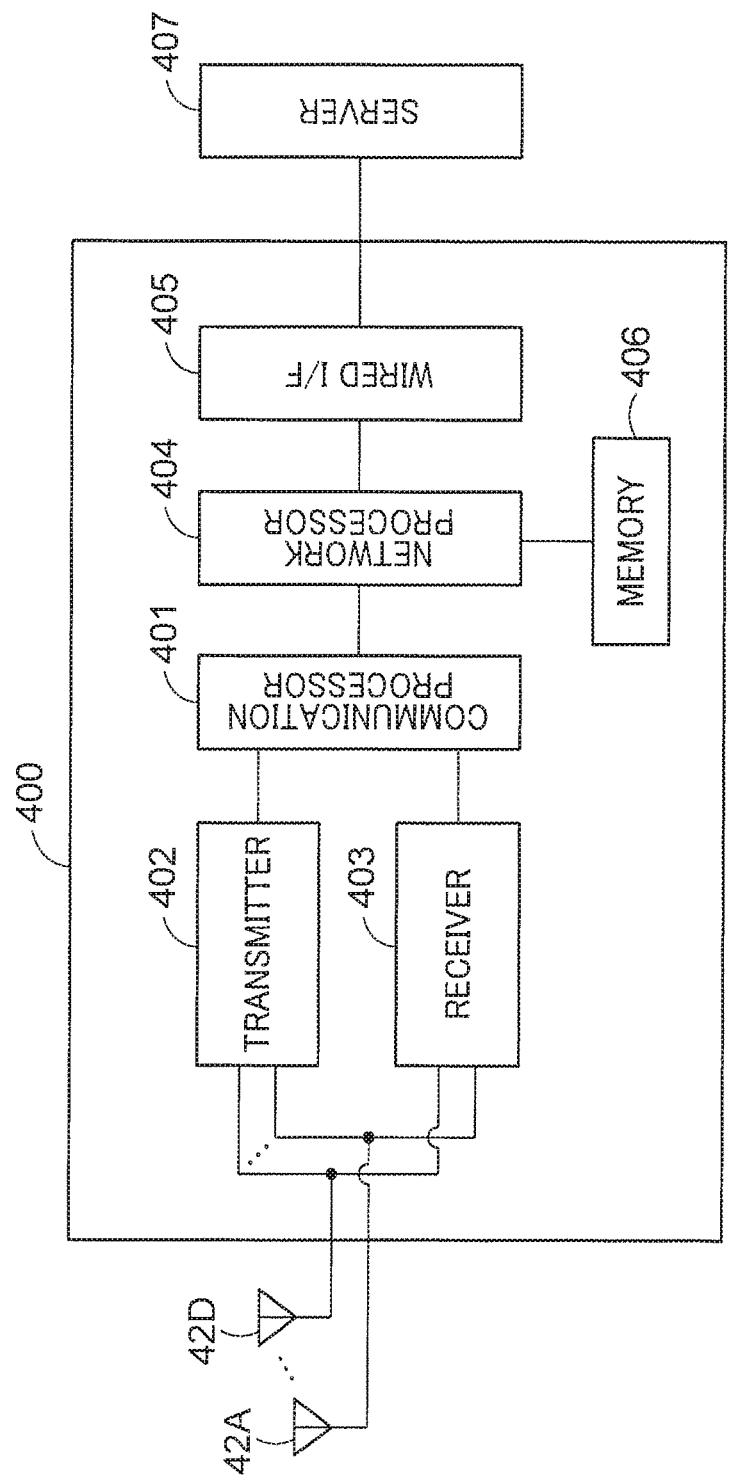
FIG. 39 is a functional block diagram of the AP according to some embodiments.

FIG. 39 is a functional block diagram of an access point 400 according to some embodiments. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405.

In some embodiments, the communication processor 401 has functions similar to the controller 101 in the embodiments as described in FIGS. 1-29. In some embodiments, the transmitter 402 has function's similar to the transmitter 102 in the embodiments as described in FIGS. 1-29. In some embodiments, the receiver 403 has functions similar to the receiver 103 in the embodiments as described in FIGS. 1-29. The communication processor 401 may internally possess a buffer for transferring data to and from the network processor 404. The buffer may be a volatile memory, such as a DRAM, or may be a non-volatile memory, such as a NAND and an MRAM.

Referring to FIG. 39, the network processor 404 controls data exchange with the communication processor 401, data writing and reading to and from the memory 406, and communication with the server 407 through the wired I/F 405. The network processor 404 may execute a higher communication process of the MAC layer, such as TCP/IP and UDP/IP, or a process of the application layer. The operation of the network processor may be performed through processing of software (program) by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (e.g., one chip). Parts that execute processing of digital areas of the transmitter 402 and the receiver 403 and parts that execute processing of analog areas may be formed by different chips. In some embodiments, the communication processor 401 may execute a higher communication process of the MAC layer, such as TCP/IP and UDP/IP. Although FIG. 39 shows that the number of antennas is four, the access point may include at least one antenna.

Referring to FIG. 39, the memory 406 saves data received from the server 407 and data received by the receiver 402. The memory 406 may be, for example, a volatile memory, such as a DRAM, or may be a non-volatile memory, such as a NAND and an MRAM. The memory 406 may be an SSD, an HDD, an SD card, an eMMC, or the like. The memory 406 may be provided outside of the access point 400.

Referring to FIG. 39, the wired I/F 405 transmits and receives data to and from the server 407. The communication with the server 407 is performed through a wire in some embodiments. In some embodiments, the communication with the server 407 may be performed wirelessly.

Referring to FIG. 39, the server 407 is a communication apparatus that returns a response including requested data in response to reception of a data forward request for requesting transmission of the data. Examples of the server 407 include an HTTP server (e.g., Web server) and an FTP server. However, the server 407 is not limited to these as long as the server 407 has a function of returning the requested data. The server 407 may be a communication apparatus operated by the user, such as a PC and a smartphone. In some embodiments, the server 407 may wirelessly communicate with the access point 400.

When the STA belonging to the BSS of the access point 400 issues a forward request of data for the server 407, a packet regarding the data forward request is transmitted to the access point 400. The access point 400 receives the packet through the antennas 42A to 42D. The access point 400 causes the receiver 403 to execute the process of the physical layer and the like and causes the communication processor 401 to execute the process of the MAC layer and the like.

Referring to FIG. 39, the network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value and an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 figures out that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (e.g., destination port number of the packet transmitted by the communication terminal). Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the access point 400 can be reduced. Note that the operation of the network processor 404 is not limited to the above-described operation. There is no problem in performing other operation when a general caching proxy is used, in which data is acquired from the server 407 in place of the STA, the data is cached in the memory 406, and a response is made from the cache data of the memory 406 for a data forward request of the same data.

The access point of some embodiments can be applied as the base station of the embodiments as described in FIGS. 1-29.

In some embodiments, although the access point with the cache function is described, a terminal (STA) with the cache function can also be realized by the same block configuration as FIG. 39. In this case, in some embodiments, the wired I/F 405 may be omitted. In some embodiments, all data exchanges described in the above can be executed by utilizing the cache function described in some embodiments. In some embodiments, address information is used as an identifier in order to judge whether a received frame is transmitted by unicast, multicast or broadcast. In some embodiments, the number of AID fields included in the received frames may be used as the identifier other than the address information. In this case, the received frame with one AID field is judged as unicast transmission and the received frame with more than one AID fields is judged as multicast or broadcast transmission.

In some embodiments, a frame may indicate not only one called a frame in IEEE802.11 standards but also one called a packet. In the case that a base station transmits a plurality of frames to a plurality of terminals, the frames may be same frames or different frames. Generally, in the case that a base station transmits/receives a plurality of frames or a plurality of Xth frames, the frames or the Xth frames may be same frames or different frame. X is any number equal to or more than one.

For example, the term "processor" may encompass but not limited to a general purpose processor, a central processing unit (CPU), a microprocessor, a digital signal processor (DSP), a controller, a microcontroller, a state machine, and so on. According to circumstances, a "processor" may refer to but not limited to an application specific integrated circuit (ASIC), a field programmable gate array (FPGA), and a programmable logic device (PLD), etc. The term "processor" may refer to but not limited to a combination of processing devices such as a plurality of microprocessors, a combination of a DSP and a microprocessor, one or more microprocessors in conjunction with a DSP core.

As another example, the term "memory" may encompass any electronic component which can store electronic information. The "memory" may refer but not limited to various types of media such as random access memory (RAM), read-only memory (ROM), programmable read-only memory (PROM), erasable programmable read only memory (EPROM), electrically erasable PROM (EEPROM), non-volatile random access memory (NVRAM), flash memory, magnetic or optical data storage, which are readable by a processor. It can be said that the memory electronically communicates with a processor if the processor read and/or write information for the memory. The memory may be integrated to a processor and also in this case, it can be said that the memory electronically communicates with the processor.

The term "circuitry" may refer to not only electric circuits or a system of circuits used in a device but also a single electric circuit or a part of the single electric circuit. The term "circuitry" may refer one or more electric circuits disposed on a single chip, or may refer one or more electric circuits disposed on more than one chip, or may refer one or more electric circuits disposed on more than one device. For example, the term "circuitry" may include electric circuits included in the AP and the STA illustrated in FIG. 1.

The term "at least one of a, b or c" is an expression to encompass not only "a", "b", "c", "a and b", "a and c", "b and c", "a, b and c" or any combination thereof but also a combination of at least a plurality of same elements such as "a and a", "a, b and b" or "a, a, b, b, c and c". Also, the expression is an expression to allow a set including an element other than "a", "b" and "c" such as "a, b, c, and d"

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

The invention claimed is:

1. A wireless communication device comprising:
a receiver configured to receive a plurality of first frames transmitted from a plurality of terminals in uplink frequency multiplexing or uplink spatial multiplexing in response to a trigger frame transmitted by the wireless communication device, wherein transmitter addresses of the first frames are different from each other and the plurality of first frames are received via a plurality of communication resources included in a first frequency band; and
a transmitter configured to:
determine one or more terminals as second terminals from among the plurality of terminals to transmit a second frame to each of the second terminals and remainder of the plurality of terminals as third terminals upon reception of the plurality of first frames, and
transmit one or more third frames to the second terminals and one fourth frame to the third terminals in downlink frequency multiplexing or downlink spatial multiplexing,
the third frames each aggregating the second frame and an acknowledgement frame including information of success or failure on the first frame received from each of the second terminals,
the one fourth frame including all of information of success or failure on the first frames received from the third terminals,
the one fourth frame being transmitted via one second communication resource included in the first frequency band, and
the third frames being transmitted each via one of third communication resources included in the first frequency band, the number of the third communication resources being the same as the number of the second terminals.

2. The wireless communication device according to claim 1, wherein
the transmitter transmits a fifth frame addressed to a fourth terminal different from the plurality of terminals via a fourth communication resource,
wherein the fourth frame is multiplexed with the one fourth frame and the one or more second frames in the downlink frequency multiplexing or the downlink spatial multiplexing.

3. The wireless communication device according to claim 1, wherein
the transmitter transmits the one fourth frame via the first frequency band if the number of the second terminals is zero.

4. The wireless communication device according to claim 1, wherein
the second frame includes data.

5. The wireless communication device according to claim 1, wherein
the second frame includes information to designate the second terminal to transmit a seventh frame.

6. The wireless communication device according to claim 1, further comprising at least one antenna.

7. The wireless communication device according to claim 1, further comprising at least one antenna.

8. A wireless communication method performed by a wireless communication device, comprising:
receiving a plurality of first frames transmitted from a plurality of terminals in uplink frequency multiplexing or uplink spatial multiplexing in response to a trigger frame transmitted by the wireless communication device, wherein transmitter addresses of the first frames are different from each other and the plurality of first frames are received via a plurality of communication resources included in a first frequency band;
determining one or more terminals as second terminals from among the plurality of terminals to transmit a second frame to each of the second terminals and remainder of the plurality of terminals as third terminals upon reception of the plurality of first frames; and
transmitting one or more third frames to the second terminals and one fourth frame to the third terminals in downlink frequency multiplexing or downlink spatial multiplexing,
the third frames each aggregating the second frame and an acknowledgement frame including information of success or failure on the first frame received from each of the second terminals,
the one fourth frame including all of information of success or failure on the first frames received from the third terminals,
the one fourth frame being transmitted via one second communication resource included in the first frequency band, and
the third frames being transmitted each via one of third communication resources included in the first frequency band, the number of the third communication resources being the same as the number of the second terminals.

9. A wireless communication device comprising:
a receiver configured to receive a plurality of first frames transmitted from a plurality of first terminals in uplink frequency multiplexing or uplink spatial multiplexing in response to a trigger frame transmitted by the wireless communication device, wherein transmitter addresses of the first frames are different from each other and the plurality of first frames are received via a plurality of communication resources included in a first frequency band; and
a transmitter configured to transmit a second frame to the first terminals and one or more third frames to one or more second terminals different from the first terminals, in downlink frequency multiplexing or downlink spatial multiplexing,
wherein the second frame includes all of information of success or failure on the first frames received from the first terminals and is transmitted via one second communication resource included in the first frequency band, and
wherein the third frames are transmitted each via one of third communication resources included in the first frequency band, and the number of the third communication resources is the same as number of the second terminals.

* * * * *